US012581443B2

(12) United States Patent
Wang et al.

(10) Patent No.: US 12,581,443 B2
(45) Date of Patent: Mar. 17, 2026

(54) METHOD AND APPARATUS FOR UPDATING TIMING OFFSET

(71) Applicant: Huawei Technologies Co., Ltd., Shenzhen (CN)

(72) Inventors: Xiaolu Wang, Hangzhou (CN); Hejia Luo, Hangzhou (CN); Yunfei Qiao, Hangzhou (CN); Yinggang Du, Shenzhen (CN); Chenlei Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 17/820,408

(22) Filed: Aug. 17, 2022

(65) Prior Publication Data

US 2022/0408389 A1 Dec. 22, 2022

Related U.S. Application Data

(63) Continuation of application No. PCT/CN2021/075536, filed on Feb. 5, 2021.

(30) Foreign Application Priority Data

| Feb. 18, 2020 | (CN) | 202010100465.X |
| Apr. 7, 2020 | (CN) | 202010299099.5 |
| Oct. 15, 2020 | (CN) | 202011105437.3 |

(51) Int. Cl.
| *H04W 56/00* | (2009.01) |
| *H04W 74/0836* | (2024.01) |
| *H04W 74/0833* | (2024.01) |

(52) U.S. Cl.
CPC ..... *H04W 56/005* (2013.01); *H04W 56/0055* (2013.01); *H04W 74/0833* (2013.01); *H04W 74/0836* (2024.01)

(58) Field of Classification Search
CPC ........... H04W 56/005; H04W 56/0055; H04W 56/0045; H04W 24/08; H04W 24/10; (Continued)

(56) References Cited

U.S. PATENT DOCUMENTS

2022/0201770 A1* 6/2022 Xu ..................... H04B 7/18513

FOREIGN PATENT DOCUMENTS

| CN | 101990236 A | 3/2011 |
| CN | 109245876 A | 1/2019 |
| | (Continued) | |

OTHER PUBLICATIONS

CMCC et al., "Discussion on UL transmission timing for NTN", 3GPP TSG RAN WG1 #99 R1-1912535, Internet URL: https://www.3gpp.org/ftp/tsg_ran/WG1_RL1/TSGR1_99/Docs/R1-1912535.zip>, Nov. 18, 2019, Section 2 , total: 4pages.
(Continued)

*Primary Examiner* — Jianye Wu
(74) *Attorney, Agent, or Firm* — WOMBLE BOND DICKINSON (US) LLP

(57) ABSTRACT

This application provides a method and an apparatus for updating a timing offset, and is particularly applicable to an NTN network such as satellite communication. The terminal side method includes: A terminal receives a timing offset difference ΔKoffset, and updates a timing offset based on the ΔKoffset to obtain an updated timing offset. The network side method includes: A network device determines a timing offset difference ΔKoffset, and sends the ΔKoffset to a terminal device, wherein the ΔKoffset is used for the terminal device to update a timing offset.

21 Claims, 21 Drawing Sheets

(58) Field of Classification Search
CPC ... H04W 84/06; H04B 7/18513; H04L 5/0053
See application file for complete search history.

(56)                    References Cited

FOREIGN PATENT DOCUMENTS

| CN | 109600785 | A  | 4/2019  |
|----|-----------|----|---------|
| JP | 2017527132 | A  | 9/2017  |
| JP | 2018198431 | A  | 12/2018 |
| JP | 2021533674 | A  | 12/2021 |
| WO | 2019022504 | A1 | 1/2019  |
| WO | 2019097922 | A1 | 5/2019  |
| WO | 2019139407 | A1 | 7/2019  |
| WO | 2020029919 | A1 | 2/2020  |

OTHER PUBLICATIONS

OPPO: "NTN control procedure for physical layer", 3GPP Draft; R1-1910386, 3rd Generation Partnershipproject (3GPP), Mobile Competence Centre;650, Route Des Lucioles;F-06921 Sophia-Antipolis Cedexfrance, vol. RAN WG1 no. Chongqing, China; Oct. 14, 2019-Oct. 20, 2019 Oct. 5, 2019 (Oct. 5, 2019), XP051808546.

CATT: "Physical layer control procedure enhancement", 3GPP Draft; R1-1910337, 3rd Generation Partnershipproject (3GPP), Mobile Competence Centre;650, Route Des Lucioles;F-06921 Sophia-Antipolis Cedexfrance, vol. RAN WG1 no. Chongqing, China; Oct. 14, 2019-Oct. 20, 2019 Oct. 5, 2019 (Oct. 5, 2019), XP051808518.

OPPO: "Discussion on time advance in NTN", 3GPP Draft; R2-1915168, 3rd Generation Partnershipproject (3GPP), Mobile Competence Centre;650, Route Des Lucioles;F-06921 Sophia-Antipolis Cedex; France, vol. RAN WG2, no. Reno, USA; Nov. 18, 2019-Nov. 22, 2019 Nov. 8, 2019 (Nov. 8, 2019), XP051817064.

Huawei, HiSilicon, Discussion on timing relationship enhancements for NTN, 3GPP TSG RAN WG1 #104-e, R1-2100222, Jan. 25, 2021, total 10 pages.

ZTE, Discussion on the physical control procedure for NTN, 3GPP TSG RAN WG1 #98, R1-1910363, Oct. 14, 2019, total 6 pages.

Ericsson, Feature lead summary #1 on NTN physical layer control procedures, 3GPP TSG-RAN WG1 Meeting #98bis, R1-1911565, Oct. 14, 2019, total 13 pages.

Ericsson, TP for Section 6.2 in TR 38.821 on NTN PHY control procedures, 3GPP TSG-RAN WG1 Meeting #99 R1-1913402, Reno, USA, Nov. 18-22, 2019, total 8 pages.

* cited by examiner

Satellite

Beam/Cell

Koffset value/Koffset reference point
coordinate indicator

| Koffset value/Koffset reference point coordinates |
|---|

FIG. 17

Koffset value/Koffset reference point
coordinate indicator

| Koffset value/(Koffset reference point coordinates and Koffset feeder link reference point coordinates) |
|---|

FIG. 18

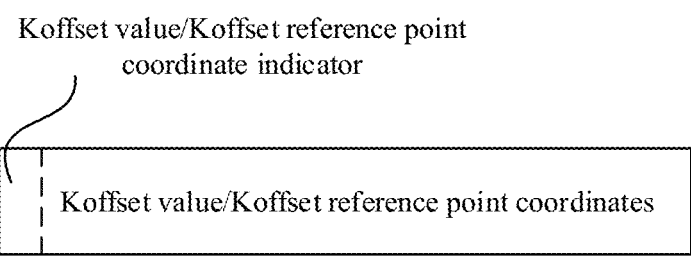

Satellite

Moving direction $\beta$

Koffset feeder link angle $\alpha$

Koffset angle

Feeder link

Service link

Koffset feeder link
reference point

Koffset reference
point

User terminal

Gateway

FIG. 19

METHOD AND APPARATUS FOR UPDATING TIMING OFFSET

CROSS-REFERENCE TO RELATED APPLICATIONS

This application is a continuation of International Application No. PCT/CN2021/075536, filed on Feb. 5, 2021, which claims priority to Chinese Patent Application No. 202010100465.X, filed on Feb. 18, 2020, Chinese Patent Application No. 202010299099.5, filed on Apr. 7, 2020, and Chinese Patent Application No. 202011105437.3, filed on Oct. 15, 2020. All of the aforementioned patent applications are hereby incorporated by reference in their entireties.

TECHNICAL FIELD

This application relates to the field of communications technologies, and in particular, to a method and an apparatus for updating a timing offset.

BACKGROUND

Currently, a new radio (NR) technology has entered a commercial deployment phase from a standardization phase. The NR standard is researched and designed for terrestrial communication. Compared with terrestrial communication, non-terrestrial networks (NTN) communication features large coverage areas and flexible networking.

In a terrestrial communications network, an altitude difference between a base station and a terminal device is not large, but an altitude difference between a base station/satellite and a terminal device in a non-terrestrial network is relatively large (generally greater than 500 km), as shown in FIG. 1. Therefore, round-trip delays and a round-trip delay difference of terminal devices in a same beam/cell in an NTN are far greater than round-trip delays and a round-trip delay difference of terminal devices in a same cell in NR. For example, when a diameter of a cell in a terrestrial cellular network is 350 km, a maximum round-trip delay in the cell is 1.17 ms. However, when a satellite orbital height in the NTN is 600 km and a beam diameter is 350 km, as shown in FIG. 2, a maximum round-trip delay may reach about 13 ms (a communication elevation angle of UE is 10 degrees).

Generally, to ensure that a base station receives, at a specified time, an uplink signal sent by a terminal device, the terminal device needs to make timing advance adjustment before sending the uplink signal. However, based on an uplink-downlink timing relationship, an amount of timing advance adjustment that can be made by the terminal device is far less than 13 ms.

Therefore, how to enable the terminal device to have enough time to make timing advance adjustment is a problem that needs to be resolved.

SUMMARY

Embodiments of this application provide a method and an apparatus for updating a timing offset, so as to ensure that a terminal device has enough time to make timing advance adjustment, and to effectively update a timing offset in a timely manner, thereby avoiding waste of time-frequency resources.

According to a first aspect, this application provides a method for updating a timing offset, where the method includes:

sending, by a terminal device, a third message to a network device based on a first timing offset, where the first timing offset is used to indicate a delay degree of delay of sending the third message by the terminal device, the third message includes indication information, the indication information is used to indicate a second timing offset, and the second timing offset is an updated first timing offset; and sending, by the terminal device, a fifth message to the network device based on the second timing offset.

According to a technical solution provided in this application, in one aspect, by setting a timing offset, the terminal device has enough time to make timing advance adjustment. In another aspect, by updating the timing offset, the terminal device can use a proper timing offset in a timely manner. Compared with a manner in which a timing offset is not updated, this embodiment of this application can reduce an end-to-end delay and avoid a resource waste on the basis of ensuring that the terminal device has enough time to make timing advance adjustment.

In an embodiment, before the sending, by a terminal device, a third message to a network device based on a first timing offset, the method further includes: sending, by the terminal device, a first message to the network device, where the first message includes a random access preamble; and receiving, by the terminal device, a second message sent by the network device, where the second message includes a random access response message; and after the sending, by a terminal device, a third message to a network device based on a first timing offset, the method further includes: receiving, by the terminal device, a fourth message sent by the network device, where the fourth message includes a random access contention resolution message.

In this embodiment of this application, the first message may be understood as a Msg1 in a four-step random access process, the second message may be understood as a Msg2 in a four-step random access process, the third message may be understood as a Msg3 in a four-step random access process, and the fourth message may be understood as a Msg4 in a four-step random access process.

In an embodiment, that the indication information is used to indicate a second timing offset includes: the indication information includes the second timing offset.

In an embodiment, that the indication information is used to indicate a second timing offset includes: the indication information includes a first adjustment parameter set, and the first adjustment parameter set is used to determine the second timing offset.

In this embodiment of this application, a quantity of bits used when the terminal device sends the first adjustment parameter set is far less than a quantity of bits used when the terminal device directly sends the second timing offset, thereby saving signaling overheads.

In an embodiment, the first adjustment parameter set includes any one or more of the following:

a parameter determined based on startup delay duration of a random access response RAR receive window and duration of the RAR receive window; or a parameter determined based on startup delay duration of a random access contention resolution timer and duration of the random access contention resolution timer; or a parameter determined based on a common timing advance; or a parameter determined based on an orbital height of the network device; or a parameter determined based on a round-trip delay between the terminal device and the network device.

In an embodiment, that the indication information is used to indicate a second timing offset includes: the indication information includes a variation between the second timing offset and a reference timing offset.

In this application, the reference timing offset is a timing offset currently used by the terminal device or a preset timing offset.

In an embodiment, the fourth message includes the second timing offset; or the fourth message includes a variation between the second timing offset and a reference timing offset, where the reference timing offset is a timing offset currently used by the terminal device or a preset timing offset.

In an embodiment, the method further includes:

receiving, by the terminal device, effective information sent by the network device, where the effective information is used to indicate an effective time of the second timing offset; or sending, by the terminal device, effective information to the network device, where the effective information is used to indicate an effective time of the second timing offset; or the second timing offset takes effect after m slots after the terminal device sends the third message, where m is a preset integer; or the second timing offset takes effect after n slots after the terminal device receives the fourth message, where n is a preset integer.

In an embodiment, before the sending, by a terminal device, a third message to a network device based on a timing offset, the method further includes: receiving, by the terminal device, a broadcast message sent by the network device, where the broadcast message includes any one or more of the following: the startup delay duration of the RAR receive window and the duration of the RAR receive window; or the startup delay duration of the random access contention resolution timer and the duration of the random access contention resolution timer; or the common timing advance; or the orbital height of the network device.

In an embodiment, when the broadcast message includes the startup delay duration of the RAR receive window and the duration of the RAR receive window, the first timing offset meets the following condition:

$$K_{offset}=[(RAR\_window+RAR\_offset)/slot\_duration]+\Delta K_{offset}$$

where $K_{offset}$ is a value of the first timing offset; RAR_window is the duration of the RAR receive window, and the duration of the RAR receive window is used to indicate duration of receiving the RAR by the terminal device; RAR_offset is the startup delay duration of the RAR receive window, and the startup delay duration of the RAR receive window is used to indicate delay duration by which startup of the RAR receive window is delayed after the terminal device sends the first message; slot_duration is the unit of duration; and $\Delta K_{offset}$ is a timing offset difference, and is an integer.

In an embodiment, when the broadcast message includes the startup delay duration of the random access contention resolution timer and the duration of the random access contention resolution timer, the first timing offset meets the following condition:

$$K_{offset}=[(RCR\_timer+RCR\_offset)/slot\_duration]+\Delta K_{offset}$$

RCR_timer is the duration of the random access contention resolution timer, and the duration of the random access contention resolution timer indicates a maximum time interval allowed between a moment of starting the random access contention resolution timer after the terminal device sends the third message and a moment of receiving the fourth message; RCR_offset is the startup delay duration of the random access contention resolution timer, and the startup delay duration of the random access contention resolution timer is used to indicate delay duration by which startup of the random access contention resolution timer is delayed after the terminal device sends the third message; slot_duration is the unit of duration; and $\Delta K_{offset}$ is a timing offset difference, and is an integer.

In an embodiment, the fifth message includes any one of data information, a feedback message, or a sounding reference signal (SRS).

In an embodiment, the feedback message includes a feedback message of the fourth message.

In an embodiment, the method further includes: receiving, by the terminal device, a timing advance adjustment instruction sent by the network device, where the timing advance adjustment instruction is used to instruct to update the second timing offset; and sending, by the terminal device, an updated second timing offset or a second adjustment parameter set to the network device based on the second timing offset, where the second adjustment parameter set is used to determine the updated second timing offset.

In an embodiment, the method further includes: receiving, by the terminal device from the network device, the updated second timing offset or a variation between the updated second timing offset and the reference timing offset when any one or more of the following conditions are met, where the any one or more conditions include: the terminal device switches a cell; or the terminal device switches a beam; or the terminal device switches a bandwidth part (BWP).

According to a second aspect, this application provides a method for updating a timing offset, where the method includes:

receiving, by a network device based on a first timing offset, a third message sent by a terminal device, where the first timing offset is used to indicate a delay degree to which receiving of the third message by the network device is delayed, the third message includes indication information, the indication information is used to indicate a second timing offset, and the second timing offset is an updated first timing offset; and receiving, by the network device, a fifth message sent by the terminal device.

In an embodiment, before the receiving, by a network device based on a first timing offset, a third message sent by a terminal device, the method further includes: receiving, by the network device, a first message sent by the terminal device, where the first message includes a random access preamble; and sending, by the network device, a second message to the terminal device, where the second message includes a random access response message; and after the receiving, by a network device based on a first timing offset, a third message sent by a terminal device, the method further includes: sending, by the network device, a fourth message to the terminal device, where the fourth message includes a random access contention resolution message.

In an embodiment, that the indication information is used to indicate a second timing offset includes: the indication information includes the second timing offset.

In an embodiment, that the indication information is used to indicate a second timing offset includes: the indication information includes a first adjustment parameter set, and the first adjustment parameter set is used to determine the second timing offset.

In an embodiment, the first adjustment parameter set includes any one or more of the following parameters: a parameter determined based on startup delay duration of a random access response RAR receive window and duration of the RAR receive window; or a parameter determined based on startup delay duration of a random access contention resolution timer and duration of the random access contention resolution timer; or a parameter determined based on a common timing advance; or a parameter determined based on an orbital height of the network device; or a parameter determined based on a round-trip delay between the terminal device and the network device.

In an embodiment, that the indication information is used to indicate a second timing offset includes: the indication information includes a variation between the second timing offset and a reference timing offset.

In this application, the reference timing offset is a timing offset currently used by the terminal device or a preset timing offset.

In an embodiment, the fourth message includes the second timing offset; or the fourth message includes a variation between the second timing offset and a reference timing offset, where the reference timing offset is a timing offset currently used by the terminal device or a preset timing offset.

In an embodiment, the method further includes: sending, by the network device, effective information to the terminal device, where the effective information is used to indicate an effective time of the second timing offset; or receiving, by the network device, effective information sent by the terminal device, where the effective information is used to indicate an effective time of the second timing offset; or the second timing offset takes effect after m slots after the network device receives the third message, where m is a preset integer; or the second timing offset takes effect after n slots after the network device sends the fourth message, where n is a preset integer.

In an embodiment, before the receiving, by a network device based on a first timing offset, a third message sent by a terminal device, the method further includes: sending, by the network device, a broadcast message, where the broadcast message includes any one or more of the following: the startup delay duration of the RAR receive window and duration of the RAR receive window; or the startup delay duration of the random access contention resolution timer and the duration of the random access contention resolution timer; or the common timing advance; or the orbital height of the network device.

In an embodiment, when the broadcast message includes the startup delay duration of the RAR receive window and the duration of the RAR receive window, the first timing offset meets the following condition:

$$K_{offset1}=[(\text{RAR\_window+RAR\_offset})/\text{slot\_duration}]+\Delta K_{offset}$$

Herein, $K_{offset1}$ is a value of the first timing offset; RAR_window is the duration of the RAR receive window, and the duration of the RAR receive window is used to indicate duration of receiving the RAR by the terminal device; RAR_offset is the startup delay duration of the RAR receive window, and the startup delay duration of the RAR receive window is used to indicate delay duration by which startup of the RAR receive window is delayed after the terminal device sends the first message; slot_duration is the unit of duration; and $\Delta K_{offset}$ is a timing offset difference, and is an integer.

In an embodiment, when the broadcast message includes the startup delay duration of the random access contention resolution timer and the duration of the random access contention resolution timer, the first timing offset meets the following condition:

$$K_{offset1}=[(\text{RCR\_timer+RCR\_offset})/\text{slot\_duration}]+\Delta K_{offset}$$

Herein, $K_{offset1}$ is a value of the first timing offset; RCR_timer is the duration of the random access contention resolution timer, and the duration of the random access contention resolution timer indicates a maximum time interval allowed between a moment of starting the random access contention resolution timer after the terminal device sends the third message and a moment of receiving the fourth message; RCR_offset is the startup delay duration of the random access contention resolution timer, and the startup delay duration of the random access contention resolution timer is used to indicate delay duration by which startup of the random access contention resolution timer is delayed after the terminal device sends the third message; slot_duration is the unit of duration; and $\Delta K_{offset}$ is a timing offset difference, and is an integer.

In an embodiment, the fifth message includes any one of data information, a feedback message, or a sounding reference signal SRS.

In an embodiment, the method further includes: sending, by the network device, a timing advance adjustment instruction to the terminal device, where the timing advance adjustment instruction is used to instruct to update the second timing offset; and receiving, by the network device, an updated second timing offset or a second adjustment parameter set sent by the terminal device, where the second adjustment parameter set is used to determine the updated second timing offset.

In an embodiment, the method further includes: sending, by the network device to the terminal device, the updated second timing offset or a variation between the updated second timing offset and the reference timing offset when any one or more of the following conditions are met, where the any one or more conditions include: the terminal device switches a cell; or the terminal device switches a beam; or the terminal device switches a bandwidth part BWP.

For beneficial effects of the second aspect, refer to beneficial effects of the first aspect. Details are not described herein again.

According to a third aspect, this application provides a communications apparatus, where the apparatus includes:

a processing unit, configured to generate a third message, where the third message includes indication information, the indication information is used to indicate a second timing offset, the second timing offset is an updated first timing offset, and the first timing offset is used to indicate a delay degree of delay of sending the third message by the communications apparatus; and a sending unit, configured to send the third message to a network device based on the first timing offset. The sending unit is further configured to send a fifth message to the network device based on the second timing offset.

In an embodiment, the sending unit is further configured to send a first message to the network device, where the first message includes a random access preamble. The receiving unit is further configured to receive a second message sent by the network device, where the second message includes a random access response message. The receiving unit is further configured to receive a fourth message sent by the network device, where the fourth message includes a random access contention resolution message.

In an embodiment, that the indication information is used to indicate a second timing offset includes: the indication information includes the second timing offset.

In an embodiment, that the indication information is used to indicate a second timing offset includes: the indication information includes a first adjustment parameter set, and the first adjustment parameter set is used to determine the second timing offset.

In an embodiment, the first adjustment parameter set includes any one or more of the following parameters: a parameter determined based on startup delay duration of a random access response RAR receive window and duration of the RAR receive window; or a parameter determined based on startup delay duration of a random access contention resolution timer and duration of the random access contention resolution timer; or a parameter determined based on a common timing advance; or a parameter determined based on an orbital height of the network device; or a parameter determined based on a round-trip delay between the communications apparatus and the network device.

In an embodiment, that the indication information is used to indicate a second timing offset includes: the indication information includes a variation between the second timing offset and a reference timing offset.

In this application, the reference timing offset is a timing offset currently used by the terminal device or a preset timing offset.

In an embodiment, the fourth message includes the second timing offset; or the fourth message includes a variation between the second timing offset and a reference timing offset, where the reference timing offset is a timing offset currently used by the communications apparatus or a preset timing offset.

In an embodiment, the receiving unit is further configured to receive effective information sent by the network device, where the effective information is used to indicate an effective time of the second timing offset; or the sending unit is further configured to send effective information to the network device, where the effective information is used to indicate an effective time of the second timing offset; or the second timing offset takes effect after m slots after the communications apparatus sends the third message, where m is a preset integer; or the second timing offset takes effect after n slots after the communications apparatus receives the fourth message, where n is a preset integer.

In an embodiment, the receiving unit is further configured to receive a broadcast message sent by the network device. The broadcast message includes any one or more of the following: the startup delay duration of the RAR receive window and the duration of the RAR receive window; or the startup delay duration of the random access contention resolution timer and the duration of the random access contention resolution timer; or the common timing advance; or the orbital height of the network device.

In an embodiment, when the broadcast message includes the startup delay duration of the RAR receive window and the duration of the RAR receive window, the first timing offset meets the following condition:

$$K_{offset1}=\lceil(\text{RAR\_window}+\text{RAR\_offset})/\text{slot\_duration}\rceil+\Delta K_{offset}$$

where $K_{offset1}$ is a value of the first timing offset; RAR_window is the duration of the RAR receive window, and the duration of the RAR receive window is used to indicate duration of receiving the RAR by the communications apparatus; RAR_offset is the startup delay duration of the RAR receive window, and the startup delay duration of the RAR receive window is used to indicate delay duration by which startup of the RAR receive window is delayed after the communications apparatus sends the first message; slot_duration is the unit of duration; and $\Delta K_{offset}$ is a timing offset difference, and is an integer.

In an embodiment, when the broadcast message includes the startup delay duration of the random access contention resolution timer and the duration of the random access contention resolution timer, the first timing offset meets the following condition:

$$K_{offset1}=\lceil(\text{RCR\_timer}+\text{RCR\_offset})/\text{slot\_duration}\rceil+\Delta K_{offset}$$

Herein, $K_{offset1}$ is a value of the first timing offset; RCR_timer is the duration of the random access contention resolution timer, and the duration of the random access contention resolution timer indicates a maximum time interval allowed between a moment of starting the random access contention resolution timer after the communications apparatus sends the third message and a moment of receiving the fourth message; RCR_offset is the startup delay duration of the random access contention resolution timer, and the startup delay duration of the random access contention resolution timer is used to indicate delay duration by which startup of the random access contention resolution timer is delayed after the communications apparatus sends the third message; slot_duration is the unit of duration; and $\Delta K_{offset}$ is a timing offset difference, and is an integer.

In an embodiment, the fifth message includes any one of data information, a feedback message, or a sounding reference signal SRS.

In an embodiment, the receiving unit is further configured to receive a timing advance adjustment instruction sent by the network device, where the timing advance adjustment instruction is used to instruct to update the second timing offset. The sending unit is further configured to send an updated second timing offset or a second adjustment parameter set to the network device based on the second timing offset, where the second adjustment parameter set is used to determine the updated second timing offset.

In an embodiment, the receiving unit is further configured to: receive, from the network device, the updated second timing offset or a variation between the updated second timing offset and the reference timing offset when any one or more of the following conditions are met, where the any one or more conditions include: the communications apparatus switches a cell; or the communications apparatus switches a beam; or the communications apparatus switches a bandwidth part BWP.

According to a fourth aspect, this application provides a communications apparatus, where the apparatus includes:

a receiving unit, configured to receive, based on a first timing offset, a third message sent by a terminal device, where the first timing offset is used to indicate a delay degree of delay of receiving the third message by the network device, the third message includes indication information, the indication information is used to indicate a second timing offset, and the second timing offset is an updated first timing offset. The receiving unit is further configured to receive a fifth message sent by the terminal device.

In an embodiment, the apparatus further includes a sending unit. The receiving unit is configured to receive a first message sent by the terminal device, where the first message includes a random access preamble. The sending unit is configured to send a second message to the terminal device, where the second message includes a random access response message. The sending unit is further configured to send a fourth message to the terminal device, where the fourth message includes a random access contention resolution message.

In an embodiment, that the indication information is used to indicate a second timing offset includes: the indication information includes the second timing offset.

In an embodiment, that the indication information is used to indicate a second timing offset includes: the indication information includes a first adjustment parameter set, and the first adjustment parameter set is used to determine the second timing offset.

In an embodiment, the first adjustment parameter set includes any one or more of the following parameters: a parameter determined based on startup delay duration of a random access response RAR receive window and duration of the RAR receive window; or a parameter determined based on startup delay duration of a random access contention resolution timer and duration of the random access contention resolution timer; or a parameter determined based on a common timing advance; or a parameter determined based on an orbital height of the communications apparatus; or a parameter determined based on a round-trip delay between the terminal device and the communications apparatus.

In an embodiment, that the indication information is used to indicate a second timing offset includes: the indication information includes a variation between the second timing offset and a reference timing offset.

In this application, the reference timing offset is a timing offset currently used by the terminal device or a preset timing offset.

In an embodiment, the fourth message includes the second timing offset; or the fourth message includes a variation between the second timing offset and a reference timing offset, where the reference timing offset is a timing offset currently used by the terminal device or a preset timing offset.

In an embodiment, the sending unit is further configured to send effective information to the terminal device, where the effective information is used to indicate an effective time of the second timing offset; or the receiving unit is further configured to receive effective information sent by the terminal device, where the effective information is used to indicate an effective time of the second timing offset; or the second timing offset takes effect after m slots after the communications apparatus receives the third message, where m is a preset integer; or the second timing offset takes effect after n slots after the communications apparatus sends the fourth message, where n is a preset integer.

In an embodiment, the sending unit is further configured to send a broadcast message. The broadcast message includes any one or more of the following: the startup delay duration of the RAR receive window and the duration of the RAR receive window; or the startup delay duration of the random access contention resolution timer and the duration of the random access contention resolution timer; or the common timing advance; or the orbital height of the communications apparatus.

In an embodiment, when the broadcast message includes the startup delay duration of the RAR receive window and the duration of the RAR receive window, the first timing offset meets the following condition:

$$K_{offset1} = \lceil (RAR\_window + RAR\_offset)/slot\_duration \rceil + \Delta K_{offset}$$

where $K_{offset1}$ is a value of the first timing offset; RAR_window is the duration of the RAR receive window, and the duration of the RAR receive window is used to indicate duration of receiving the RAR by the terminal device; RAR_offset is the startup delay duration of the RAR receive window, and the startup delay duration of the RAR receive window is used to indicate delay duration by which startup of the RAR receive window is delayed after the terminal device sends the first message; slot_duration is the unit of duration; and $\Delta K_{offset}$ is a timing offset difference, and is an integer.

In an embodiment, when the broadcast message includes the startup delay duration of the random access contention resolution timer and the duration of the random access contention resolution timer, the first timing offset meets the following condition:

$$K_{offset1} = \lceil (RCR\_timer + RCR\_offset)/slot\_duration \rceil + \Delta K_{offset}$$

where $K_{offset1}$ is a value of the first timing offset; RCR_timer is the duration of the random access contention resolution timer, and the duration of the random access contention resolution timer indicates maximum duration between a moment of starting the random access contention resolution timer after the terminal device sends the third message and a moment of receiving the fourth message; RCR_offset is the startup delay duration of the random access contention resolution timer, and the startup delay duration of the random access contention resolution timer is used to indicate delay duration by which startup of the random access contention resolution timer is delayed after the terminal device sends the third message; slot_duration is the unit of duration; and $\Delta K_{offset}$ is a timing offset difference, and is an integer.

In an embodiment, the fifth message includes any one of data information, a feedback message, or a sounding reference signal SRS.

In an embodiment, the sending unit is further configured to send a timing advance adjustment instruction to the terminal device, where the timing advance adjustment instruction is used to instruct to update the second timing offset. The receiving unit is further configured to receive an updated second timing offset or a second adjustment parameter set sent by the terminal device, where the second adjustment parameter set is used to determine the updated second timing offset.

In an embodiment, the sending unit is further configured to: send, to the terminal device, the updated second timing offset or a variation between the updated second timing offset and the reference timing offset when any one or more of the following conditions are met, where the any one or more conditions include: the terminal device switches a cell; or the terminal device switches a beam; or the terminal device switches a bandwidth part BWP.

According to a fifth aspect, this application provides a communications apparatus, where the communications apparatus includes a processor, and when the processor executes a computer program or instructions in a memory, the method according to the first aspect is executed.

According to a sixth aspect, this application provides a communications apparatus. The communications apparatus includes a processor. When the processor invokes a computer program or instructions in a memory, the method according to the second aspect is performed.

According to a seventh aspect, this application provides a communications apparatus. The communications apparatus includes a processor and a memory. The memory is configured to store computer-executable instructions, and the processor is configured to execute the computer-executable instructions stored in the memory, to enable the communications apparatus to perform the method according to the first aspect.

According to an eighth aspect, this application provides a communications apparatus. The communications apparatus includes a processor and a memory. The memory is configured to store computer-executable instructions, and the processor is configured to execute the computer-executable instructions stored in the memory, to enable the communications apparatus to perform the method according to the second aspect.

According to a ninth aspect, this application provides a communications apparatus. The communications apparatus includes a processor, a memory, and a transceiver. The transceiver is configured to receive a signal or send a signal, the memory is configured to store program code, and the processor is configured to execute the program code, to enable the communications apparatus to perform the method according to the first aspect.

According to a tenth aspect, this application provides a communications apparatus. The communications apparatus includes a processor, a memory, and a transceiver. The transceiver is configured to receive a signal or send a signal, the memory is configured to store program code, and the processor is configured to execute the program code, to enable the communications apparatus to perform the method according to the second aspect.

According to an eleventh aspect, this application provides a communications apparatus, where the communications apparatus includes a processor and an interface circuit. The interface circuit is configured to receive code instructions and transmit the code instructions to the processor. The processor runs the code instructions, so that the method shown in the first aspect is executed.

According to a twelfth aspect, this application provides a communications apparatus, where the communications apparatus includes a processor and an interface circuit. The interface circuit is configured to receive code instructions and transmit the code instructions to the processor. The processor runs the code instructions, so that the method shown in the second aspect is executed.

According to a thirteenth aspect, this application provides a computer-readable storage medium. The computer-readable storage medium is configured to store instructions or a computer program; and when the instructions are executed or the computer program is executed, the method according to the first aspect is implemented.

According to a fourteenth aspect, this application provides a computer-readable storage medium. The computer-readable storage medium is configured to store instructions or a computer program; and when the instructions are executed or the computer program is executed, the method according to the second aspect is implemented.

According to a fifteenth aspect, this application provides a computer program product, where the computer program product includes instructions or a computer program, and when the instructions are executed or the computer program is executed, the method in the first aspect is implemented.

According to a sixteenth aspect, this application provides a computer program product. The computer program product includes instructions or a computer program; and when the instructions are executed or the computer program is executed, the method according to the second aspect is implemented.

According to a seventeenth aspect, this application provides a computer program, configured to execute the method according to the first aspect.

According to an eighteenth aspect, this application provides a computer program, configured to execute the method according to the second aspect.

According to a nineteenth aspect, this application provides a communications system, including a terminal device and a network device, where the terminal device is configured to execute the method according to the first aspect, and the network device is configured to execute the method according to the second aspect.

BRIEF DESCRIPTION OF DRAWINGS

FIG. 5$b$ is a schematic diagram of a relationship between a timing advance and a signal according to an embodiment of this application;

FIG. 5$c$ is a schematic diagram of a relationship between a timing advance and a signal according to an embodiment of this application;

FIG. 7$b$ is a schematic diagram of a relationship between a timing advance and a signal according to an embodiment of this application;

FIG. 8$b$ is a schematic diagram of a relationship between a maximum round-trip delay difference and a minimum elevation angle according to an embodiment of this application;

FIG. 17 is a schematic diagram A of a Koffset value/ Koffset reference point coordinate indicator according to an embodiment of this application;

FIG. 18 is a schematic diagram B of a Koffset value/ Koffset reference point coordinate indicator according to an embodiment of this application;

FIG. 19 is a schematic diagram of a Koffset angle according to an embodiment of this application;

DESCRIPTION OF EMBODIMENTS

In the specification, claims, and accompanying drawings of this application, terms "first", "second", "third", "fourth", and the like are intended to distinguish between different objects but do not indicate a particular order. In addition, terms "including", "having", and any other variant thereof are intended to cover non-exclusive inclusion. For example, a process, method, system, product, or device that includes a series of operations or units is not limited to the listed operations or units, but can further includes an unlisted operation or unit, or further includes another inherent operation or unit of the process, method, product, or device.

"An embodiment" mentioned in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

In this application, "at least one (item)" means one or more, "a plurality of" means two or more, and "at least two (items)" means two or three or more than three. The term "and/or" is used to describe an association relationship for describing associated objects and represents that three relationships may exist. For example, "A and/or B" may represent the following three cases: Only A exists, only B exists, and both A and B exist, where A and B may be singular or plural. The character "I" generally indicates an "or" relationship between the associated objects. "At least one of the following items (pieces)" or a similar expression thereof indicates any combination of these items, including any combination of singular items (pieces) or plural items (pieces). For example, at least one item (piece) of a, b, or c may represent: a, b, c, "a and b", "a and c", "b and c", or "a, b, and c", where a, b, and c may be singular or plural.

The following describes embodiments of this application with reference to accompanying drawings.

Figure 3:
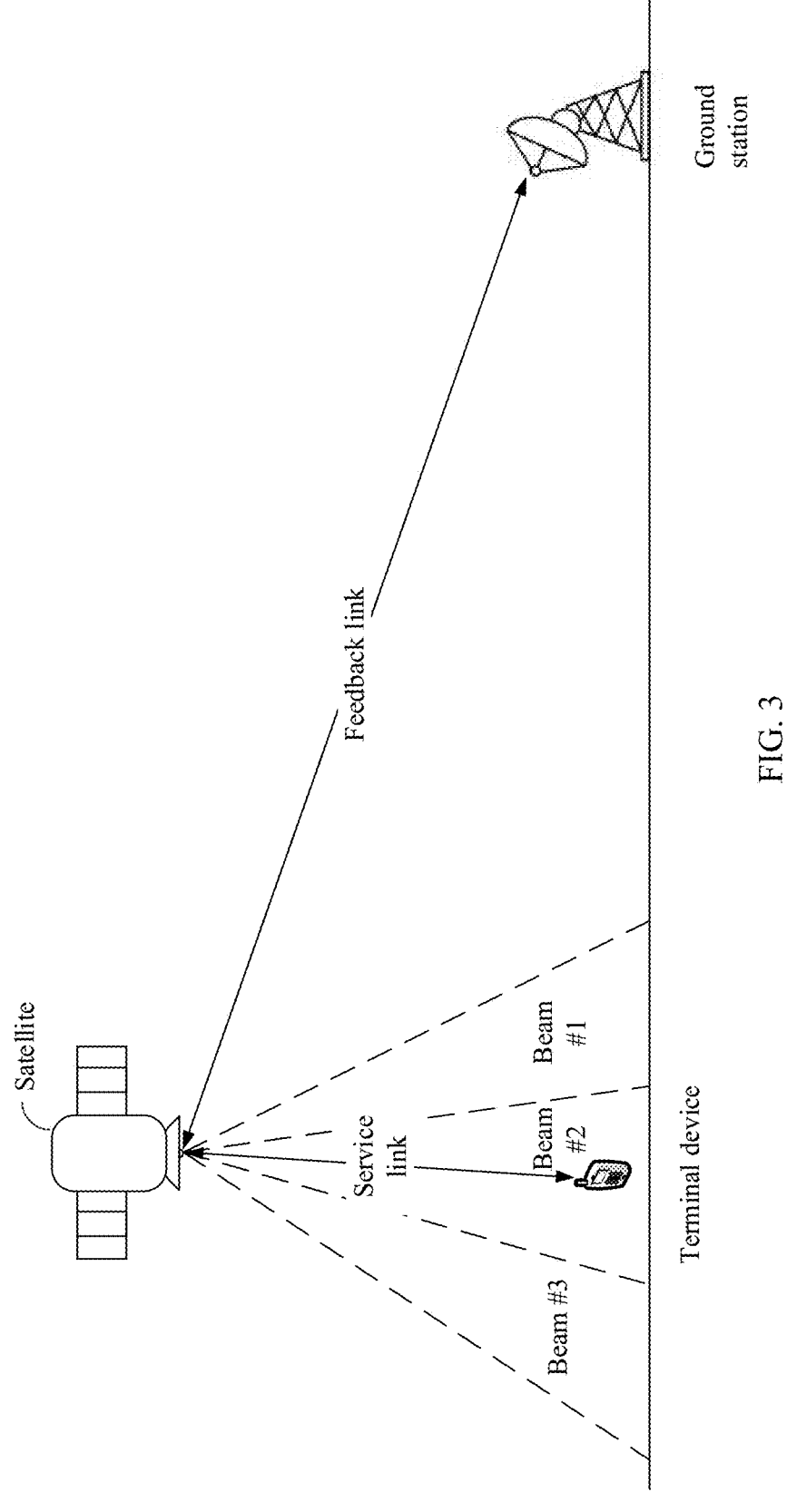
FIG. 3 is a schematic diagram of an architecture of an NTN communications system according to an embodiment of this application.

The method provided in this application may be applied to an NTN communications system. As shown in FIG. 3, the communications system may include a terminal device, a satellite (or referred to as a satellite base station), and a ground station (or referred to as a gateway station or a gateway).

The terminal device may also be referred to as user equipment (UE), a terminal, or the like. The terminal device is a device having a wireless transceiver function. The terminal device may be deployed on land, including indoor, outdoor, handheld, wearable, or vehicle-mounted; or may be deployed on a water surface, for example, on a ship; or may be deployed in the air, for example, on an airplane, a balloon, or a satellite. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, or the like. It may be understood that the terminal device may alternatively be a terminal device in a future 5G network, a terminal device in a future evolved public land mobile network (PLMN), or the like. For ease of description, the following uses an example in which the terminal device is UE to describe the method in the embodiments of this application.

In an embodiment, in the communications system shown in FIG. 3, communication technologies such as device to device (D2D), vehicle-to-everything (V2X), or machine to machine (M2M) may be used for communication between terminal devices. A communication method for the terminal devices is not limited in the embodiments of this application.

The satellite may provide a radio access service for a terminal device, schedule a radio resource to an accessed terminal device, and provide a reliable radio transmission protocol, a data encryption protocol, and the like. An artificial earth satellite, an aerial vehicle, and the like may be used as wireless communication base stations, for example, an evolved NodeB (eNB) and a 5G base station (gNB). Alternatively, the satellite may be used as a relay of these base stations to transparently transmit radio signals of these base stations to the terminal device. In this case, the ground station may be considered as a wireless communication base station. Therefore, in the embodiments of this application, in some embodiments, for example, in a satellite regenerative scenario, the network device may be the satellite base station shown in FIG. 3. In other embodiments, for example, in a satellite transparent scenario, the network device may be the ground station shown in FIG. 3. Therefore, for ease of description, the following uses an example in which the network device is a base station to describe the method in this application.

In the embodiments of this application, the network device may include but is not limited to the foregoing base station. For example, the base station may be a base station in a future communications system such as a sixth-generation communications system. In an embodiment, the network device may alternatively be an access node, a wireless relay node, a wireless backhaul node, or the like in a wireless local area network (Wi-Fi) system. In an embodiment, the network device may alternatively be a radio controller in a cloud radio access network (CRAN) scenario. In an embodiment, the network device may alternatively be a wearable device, a vehicle-mounted device, or the like. In an embodiment, the network device may alternatively be a small cell, a transmission reception point (TRP), or the like. It may be understood that the network device may alternatively be a base station in a future evolved PLMN, or the like.

In an embodiment, the satellite may be a geostationary earth orbit (GEO) satellite, a medium earth orbit (MEO) satellite or a low earth orbit (LEO) satellite in none-geostationary earth orbit (NGEO), or a high altitude platform station (HAPS).

The ground station may be configured to connect the satellite to a core network. For example, when the satellite serves as a wireless communication base station, the ground station may transparently transmit signaling between the satellite and the core network. Alternatively, the ground station may be used as a wireless communication base station, and the satellite may transparently transmit signaling between the terminal device and the ground station. For example, during communication, the ground station may send signaling from the core network to the satellite through a feedback link (or referred to as a feeder link) (feeder link). The satellite sends the signaling to the terminal device through a service link (service link) between the satellite and the terminal device. Correspondingly, the terminal device may send signaling to the satellite through the service link, and the satellite sends the signaling to the core network through the ground station.

It may be understood that FIG. 3 shows only one satellite and one ground station. In actual use, an architecture with a plurality of satellites and/or a plurality of ground stations may be used as required. Each satellite may serve one or more terminal devices, each satellite may correspond to one or more ground stations, and each ground station may correspond to one or more satellites. This is not limited in this application.

Figure 4:
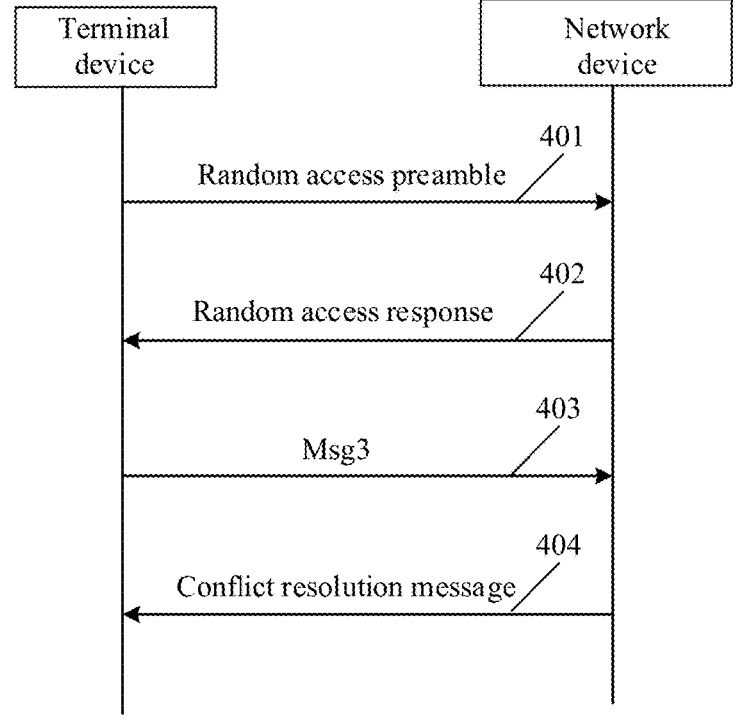
FIG. 4 is a schematic flowchart of a four-step random access method according to an embodiment of this application.

To fully understand the method shown in this application, the following describes in detail the four-step random access method related to the embodiments of this application, which is as shown in FIG. 4.

401: UE sends, to a base station, a random access preamble (random access preamble), which may also be referred to as a first message (Msg1). The random access preamble is used to notify the base station that there is a random access request, to enable the base station to estimate a transmission delay between the base station and the UE, so that the base station calibrates uplink timing and notifies UE of calibration information by using a timing advance (TA) command (timing advance command).

402: After detecting the random access preamble, the base station sends, to the UE, a random access response (RAR), which may also be referred to as a second message (Msg2). The random access response may include a sequence number of the random access preamble received in the foregoing 401, the timing advance command, uplink resource allocation information, a temporary cell-radio network temporary identifier (TC-RNTI), and the like.

403: The UE receives the random access response. If a random access preamble indicated by the sequence number of the random access preamble in the random access response is the same as the random access preamble sent by the UE to the base station in operation 401, the UE considers that the random access response is a random access response for the UE, that is, the UE receives the random access response for the UE. After receiving the random access response, the UE sends an uplink message on an uplink resource indicated by the random access response, for example, sends uplink data on a physical uplink shared channel (PUSCH), where the uplink message is also referred to as a third message (Msg3). The Msg3 may carry a unique user identifier.

404: The base station receives the uplink message of the UE, and returns a contention resolution message to the UE that performs successful access, where the contention resolution message is also referred to as a fourth message (Msg4). The base station includes the unique user identifier in the Msg3 in the contention resolution message to indicate the UE that performs successful access. Other UE that fails in access initiates random access again.

Figure 5A:
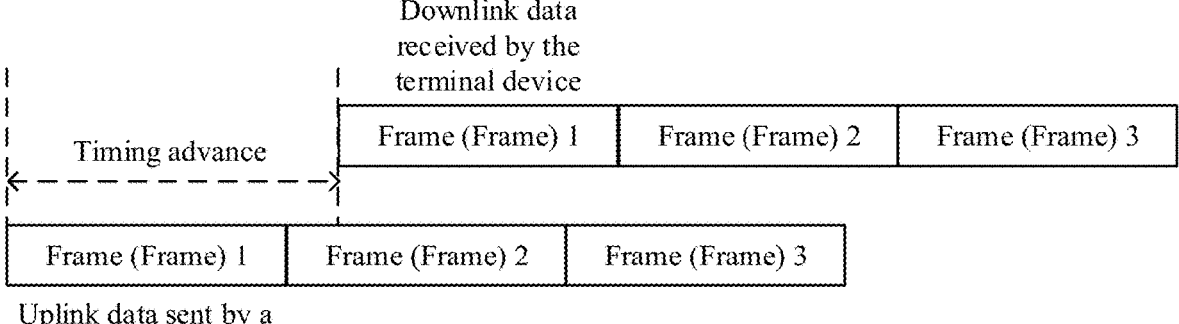
FIG. 5$a$ is a schematic diagram of a relationship between a timing advance and a signal according to an embodiment of this application.

It can be learned from the foregoing description that: To enable timing alignment between an uplink signal and a downlink signal when the uplink signal arrives at the satellite base station, the UE needs to make timing advance adjustment when sending the uplink signal, as shown in FIG. 5a. A relatively large round-trip delay in the NTN causes a relatively large difference between timing of an uplink signal received on a satellite base station side and timing of a downlink signal. Therefore, in an NTN system, a magnitude of timing advance adjustment for an uplink signal is relatively large.

To lead out a problem that needs to be solved in this application: For example, after the UE receives physical downlink shared channel (physical downlink shared channel, PDSCH) data sent by the base station, the UE needs to send a hybrid automatic repeat request (HARQ)—acknowledge (ACK) (HARQ-ACK) message to the base station to give a feedback that the PDSCH is correctly received.

Figure 1:
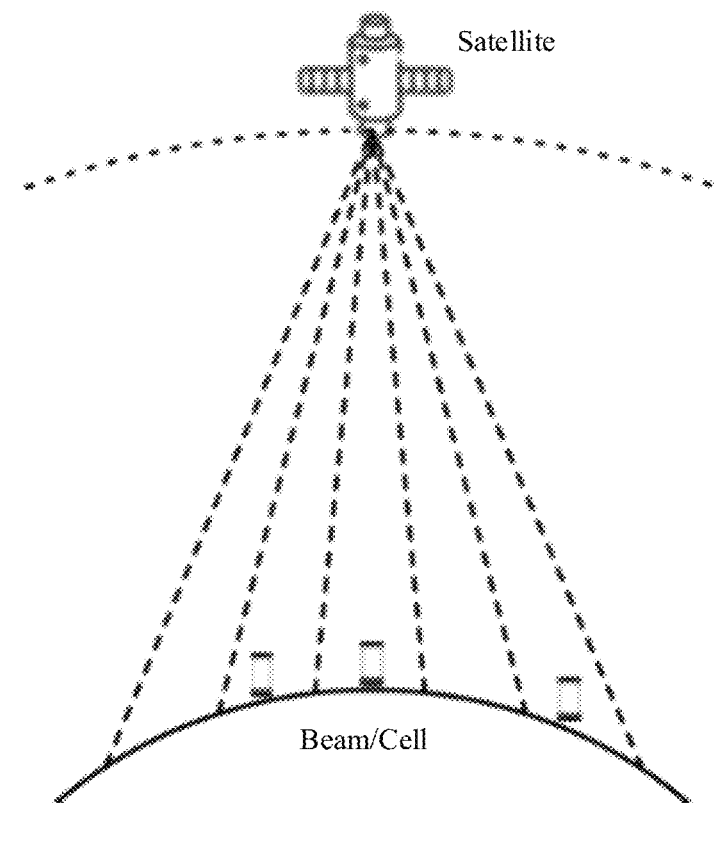
FIG. 1 is a schematic diagram of an architecture of an NTN communications system according to an embodiment of this application.
Figure 2:
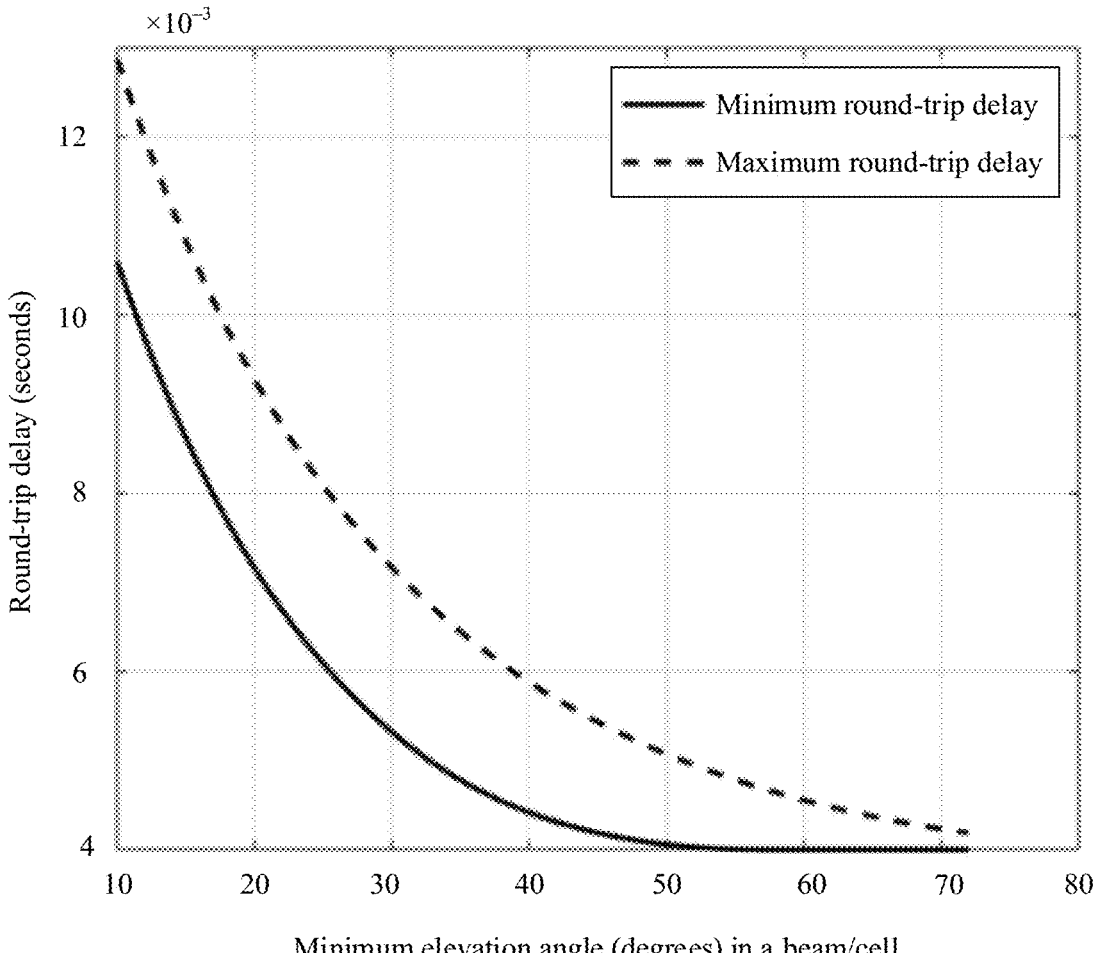
FIG. 2 is a schematic diagram of a relationship between a round-trip delay and a minimum elevation angle according to an embodiment of this application.
Figure 5B:
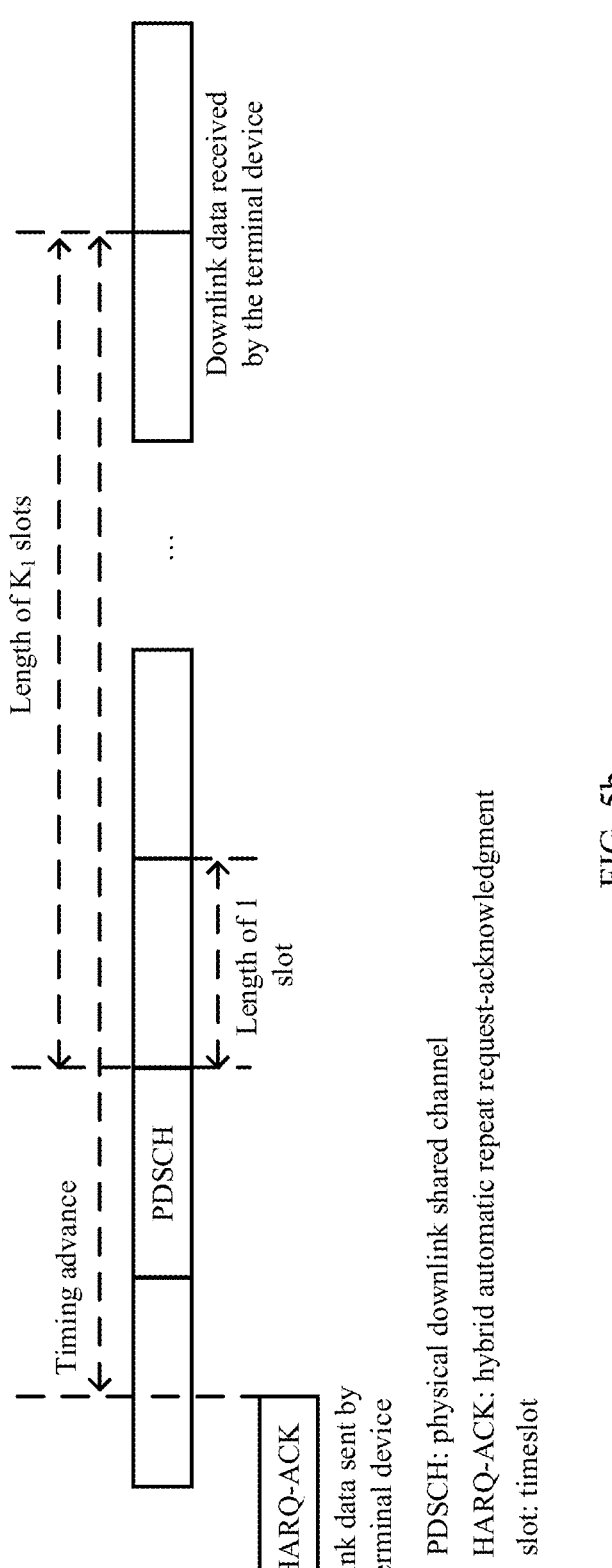

For example, if the UE receives the PDSCH data in slot (slot) n, the UE needs to feed back the HARQ-ACK message in slot $n+K_1$. That is, a maximum value of timing advance adjustment that can be performed by the UE is $K_1$ slots. Generally, a maximum value of $K_1$ is 15. When a subcarrier spacing (SCS) is 30 KHz, and one slot is 0.5 ms, a maximum magnitude of timing advance adjustment that can be performed by the UE is 7.5 ms. It can be learned from FIG. 2 that a round-trip delay between the UE and the base station in the NTN is far greater than 7.5 ms. Therefore, the $K_1$ slots cannot provide enough time for the UE to make timing advance adjustment, that is, cannot meet a timing advance requirement for compensating for a round-trip delay in a beam or a cell in the NTN. As shown in FIG. 5b, when a timing advance adjustment magnitude of uplink data sent by the UE is greater than $K_1$ slots (slot), the UE cannot send the HARQ-ACK message on time.

Figure 5C:
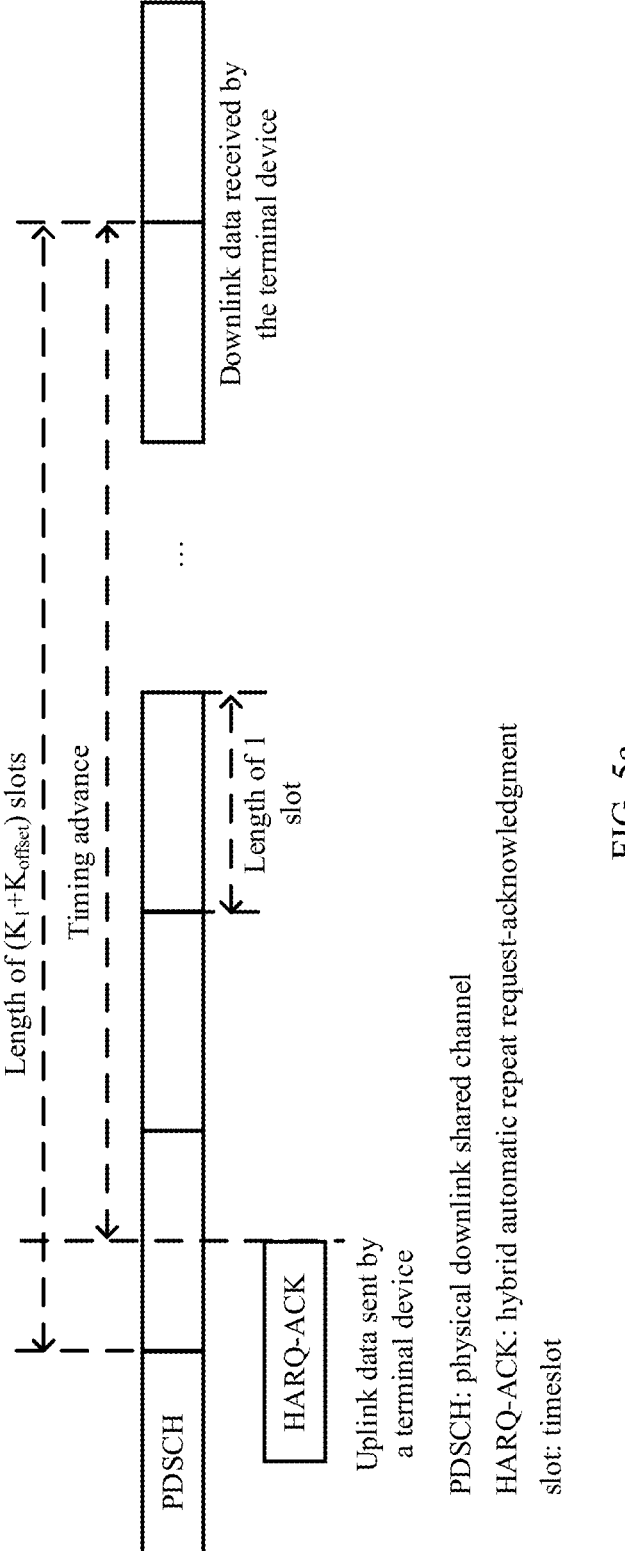

A solution to this problem is to introduce a timing offset $K_{offset}$ so that there is enough time between a moment of receiving the PDSCH data by the UE and a moment of sending the HARQ-ACK message by the UE to make timing advance adjustment. That is, on the satellite base station side, the HARQ-ACK message is received in slot $n+K_1+K_{offset}$. As shown in FIG. 5c, a $K_{offset}$ value is introduced, and the UE may adjust, by using the $K_{offset}$ value, a slot in which the UE sends the HARQ-ACK message, so that the UE has enough time to make timing advance adjustment.

Therefore, the following describes the method provided in this application from the following aspects. First, a method for updating a timing offset in this application is described.

Second, a method for sending a first timing offset, a method for sending a second timing offset, an effective time, an update method, and the like that are involved in the method are described. Next, a switching scenario related to this application is described. Finally, another method for updating a timing offset in this application is described.

Figure 6:
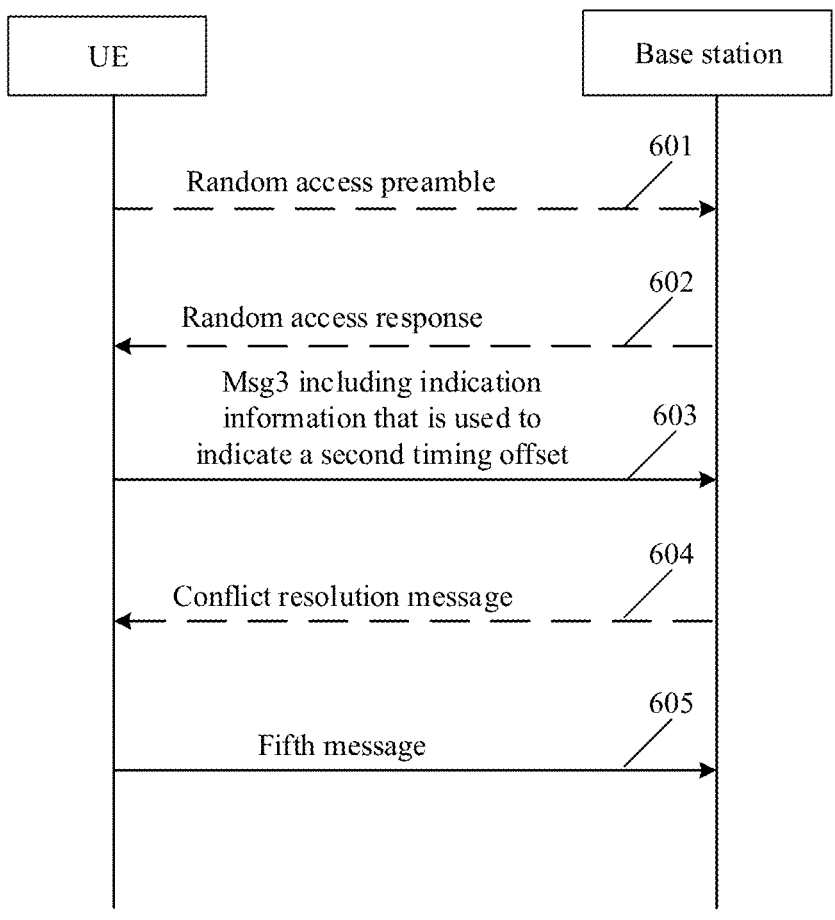
FIG. 6 is a schematic flowchart of a method for updating a timing offset according to an embodiment of this application.

FIG. 6 is a schematic flowchart of a method for updating a timing offset according to this application. In an embodiment, the method is applicable to a four-step random access scenario. As shown in FIG. 6, the method includes the following operations.

603: UE sends a third message (Msg3) to a base station based on a first timing offset $K_{offset1}$ The first timing offset is used to indicate a delay degree of delay of sending the third message by the UE, the third message includes indication information, the indication information is used to indicate a second timing offset, and the second timing offset is an updated first timing offset.

Correspondingly, the base station receives, based on the first timing offset, the third message sent by the UE. The first timing offset is used to indicate a delay degree of delay of receiving the third message by the base station.

That UE sends a third message to a base station based on a first timing offset may be understood as follows: For example, if the UE receives an RAR message in slot n in which the base station sends a signal, the UE sends the third message in slot $n+K_2+\Delta+K_{offset1}$ of sending a signal to the base station. Similarly, the base station receives the third message in slot $n+K_2+\Delta+K_{offset1}$ in which the UE sends the signal. $K_2$ is a parameter indicated by the base station to the UE through broadcast or downlink control information (DCI), and $\Delta$ is a value agreed upon in advance by the system. Specific values or sources of $K_2$ and A are not limited in this application.

The first timing offset may also be referred to as an initial timing offset. In an embodiment, the UE may obtain the first timing offset from a broadcast message. Alternatively, the UE may determine the first timing offset based on a related adjustment parameter broadcast in the broadcast message. It may be understood that for a method for obtaining the first timing offset by the UE based on the related adjustment parameter, refer to the following. Details are not described herein. For how the UE indicates the second timing offset to the base station, refer to the following description.

In an embodiment, before the foregoing operation 603, the method shown in FIG. 6 further includes the following operations.

601: The UE sends a first message (Msg1) to the base station, where the first message includes a random access preamble.

Correspondingly, the satellite base station receives the first message sent by the UE.

In embodiments of this application, in a satellite transparent scenario, the base station is equivalent to the ground station shown in FIG. 3. In a satellite regenerative scenario, the base station is equivalent to the satellite base station shown in FIG. 3.

602: The base station sends a second message (Msg2) to the UE, where the second message includes a random access response (RAR) message.

Correspondingly, the UE receives the second message sent by the base station.

In an embodiment, before operation 605, the method shown in FIG. 6 further includes the following operation.

604: The base station sends a fourth message to the UE, where the fourth message includes a random access contention resolution message.

Correspondingly, the UE receives the fourth message.

After the UE receives the second message sent by the base station, the UE may obtain a timing advance (that is, a TA value or TA_New) based on a timing advance command included in the second message and a common timing advance (or a timing advance previously used by the UE). Further, the UE performs timing advance adjustment on the sent signal based on the timing advance. Further, the UE may determine the second timing offset based on the timing advance. In an embodiment, the timing advance TA_New and the second timing offset may meet the following formula (1):

$$K_{offset2}=\lceil TA\_New/slot\_duration \rceil \qquad (1)$$

TA_New is a timing advance used when the UE sends the third message; slot_duration is the unit of duration; the symbol $\lceil \cdot \rceil$ indicates rounding up. It may be understood that the unit of duration may be a slot length, such as a slot length of uplink data or a slot length of downlink data. Alternatively, the unit of duration may be any one of 0.5 ms, 1 ms, a symbol length, a subframe length, a frame length, or the like.

In an embodiment, considering an impact of a processing delay and an altitude at which the UE is located, when the second timing offset is being calculated, a fixed value such as $\Delta t$ may be added to or subtracted from TA_New, that is, $K_{offset2}=\lceil (TA\_New+\Delta t)/slot\_duration \rceil$. $\Delta t$ is a time value, which may be a value specified in advance by using a protocol. A dimension of $\Delta t$ can be different from that of TA_New. Alternatively, a fixed value such as $\Delta D$ is added or subtracted based on $K_{offset2}$, that is, $K_{offset2}=\lceil (TA\_New+\Delta t)/slot\_duration \rceil+\Delta D$. $\Delta D$ is an integer, and may be a value specified in advance by using a protocol.

It may be understood that, in the formula (1), rounding up is used as an example to describe a relationship between the timing advance and the second timing offset. In specific implementation, the second timing offset may be alternatively determined in a rounding down manner.

It may be understood that the foregoing description of rounding up and down is also applicable to the following.

After the UE obtains the second timing offset according to the formula (1), in some embodiments, the UE may determine, based on an update threshold, whether to update the first timing offset by using the second timing offset. For example, the update threshold is 1. If a difference between the timing offset obtained according to the formula (1) and the first timing offset is less than or equal to 1, the UE may determine not to update the first timing offset. On the contrary, if the difference between the timing offset obtained according to the formula (1) and the first timing offset is greater than or equal to 1, the UE may determine to update the first timing offset, and the timing offset obtained according to the formula (1) is the second timing offset. It may be understood that, the description about whether the UE updates the first timing offset when the update threshold is 1 is not limited in this application. For another example, the update threshold may be 2 or the like. When the value of the update threshold is relatively large, a frequency of updating the first timing offset decreases. Therefore, signaling overheads can be reduced, and it is avoided that the indication information is frequently carried by using the third message and another message in an RRC connection phase.

Further, after the UE determines to update the first timing offset, the UE sends the indication information to the base station, and the base station receives the indication information sent by the UE.

It may be understood that the update threshold may be preset by the base station or preset according to a protocol. Alternatively, the UE may obtain the update threshold by using a broadcast message. The broadcast message may include any one or more of a system information block (SIB) 1, a master information block (MIB), or other system information (OSI). Alternatively, the UE may obtain the update threshold by using any one or more of a radio resource control (RRC) message, downlink control information (DCI), group DCI, media access control (MAC), or a timing advance command (TAC). In an embodiment, in addition to obtaining the update threshold by using a broadcast message or a unicast message, the UE may further obtain the update threshold in a multicast manner. Optionally, the update threshold may alternatively be transmitted together with data or carried in a separately allocated PDSCH.

The foregoing is only an example. A manner in which the UE obtains the update threshold and a specific value of the update threshold are not limited in this application.

After the UE obtains the second timing offset according to the formula (1), in other embodiments, after the UE sends the indication information to the base station, the base station may further determine, based on the update threshold, whether to update the first timing offset by using the second timing offset. For how to perform updating by the base station, refer to the description of the UE. Details are not described herein again.

In an embodiment, after the base station determines to update the first timing offset, the base station may further send, to the UE by using a Msg4 message, the second timing offset, a variation between the second timing offset and a reference timing offset, or an adjustment parameter used to indicate the second timing offset. The reference timing offset is a timing offset that is being used by the UE, or a timing offset configured by the base station (for example, a timing offset configured by using a broadcast message), or a preset fixed timing offset. The timing offset currently used by the UE is, for example, the foregoing first timing offset. The preset timing offset may be understood as: The reference timing offset is preset by the base station, or preset according to a protocol, or the like. It may be understood that the description of the reference timing offset is also applicable to the reference timing offset that appears in the following in this application.

For example, if the reference timing offset is 20 and the second timing offset is 21, the variation may be +1. For another example, if the reference timing offset is 20 and the second timing offset is 19, the variation may be −1. Alternatively, the variation may be 0. The foregoing example is shown by using the second timing offset minus the reference timing offset as an example. However, in embodiments of this application, the variation may alternatively be obtained by using the reference timing offset minus the second timing offset.

It should be noted that the adjustment parameter that is included in the Msg4 and that indicates the second timing offset may be different from an adjustment parameter that is included in the third message and that is used to indicate the second timing offset. For example, the first adjustment parameter that is in the third message and that is used to indicate the second timing offset may be a timing advance used by the UE to send the third message, and the adjustment parameter that is included in the Msg4 and that indicates the second timing offset may be some adjustment parameters related to a difference between the second timing offset and the first timing offset. Further, after receiving the second timing offset, the adjustment parameter indicating the second timing offset, or the variation between the second timing offset and the reference timing offset that is included in the Msg4, the UE may update the first timing offset. After the second timing offset takes effect, the UE may send a fifth message based on the second timing offset.

For a more vivid description of the method in which the UE or the base station determines, based on the update threshold, whether to update the first timing offset by using the second timing offset, the following uses an example for description.

For example, the second timing offset obtained by the UE according to the formula (1) is 15, the first timing offset is 14, and the update threshold is 2. When the UE determines whether to update the first timing offset by using the second timing offset, because a difference between the first timing offset and the second timing offset is less than 2, the UE may determine not to update the first timing offset. Therefore, to save signaling overheads, the UE may not send indication information to the base station. In a case in which the base station determines whether to update the first timing offset by using the second timing offset, the UE may indicate that the second timing offset is 15 by using indication information. Therefore, after the base station receives the indication information, the base station may determine not to update the first timing offset based on the fact that a difference between the first timing offset and the second timing offset is less than 2, and the update threshold is 2. Further, the Msg4 may not include the second timing offset.

For example, the second timing offset obtained by the UE according to the formula (1) is 17, the first timing offset is 14, and the update threshold is 2. When the UE determines whether to update the first timing offset by using the second timing offset, because a difference between the first timing offset and the second timing offset is greater than 2, the UE may determine to update the first timing offset. Further, the UE sends indication information to the base station. In a case in which the base station determines whether to update the first timing offset by using the second timing offset, the UE may indicate that the second timing offset is 17 by using indication information. Therefore, after the base station receives the indication information, the base station may determine to update the first timing offset based on the fact that a difference between the first timing offset and the second timing offset is greater than 2, and the update threshold is 2. Further, the Msg4 may include the second timing offset.

It may be understood that the foregoing is merely an example, and the number in the foregoing is not to be understood as a limitation of this application.

605: The UE sends the fifth message to the base station based on the second timing offset.

Correspondingly, the base station receives the fifth message.

The fifth message may include a HARQ-ACK message, and the HARQ-ACK message may be a HARQ-ACK message of the fourth message. Alternatively, the fifth message may further include an uplink data message, an uplink reference signal (for example, a sounding reference signal), or the like.

It may be understood that for description of sending the fifth message to the base station by the UE based on the second timing offset, refer to description of sending the third message to the base station by the UE based on the first timing offset. Details are not described herein again. For description of an effective time of the second timing offset, refer to the following.

According to the technical solutions provided in this application, in one aspect, a timing offset is set, so that the UE has enough time to make timing advance adjustment; in another aspect, the timing offset is updated, for example, the first timing offset or the second timing offset is updated, so that the UE can use an appropriate timing offset. Compared with a manner in which a timing offset is not updated, the embodiments of this application can reduce an end-to-end delay and avoid a resource waste on the basis of ensuring that the UE has enough time to make timing advance adjustment.

Figure 7A:
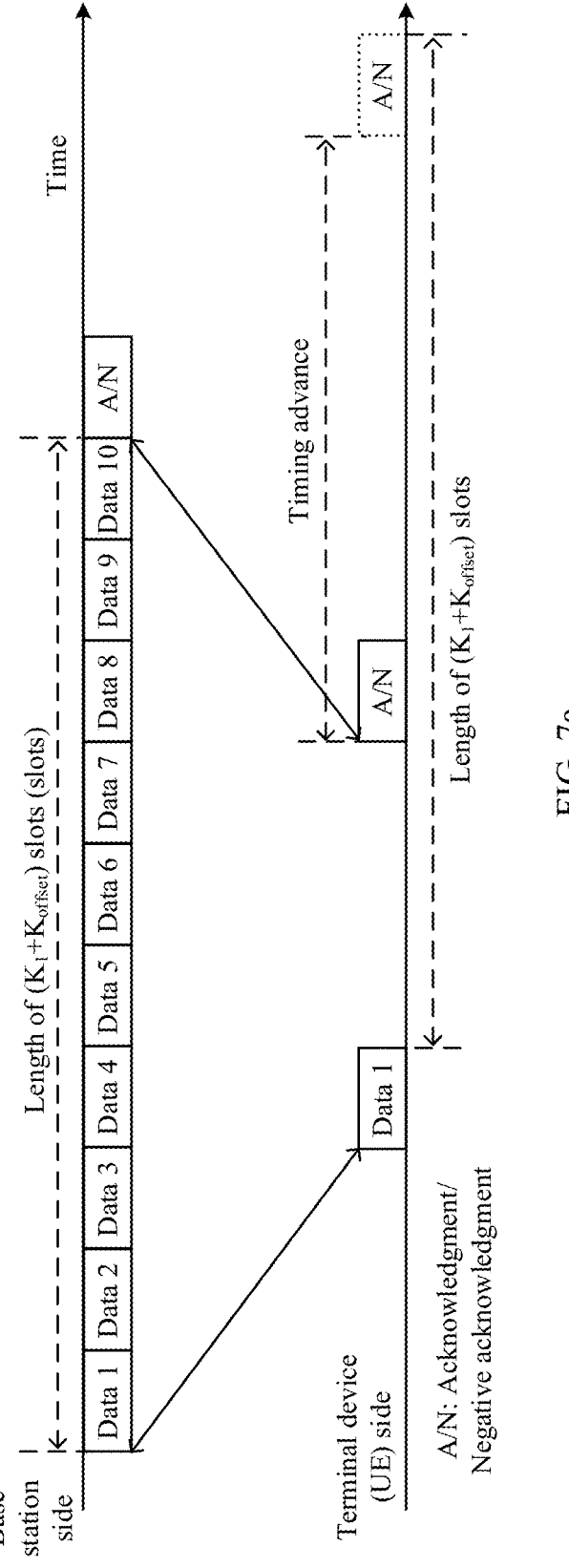
FIG. 7$a$ is a schematic diagram of a relationship between a timing advance and a signal according to an embodiment of this application.

For example, in the NTN system, a relative distance between an LEO satellite and UE varies all the time, which also means that a round-trip delay varies all the time. If a timing offset $K_{offset}$ is not updated, the UE needs to use a relatively large $K_{offset}$ value to ensure normal communication. Therefore, if $K_{offset}$ is not updated, a delay length $(K_1+K_{offset}$ shown in FIG. 7a) by which the UE delays sending a feedback message may be much greater than a timing advance. As shown in FIG. 7a, after sending data 1, the base station continues to send data 2 to 10 before receiving a HARQ-ACK (in the figure, A/N represents an ACK or a NACK) of the data 1, so as to fill the entire time domain resource. Therefore, the base station needs to use 10 processes to avoid a waste of time domain resources.

Figure 7B:
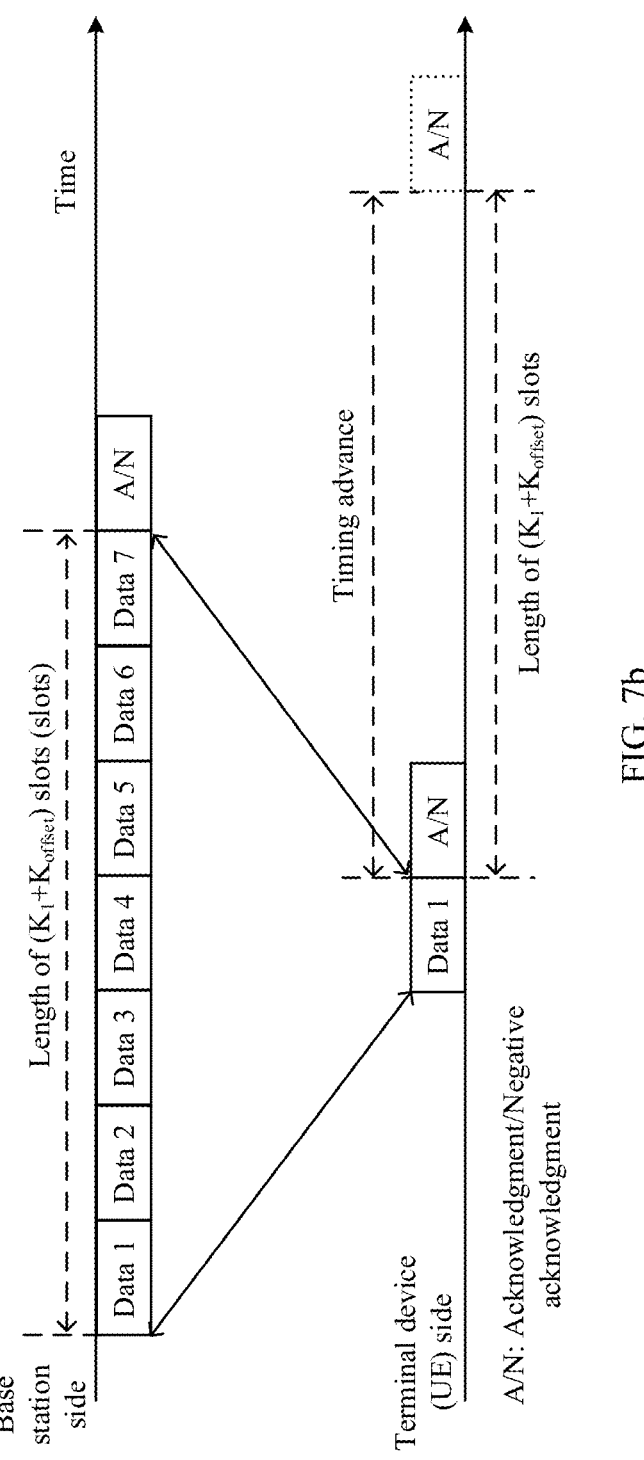

If $K_{offset}$ can be updated, the delay length for the UE to delay sending the HARQ-ACK is not much greater than the timing advance used by the UE. As shown in FIG. 7b, the UE uses a relatively proper $K_{offset}$. In this case, a quantity of downlink processes on the base station side may be reduced to seven. In addition, after $K_{offset}$ is updated, the base station can receive the HARQ-ACK feedback by waiting for six data lengths after sending the data 1. Compared with waiting for nine data lengths before the update, an end-to-end delay is reduced. Therefore, the solutions in this application can reduce a quantity of processes for sending downlink data by the base station, and can reduce an end-to-end delay.

It may be understood that if the timing offset $K_{offset}$ shown in this application is not otherwise specified, the timing offset may include the first timing offset $K_{offset1}$, the second timing offset $K_{offset2}$, an updated second timing offset, or the like. That is, the timing offset $K_{offset}$ is a general term and has no special meaning.

The following describes in detail another method that may be involved in the method shown in FIG. 6.

It may be understood that the following methods may be mutually referenced, or the methods may be further combined, and the solutions fall within the protection scope of this application.

A method for obtaining the first timing offset from the broadcast message by the UE is as follows.

For example, the base station determines the timing offset based on a maximum round-trip delay, for example, $K_{offset1}=\lceil\text{max\_RTD/slot\_duration}\rceil$.

Herein, max_RTD represents a round-trip delay of a point farthest from the base station in a beam or a cell area that is covered by the base station, that is, a maximum round-trip delay. In this case, quantities of bits (bit) for transmitting the timing offset in different scenarios are shown as follows.

It may be understood that, in the following example, a subcarrier spacing is 120 KHz. If the unit of duration slot_duration is a slot length, the unit of duration is 0.125 ms.

In a GEO transparent scenario, a cell diameter D=200 km, a maximum round-trip delay is 541.1 ms, and a maximum value of $K_{offset}$ that needs to be indicated is 541.1/0.125=4329=13 bits.

In a GEO regenerative scenario, a cell diameter D=200 km, a maximum round-trip delay is 270.5 ms, and a maximum value of $K_{offset}$ that needs to be indicated is 270.5/0.125=2164=12 bits.

In an LEO-1200 transparent scenario, a cell diameter D=100 km, a maximum round-trip delay is 25.8 ms, and a maximum value of $K_{offset}$ that needs to be indicated is 41.7/0.125=334=9 bits.

In an LEO-1200 regenerative scenario, a cell diameter D=100 km, a maximum round-trip delay is 12.9 ms, and a maximum value of $K_{offset}$ that needs to be indicated is 20.9/0.125=168=8 bits.

In an LEO-600 transparent scenario, a cell diameter D=100 km, a maximum round-trip delay is 25.8 ms, and a maximum value of $K_{offset}$ that needs to be indicated is 25.8/0.125=207=8 bits.

In an LEO-600 regenerative scenario, a cell diameter D=100 km, a maximum round-trip delay is 12.9 ms, and a maximum value of $K_{offset}$ that needs to be indicated is 12.9/0.125=104=7 bits.

It may be understood that the maximum round-trip delay of the transparent scenario shown above may represent a maximum round-trip delay between a reference point, a satellite, and a ground station. The maximum round-trip delay of the regenerative scenario shown above may represent a maximum round-trip delay between a reference point and a satellite. The reference point may be a reference point in a coverage area of a beam or a cell.

In an embodiment, the base station may send the value of the first timing offset to the UE in a broadcast manner. For example, the base station may obtain the value of the first timing offset through calculation by using a formula $K_{offset1}=\lceil\text{max\_RTD/slot\_duration}\rceil$. Considering an impact of a processing delay and an altitude at which the UE is located, when the first timing offset is being calculated, a fixed value such as $\Delta t$ may be added to or subtracted from max_RTD, that is, $K_{offset1}=\lceil(\text{max\_RTD}+\Delta t)/\text{slot\_duration}\rceil$. $\Delta t$ is a time value, which may be a value specified in advance by using a protocol. A dimension of $\Delta t$ can be different from that of max_RTD. Alternatively, a fixed value such as $\Delta D$ is added or subtracted based on $K_{offset1}$, that is, $K_{offset1}=\lceil(\text{max\_RTD}+\Delta t)/\text{slot\_duration}\rceil+\Delta D$. $\Delta D$ is an integer, and may be a value specified in advance by using a protocol. It may be understood that values or sources of $\Delta t$ and $\Delta D$ are not limited in this application.

It can be learned from the foregoing examples that, in different scenarios, the base station requires a relatively large quantity of bits to directly broadcast the specific value of $K_{offset1}$. Therefore, to reduce signaling overheads, the UE may obtain a related adjustment parameter from a broadcast message, so that the UE obtains the first timing offset based on the related adjustment parameter.

A method for determining the first timing offset based on the related adjustment parameter broadcast in the broadcast message is as follows.

It may be understood that in the methods of this application, to obtain the first timing offset, the UE needs to obtain one parameter or some parameters, such as SK, $\Delta K_{offset}$, $\Delta K_{offset\_time}$, $\alpha$, and $\beta$, and the base station may send the parameter to the UE in the following signaling manner.

The base station sends the foregoing parameter to the UE by using a broadcast message, where the broadcast message may include any one or more of a system information block (SIB) 1, a master information block (MIB), or other system information (OSI). Alternatively, in a radio resource control (RRC) connection phase, when the base station needs to notify the UE of a first timing offset of another cell or beam, the base station may further send the foregoing parameter to the UE by using any one or more of an RRC message, downlink control information (DCI), group DCI, media access control (MAC), or a timing advance command (TAC). In an embodiment, the base station may alternatively send the foregoing parameter together with data transmission or in a separately allocated PDSCH. In an embodiment, in addition to sending the foregoing parameter by using a broadcast message or a unicast message, the base station may further send the foregoing parameter in a multicast manner. It may be understood that the foregoing description of each parameter is also applicable to other embodiments of this application.

Method 1

Generally, the UE receives, by using a preset receive window, RAR-related information delivered by the base station. However, a round-trip delay in satellite communication is relatively large. Therefore, after sending the random access preamble, the UE starts the receive window for detecting the RAR-related information after a specific time delay. Theoretically, the startup delay duration of the RAR receive window is related to a round-trip delay of a point closest to the base station in the beam/cell covered by the base station, that is, a minimum round-trip delay. The timing offset is related to the maximum round-trip delay of the beam/cell covered by the base station. The startup delay duration of the RAR receive window may be notified by the base station to the UE. Therefore, to save signaling overheads, the first timing offset may be determined based on the startup delay duration of the RAR receive window.

In an embodiment, the first timing offset and the startup delay duration of the RAR receive window may meet the following formula (2):

$$K_{offset1}=\lceil S_K*\text{RAR\_delay})/\text{slot\_duration}\rceil \qquad (2)$$

$K_{offset1}$ is the first timing offset; $S_K$ is a scale factor, and the scale factor is a non-negative number; RAR_delay is the startup delay duration of the RAR receive window; slot_duration is the unit of duration.

In an embodiment, the first timing offset and the startup delay duration of the RAR receive window may meet the following formula (3):

$$K_{offset1}=\lceil \text{RAR\_delay/slot\_duration}\rceil+\Delta K_{offset} \qquad (3)$$

$\Delta K_{offset}$ is a timing offset difference, and the timing offset difference is an integer.

For example, the base station may determine the value of the first timing offset $K_{offset1}$ based on the coverage area of the beam/cell, for example, according to the foregoing formula $K_{offset1}=\lceil \text{max\_RTD/slot\_duration}\rceil$. Then, the base station substitutes $K_{offset1}$ and RAR_delay into the formula (3) based on a value of RAR_delay that is broadcast by the base station to the UE, to obtain the value of $\Delta K_{offset}$. The base station may send the value of $\Delta K_{offset}$ to the UE in a broadcast manner. Correspondingly, the UE receives the values of RAR_delay and $\Delta K_{offset}$, and substitutes the values of RAR_delay and $\Delta K_{offset}$ into the formula (3) to obtain the value of the first timing offset. Herein, slot_duration may be specified according to a protocol in advance or stipulated according to a protocol. It may be understood that the foregoing methods for obtaining and using $\Delta K_{offset}$ by the base station and the UE are also applicable to the parameter $S_K$, and parameters used to derive the first timing offset in formulas described below.

In an embodiment, the first timing offset and the startup delay duration of the RAR receive window may meet the following formula (4):

$$K_{offset1}=\lceil \text{RAR\_delay}+\Delta K_{offset\_time})/\text{slot\_duration}\rceil \qquad (4)$$

$\Delta K_{offset\_time}$ is a duration difference, and the duration difference may be a positive number, a negative number, or 0. Further, a dimension of the duration difference may be different from RAR_delay, so that signaling overheads can be reduced.

It may be understood that a value of the duration difference may be any value, such as a positive number, a negative number, or 0.

In an embodiment, the first timing offset and the startup delay duration of the RAR receive window may meet the following formula (5):

$$K_{offset1}=\lceil S_K*\text{RAR\_delay}+\Delta K_{offset\_time})/\text{slot\_duration}\rceil+\Delta K_{offset} \qquad (5)$$

It may be understood that for descriptions of parameters in the formula (5), refer to the formulas (2), (3), and (4).

It may be understood that, a relationship between the first timing offset and the startup delay duration of the RAR receive window may be in different forms based on the foregoing parameters, which is not limited in this application. For example, according to the formula (2) and the formula (3), the first timing offset and the startup delay duration of the RAR receive window may further meet, for example, $K_{offset1}=\lceil S_K*\text{RAR\_delay/slot\_duration}\rceil+\Delta K_{offset}$.

Method 2

The UE receives, by using a preset receive window, the RAR-related information delivered by the base station. Therefore, the base station needs to notify the UE of duration of the RAR receive window (RAR_window). After sending the preamble, the UE detects the RAR-related information in the duration of the RAR receive window. Theoretically, the duration of the RAR receive window is related to a round-trip delay difference in a beam/cell covered by the base station. Therefore, to save signaling overheads, the first timing offset may be determined based on the duration of the RAR receive window.

In an embodiment, the first timing offset and the duration of the RAR receive window may meet the following formula (6):

$$K_{offset1}=\lceil S_K*\text{RAR\_window})/\text{slot\_duration}\rceil \qquad (6)$$

In an embodiment, the first timing offset and the duration of the RAR receive window may meet the following formula (7):

$$K_{offset1}=\lceil \text{RAR\_window/slot\_duration}\rceil+\Delta K_{offset} \qquad (7)$$

In an embodiment, the first timing offset and the duration of the RAR receive window may meet the following formula (8):

$$K_{offset1}=\lceil \text{RAR\_window}+\Delta K_{offset\_time})/\text{slot\_duration}\rceil \qquad (8)$$

In an embodiment, the first timing offset and the duration of the RAR receive window may meet the following formula (9):

$$K_{offset1}=\lceil S_K*\text{RAR\_window}+\Delta K_{offset\_time})/\text{slot\_duration}\rceil+\Delta K_{offset} \qquad (9)$$

It may be understood that, a relationship between the first timing offset and the duration of the RAR receive window may be in different forms based on the foregoing parameters, which is not limited in this application. For example, another derivation formula is obtained, and the first timing offset and the duration of the RAR receive window may meet, for example, $K_{offset1}=\lceil S_K*\text{RAR\_window/slot\_duration}\rceil+\Delta K_{offset}$.

It may be understood that for descriptions of parameters in the formulas in the method 2, refer to the parameters shown in Method 1.

Method 3

With reference to Method 1 and Method 2, because the base station not only needs to notify the UE of the duration of the RAR receive window, but also needs to notify the UE of the startup delay duration of the RAR receive window, the first timing offset may alternatively be determined based on the duration of the RAR receive window and the startup delay duration of the RAR receive window.

In an embodiment, the first timing offset, the duration of the RAR receive window, and the startup delay duration of the RAR receive window may meet the following formula (10):

$$K_{offset1}=\lceil(\text{RAR\_window}+\text{RAR\_delay}+\Delta K_{offset\_time})/\text{slot\_duration}\rceil \quad (10)$$

In an embodiment, the first timing offset, the duration of the RAR receive window, and the startup delay duration of the RAR receive window may meet the following formula (11):

$$K_{offset1}=\lceil \text{RAR\_window}+\text{RAR\_delay})/\text{slot\_duration}\rceil+\Delta K_{offset} \quad (11)$$

It may be understood that another method for deriving the first timing offset may be obtained by modifying the formula (10) and the formula (11) based on the parameters shown in Method 1 and Method 2, for example, $K_{offset1}=\lceil S_K*(\text{RAR\_window}+\text{RAR\_delay})/\text{slot\_duration}\rceil$ or $K_{offset1}=\lceil S_K*(\text{RAR\_window}+\text{RAR\_delay})/\text{slot\_duration}\rceil+\Delta K_{offset}$.

It may be understood that for descriptions of the parameters in the formulas in the method 3, refer to the parameters shown in the method 1 and the method 2.

Method 4

In a four-step random access process, after sending the Msg3, the UE starts a random access contention resolution timer (ra-ContentionResolutionTimer), and starts to detect the Msg4. If the Msg4 is successfully received before the random access contention resolution timer expires, the access is considered successful. For example, a value range of the random access contention resolution timer includes {8 ms, 16 ms, 24 ms, 32 ms, 40 ms, 48 ms, 56 ms, 64 ms}. A round-trip delay in the NTN is relatively large, for example, a round-trip delay in a GEO scenario is approximately 250 ms. In this case, a startup delay time needs to be introduced for the random access contention resolution timer to ensure that the Msg4 is received before the timer expires. Theoretically, the startup delay duration of the random access contention resolution timer is related to a round-trip delay of a point closest to the base station in a beam/cell covered by the base station, that is, a minimum round-trip delay. Generally, the base station may send the startup delay duration RCR_offset of the random access contention resolution timer to the UE by using the SIB 1. To save signaling overheads, the first timing offset may be determined based on the startup delay duration of the random access contention resolution timer.

In an embodiment, the first timing offset and the startup delay duration of the random access contention resolution timer may meet the following formula (12):

$$K_{offset1}=\lceil S_K*\text{RCR\_offset})/\text{slot\_duration}\rceil \quad (12)$$

In an embodiment, the first timing offset and the startup delay duration of the random access contention resolution timer may meet the following formula (13):

$$K_{offset1}=\lceil \text{RCR\_offset/slot\_duration}\rceil+\Delta K_{offset} \quad (13)$$

In an embodiment, the first timing offset and the startup delay duration of the random access contention resolution timer may meet the following formula (14):

$$K_{offset1}=\lceil(\text{RCR\_offset}+\Delta K_{offset\_time})/\text{slot\_duration}\rceil \quad (14)$$

In an embodiment, the first timing offset and the startup delay duration of the random access contention resolution timer may meet the following formula (15):

$$K_{offset1}=\lceil(S_K*\text{RCR\_offset}+\Delta K_{offset\_time})/\text{slot\_duration}\rceil+\Delta K_{offset} \quad (15)$$

It may be understood that, for a derivation relationship between the first timing offset and the startup delay duration of the random access contention resolution timer, another derivation formula may be obtained by using the foregoing parameters, for example, $K_{offset1}=S_K*\text{RCR\_offset/slot\_duration}\rceil+\Delta K_{offset}$.

It may be understood that for descriptions of the parameters in the formulas in Method 4, refer to the parameters shown in the foregoing method.

Method 5

Similarly, the base station notifies the UE of the duration of the random access contention resolution timer RCR_timer. Theoretically, the duration of the random access contention resolution timer is related to a round-trip delay difference in a beam/cell covered by the base station. Therefore, to save overheads, the first timing offset may be determined based on the duration of the random access contention resolution timer.

In an embodiment, the first timing offset and the duration of the random access contention resolution timer may meet the following formula (16):

$$K_{offset1}=\lceil(S_K*\text{RCR\_timer})/\text{slot\_duration}\rceil \quad (16)$$

In an embodiment, the first timing offset and the duration of the random access contention resolution timer may meet the following formula (17):

$$K_{offset1}=\lceil \text{RCR\_timer/slot\_duration}\rceil+\Delta K_{offset} \quad (17)$$

In an embodiment, the first timing offset and the duration of the random access contention resolution timer may meet the following formula (18):

$$K_{offset1}=\lceil \text{RCR\_timer}+\Delta K_{offset\_time})/\text{slot\_duration}\rceil \quad (18)$$

In an embodiment, the first timing offset and the duration of the random access contention resolution timer may meet the following formula (19):

$$K_{offset1}=\lceil S_K*\text{RCR\_timer}+\Delta K_{offset\_time})/\text{slot\_duration}\rceil+\Delta K_{offset} \quad (19)$$

It may be understood that, for a derivation relationship between the first timing offset and the duration of the random access contention resolution timer, another derivation formula may be obtained by using the foregoing parameters, for example, $K_{offset1}=\lceil S_K*\text{RCR\_timer/slot\_duration}\rceil+\Delta K_{offset}$.

It may be understood that for descriptions of the parameters in the formulas in Method 5, refer to the parameters shown in the foregoing method.

Method 6

With reference to Method 4 and Method 5, because the base station not only needs to notify the UE of the duration of the random access contention resolution timer, but also needs to notify the UE of the startup delay duration of the random access contention resolution timer, the first timing offset may alternatively be determined based on the duration of the random access contention resolution timer and the startup delay duration of the random access contention resolution timer.

In an embodiment, the first timing offset, the duration of the random access contention resolution timer, and the startup delay duration of the random access contention resolution timer may meet the following formula (20):

$$K_{offset1}=\lceil RCR\_offset+RCR\_timer+\Delta K_{offset\_time})/ slot\_duration\rceil \qquad (20)$$

In an embodiment, the first timing offset, the duration of the random access contention resolution timer, and the startup delay duration of the random access contention resolution timer may meet the following formula (21):

$$K_{offset1}=\lceil RCR\_offset+RCR\_timer)/slot\_duration\rceil+ \Delta K_{offset} \qquad (21)$$

It may be understood that another method for deriving the first timing offset may be obtained by modifying the formula (20) and the formula (21) based on the parameters shown in Method 1 and Method 2, for example, $K_{offset1}=\lceil S_K*(RCR\_offset+RCR\_timer)/slot\_duration\rceil$ or $K_{offset1}\lceil S_K*(RCR\_offset+RCR\_timer)/slot\_duration\rceil+\Delta K_{offset}$.

It may be understood that for descriptions of the parameters in the formulas in Method 6, refer to the parameters shown in the foregoing method.

Method 7

In an initial access phase, to provide a timing advance used for sending a random access preamble for UE that does not have a positioning function, the base station broadcasts a common timing advance (common TA) to a beam or a cell, and the UE determines, by using the common timing advance, a timing advance used for sending the random access preamble. The common timing advance may be calculated in the following manner: selecting a reference point in a coverage area of a beam or a cell (a point closest to the base station may be selected) and calculating a round-trip delay between a reference point and a satellite (a satellite regenerative scenario), or a round-trip delay among the reference point, the satellite, and a ground station (satellite transparent scenario), and the common timing advance is equal to the round-trip delay, or equal to the round-trip delay plus/minus a fixed value. The reference point may be a point on a service link or a point on a feeder link, which is not limited herein. Similarly, the base station may send coordinates of a reference point location to the UE, and the UE obtains the common timing advance through calculation based on a round-trip delay between a satellite location and the reference point location. The common timing advance may be a positive value or a negative value.

For UE that has a positioning function, the UE may obtain, through calculation based on location information of the UE and location information of the satellite (which may be obtained from ephemeris information), a timing advance that can be used for sending a random access preamble. However, the UE that has a positioning function may still obtain a common timing advance that the base station broadcasts to a beam or a cell.

Therefore, the first timing offset may be obtained based on the common timing advance TA_common.

In an embodiment, the first timing offset and the common timing advance TA_common may meet the following formula (22):

$$K_{offset1}=\lceil S_K*TA\_common)/slot\_duration\rceil \qquad (22)$$

In an embodiment, the first timing offset and the common timing advance may meet the following formula (23):

$$K_{offset1}=\lceil TA\_common/slot\_duration\rceil+\Delta K_{offset} \qquad (23)$$

In an embodiment, the first timing offset and the common timing advance may meet the following formula (24):

$$K_{offset1}=\lceil (TA\_common+\Delta K_{offset\_time})/slot\_duration\rceil \qquad (24)$$

In an embodiment, the first timing offset and the common timing advance may meet the following formula (25):

$$K_{offset1}=\lceil S_K*TA\_common+\Delta K_{offset\_time})/slot\_duration\rceil+\Delta K_{offset} \qquad (25)$$

It may be understood that, for a derivation relationship between the first timing offset and the common timing advance, another derivation formula may be further obtained by using the foregoing parameters, for example, $K_{offset1}=\lceil S_K*TA\_common/slot\_duration\rceil+\Delta K_{offset}$.

It may be understood that for descriptions of the parameters in the formulas in Method 7, refer to the foregoing method.

Method 8

The first timing offset may alternatively be determined based on an orbital height H of the satellite. The orbital height of the satellite is related to the minimum round-trip delay of the coverage area of the base station. The orbital height may be a round-trip delay of a subsatellite point in FIG. 8a. The orbital height of the satellite may be obtained from ephemeris information.

In an embodiment, the first timing offset and the orbital height H may meet the following formula (26):

$$K_{offset1}=\lceil S_K*2*H/c)/slot\_duration\rceil \qquad (26)$$

H is the orbital height, and c is the speed of light.

In an embodiment, the first timing offset and the orbital height H may meet the following formula (27):

$$K_{offset1}=\lceil 2*H/c/slot\_duration\rceil+\Delta K_{offset} \qquad (27)$$

In an embodiment, the first timing offset and the orbital height H may meet the following formula (28):

$$K_{offset1}=\lceil 2*H/c+\Delta K_{offset\_time})/slot\_duration\rceil \qquad (28)$$

In an embodiment, the first timing offset and the orbital height H may meet the following formula (29):

$$K_{offset1}=\lceil S_K*2*H/c+\Delta K_{offset\_time})/slot\_duration\rceil\Delta K_{offset} \qquad (29)$$

It may be understood that, for a derivation relationship between the first timing offset and the orbital height, another derivation formula may be further obtained by using the foregoing parameters, for example, $K_{offset1}=\lceil S_K*2*H/c/slot\_duration\rceil+\Delta K_{offset}$.

It may be understood that, for the transparent mode, there may be two delays: a delay on the feeder link and a delay on the service link. Therefore, the formula (26) to the formula

(29) and the deformation formula may be further optimized, that is, **2\*H/c** is replaced with 4\*H/c.

It may be understood that for descriptions of the parameters in the formulas in Method 8, refer to the foregoing method.

Method 9

Figure 8A:
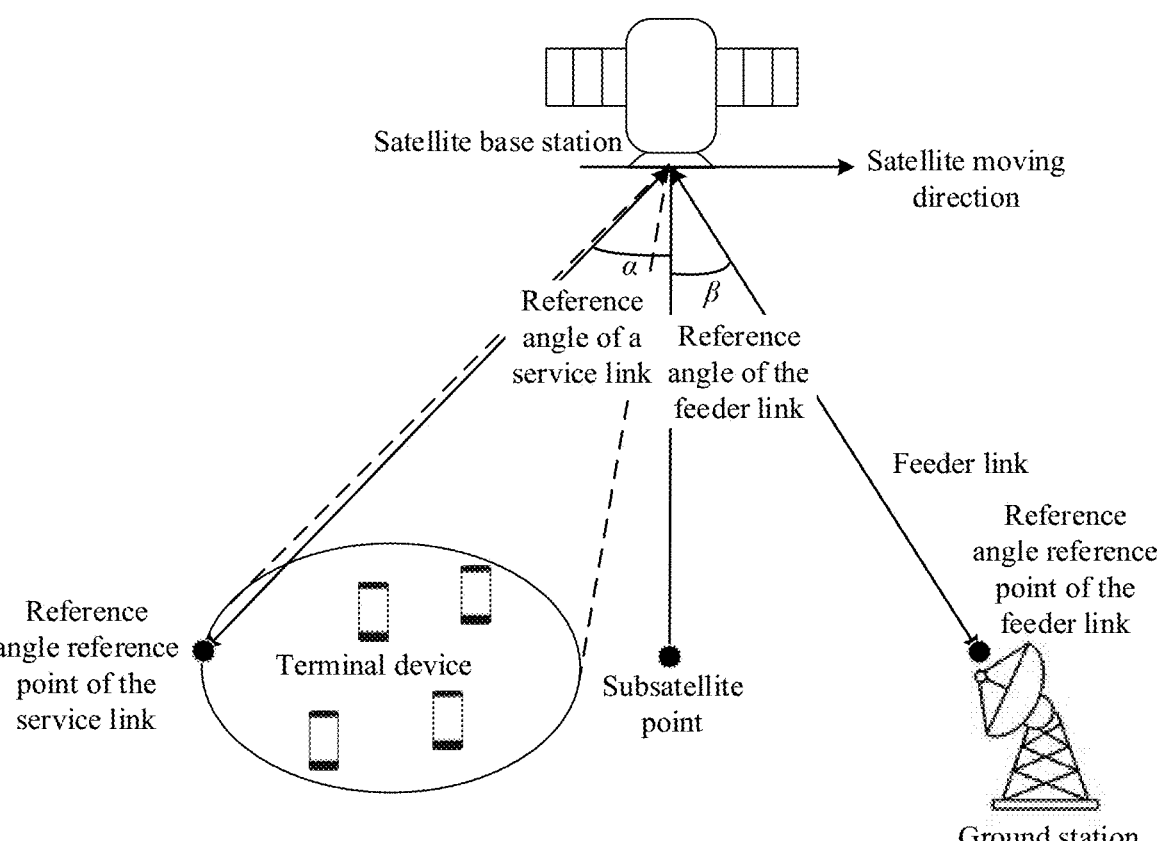
FIG. 8$a$ is a schematic diagram of reference angles of a service link and a feeder link according to an embodiment of this application.

The base station sends a reference angle of the service link and/or the reference angle of the feeder link corresponding to the coverage beam/cell to the UE. As shown in FIG. 8a, the reference angle of the service link may be determined based on an angle formed by a reference angle reference point of the service link, the satellite, and the subsatellite point, and the reference angle reference point of the service link may be a point that is farthest from the satellite and that is in the coverage beam/cell range (or the reference point location is determined based on a specific network deployment). The subsatellite point is a point at which a connection line between the satellite and the earth's center intersects with the earth's surface. Therefore, the UE may calculate the round-trip delay: $2*H/\cos(a)/c$ on the service link based on the reference angle $\alpha$ of the service link.

Similarly, as shown in FIG. 8a, the base station may send a reference angle of the feeder link to the UE to calculate the round-trip delay of the feeder link. The reference angle of the feeder link can be determined based on an angle formed by a reference angle reference point of the feeder link, the satellite, and the subsatellite point. The reference angle reference point of the feeder link may be a location of the ground station. Therefore, the UE may calculate the round-trip delay: $2*H/\cos(\beta)/c$ on the feeder link based on the reference angle $\beta$ of the feeder link.

Finally, the UE may calculate $K_{offset1}$ based on the reference angle $\alpha$ of the service link and/or the reference angle $\beta$ of the feeder link that are/is sent by the base station.

In an embodiment, the first timing offset and the reference angle $\alpha$ of the service link may meet the following formula (30):

$$K_{offset1}=\lceil(2*H/\cos(\alpha)/c)/\text{slot\_duration}\rceil \quad (30)$$

In an embodiment, the first timing offset and the reference angle $\beta$ of the feeder link may meet the following formula (31):

$$K_{offset1}=\lceil(2*H/\cos(\beta)/c)/\text{slot\_duration}\rceil \quad (31)$$

In an embodiment, the first timing offset, the reference angle $\alpha$ of the service link, and the reference angle $\beta$ of the feeder link may meet the following formula (32):

$$K_{offset1}=\lceil(2*H/\cos(\alpha)/c+2*H/\cos(\beta)/c)/\text{slot\_duration}\rceil \quad (32)$$

It may be understood that, for a derivation relationship between the first timing offset and the reference angles, another derivation formula may be obtained by using other parameters in the foregoing method, for example, $K_{offset1}=\lceil2*H/\cos(\alpha)/c+2*H/\cos(\beta)/c)/\text{slot\_duration}\rceil+\Delta K_{offset}$, and $K_{offset1}=\lceil(2*H/\cos(\alpha)/c)/\text{slot\_duration}\rceil+\Delta K_{offset}$.

It may be understood that for descriptions of the parameters in the foregoing formula, refer to the foregoing methods.

In the method shown in FIG. 6, the indication information may be used to indicate the second timing offset, and a method in which the UE indicates the second timing offset to the base station includes the following methods.

Method 1

The indication information includes the second timing offset. For example, as shown in the foregoing example, the second timing offset may occupy the same quantity of bits as the first timing offset, and the quantity of bits may be 13 bits, 12 bits, 9 bits, 8 bits, or 7 bits.

Method 2

The indication information includes a first adjustment parameter set, and the first adjustment parameter set is used to determine the second timing offset. That is, the indication information includes the first adjustment parameter set, and the base station determines the second timing offset based on the first adjustment parameter set.

The first adjustment parameter set may include any one or more of the following parameters:

a parameter determined based on the second timing offset $K_{offset2}$ and the startup delay duration of the RAR receive window RAR_delay; or a parameter determined based on the second timing offset $K_{offset2}$ and the duration of the RAR receive window RAR_window; or a parameter determined based on the second timing offset $K_{offset2}$, the startup delay duration of the RAR receive window RAR_delay, and the duration of the RAR receive window RAR_window; or a parameter determined based on the second timing offset $K_{offset2}$ and the startup delay duration of the random access contention resolution timer RCR_offset; or a parameter determined based on the second timing offset $K_{offset2}$ and the duration of the random access contention resolution timer RCR_timer; or a parameter determined based on the second timing offset $K_{offset2}$, the startup delay duration of the random access contention resolution timer RCR_offset, and the duration of the random access contention resolution timer RCR_timer; or a parameter determined based on the second timing offset $K_{offset2}$ and the common timing advance TA_common; or a parameter determined based on the second timing offset $K_{offset2}$ and the orbital height H of the network device; or a parameter determined based on the second timing offset $K_{offset2}$ and the round-trip delay between the terminal device and the network device; or a parameter determined based on the second timing offset $K_{offset2}$ and the reference angle $\alpha$ of the service link; or a parameter determined based on the second timing offset $K_{offset2}$ and the reference angle $\beta$ of the feeder link; or a parameter determined based on the second timing offset $K_{offset2}$, the reference angle $\alpha$ of the service link, and the reference angle $\beta$ of the feeder link; or a timing advance used for the UE to send the third message (in different scenarios, it may also be understood a timing advance used most recently by the UE); or a difference between timing offsets, where the difference between timing offsets may be a difference between the second timing offset and a reference timing offset. The reference timing offset is a timing offset currently used by the UE or a preset timing offset. The timing offset currently used by the UE may be the foregoing first timing offset.

For example, the first adjustment parameter set includes the timing advance TA_New used for the UE to send the third message. After receiving the TA_New, the base station may determine the second timing offset according to a formula: $K_{offset2}=\lceil TA\_New/slot\_duration\rceil$.

A method for sending the TA_New to the base station by the UE is: For example, the UE sends a quantization value $N_{TA}$ of the used TA to the base station. After receiving the $N_{TA}$, the base station multiplies the $N_{TA}$ by an agreed quantization factor S to obtain a TA value (unit: second or millisecond) actually used by the UE. In this way, a signaling length representing the TA can be reduced, and signaling overheads can be reduced. For example, it is assumed that the quantization factor S is $100/(15000*2048)\approx 3.25$ us. TA_New=4 ms. The quantization value $N_{TA}$=4 ms/3.25 us≈1231. 11 bits are required. If Ts=32.5 ns used in LTE is used to quantize the TA value, 4 ms/32.5 ns≈123077, and 17 bits are required. It can be learned that six bits are saved.

For another example, to save signaling overheads, the UE may send a parameter value based on a round-trip delay of a satellite orbital height to the base station, so that the base station uses the parameter value to calculate the TA value actually used by the UE. For example, the UE sends a time amount $V_{TA}$ ($V_{TA}$ may be a positive value or a negative value) to the base station, and the base station adds a round-trip delay of a subsatellite point to the time amount $V_{TA}$ or subtracts the time amount $V_{TA}$ from the round-trip delay of the subsatellite point, to obtain the TA value used by the UE. If the satellite orbital height is H (unit: m), the round-trip delay of the subsatellite point is 2*H/c, where c indicates the speed of light $3*10^8$ m/s. The base station may obtain, through calculation, the TA value used by the UE according to a formula: TA_New=2*H/c+$V_{TA}$.

For another example, the UE sends, to the base station, a multiple value or a scale factor MTA that is related to the satellite orbital height (for example, the round-trip delay of the subsatellite point of the satellite). The base station multiplies the round-trip delay of the subsatellite point by the multiple value to obtain the TA value used by the UE. That is, the base station may obtain, through calculation, the TA value used by the UE according to a formula: TA_New=2*H/c*$M_{TA}$. For example, if the orbital height of the satellite is 600 km, the round-trip delay of the orbital height of the satellite is 600e3*2/3e8=4 ms. When the TA value used by the UE is 4.2 ms, only a time amount of $V_{TA}$=2 ms needs to be sent to the base station. The base station calculates, based on 4+0.2=4.2 ms, the TA value actually used by the UE. If the method is not used, the UE needs to send 4.2 ms to the base station, and occupies more bits. Alternatively, the UE sends, to the base station, a multiple value $M_{TA}$ based on the round-trip delay of the subsatellite point, where $M_{TA}$=4.2/4=1.05. 4.2 does not need to be sent to the base station, which saves signaling overheads.

For another example, the UE receives, by using a preset receive window, the RAR-related information delivered by the base station. Because a round-trip delay in satellite communication is relatively large, after sending the preamble, the UE starts the receive window only after a specific RAR_delay, and starts to detect the RAR-related information. The delay duration RAR_delay of the RAR receive window is notified by the base station side to the UE. Therefore, to save signaling overheads, the UE may send a parameter value based on the delay duration RAR_delay of the RAR receive window to the base station, so that the base station side calculates the TA value actually used by the UE.

For another example, to save signaling overheads, the UE may send a parameter value based on the common TA to the base station, so that the base station side calculates the TA value actually used by the UE. It may be understood that the foregoing methods may be used together. It may be understood that, in this application, a method for sending, by the UE to the base station, a timing advance used by the UE is applicable to a same method in the following. For example, in a subsequent communication process, when the UE needs to update the second timing offset, the method may be used to send, to the base station, the timing advance used by the UE.

For example, the indication information sent by the UE to the base station includes $\Delta K=K_{offset2}=K_{offset1}$, that is, $\Delta K$ represents a difference between timing offsets. Correspondingly, after receiving $\Delta K$, the base station obtains the value of $K_{offset2}$ according to a formula: $K_{offset2}=K_{offset1}+\Delta K$.

In an embodiment, the UE may send the first adjustment parameter set to the base station by using the method for obtaining the first timing offset from the broadcast message by the UE in this application. It should be noted that $K_{offset1}$ in the method for obtaining the first timing offset from the broadcast message by the UE needs to be replaced with an updated $K_{offset1}$ (that is, the second timing offset $K_{offset2}$), and the method includes the formula (2) to the formula (32) and another formula listed. The UE sends at least one parameter value of parameters such as $S_K$, $\Delta K_{offset}$, $\Delta K_{offset\_time}$, $\alpha$, and $\beta$ to the base station. Correspondingly, the base station obtains the second timing offset through calculation by using the method in formula (2) to formula (32) in the method for obtaining the first timing offset from the broadcast message by the UE.

For example, if $K_{offset1}$ in the formula (11) is replaced with $K_{offset2}$, the UE determines a value of $\Delta K_{offset}$ with reference to the formula: $K_{offset2}=\lceil RAR\_window+RAR\_delay)/slot\_duration\rceil+\Delta K_{offset}$. The indication information includes the value of $\Delta K_{offset}$, and the UE sends the value of $\Delta K_{offset}$ to the base station. Correspondingly, after receiving $\Delta K_{offset}$, the base station obtains the value of $K_{offset2}$ through calculation according to the formula: $K_{offset2}=\lceil RAR\_window+RAR\_delay)/slot\_duration\rceil+\Delta K_{offset}$.

For example, if $K_{offset1}$ in the formula (27) is replaced with $K_{offset2}$, the UE determines a value of $\Delta K_{offset}$ with reference to the formula: $K_{offset2}=2*H/c/slot\_duration\rceil+\Delta K_{offset}$. The indication information includes the value of $\Delta K_{offset}$, and the UE sends the value of $\Delta K_{offset}$ to the base station. Correspondingly, after receiving $\Delta K_{offset}$, the base station obtains the value of $K_{offset2}$ through calculation according to the formula: $K_{offset2}=\lceil 2*H/c/slot\_duration\rceil+\Delta K_{offset}$. The use of the formula herein is only an example, and is also applicable to another formula.

It may be understood that, although the symbol of $\Delta K_{offset}$ is the same as that in the foregoing (3), meanings are different. The value of $\Delta K_{offset}$ in the formula (3) may be broadcast by the base station. In the method in this application, $\Delta K_{offset}$ is obtained through deformation according to the foregoing formula (11) and formula (27), and the UE sends the value of $\Delta K_{offset}$ to the base station.

In an embodiment, the UE sends a variation value of at least one parameter value of parameters such as $S_K$, $\Delta K_{offset}$, $\Delta K_{offset\_time}$, $\alpha$, and $\beta$ to the base station, and the base station obtains the second timing offset through calculation by using the variation value.

For example, a variation value of the parameter $S_K$ sent by the UE to the base station is 0.2, and Sk sent by the UE to the base station last time is 1.3, or Sk sent by the base station to the UE last time is 1.3, or an agreed reference Sk is 1.3. In this case, the base station may obtain an updated value of $S_K$: 1.3+0.2=1.5. The base station obtains the second timing offset through calculation according to a formula $K_{offset2}=\lceil S_K*2*H/c)/\text{slot\_duration}\rceil=\lceil(1.5*2*H/c)/\text{slot\_duration}\rceil$. Use of the formula herein is merely an example, and a used formula is not limited.

In an embodiment, the indication information may further include an index number of $\Delta K_{offset}$, for example, 001. That is, different $\Delta K_{offset}$ may correspond to different index numbers. For example, refer to a table query method in the following Method 3.

In an embodiment, the indication information may further include latest location information of the UE, and the latest location information may include latest three-dimensional location coordinates. In this way, the base station side may calculate the round-trip delay between the satellite and the UE by using the position of the satellite and the position of the UE, so as to obtain the TA value TA_New that is being used by the UE, and obtain the latest timing offset, that is, $K_{offset2}$, according to a formula $K_{offset2}=\lceil \text{TA\_New}/\text{slot\_duration}\rceil$.

Method 3

In the foregoing methods, the difference between $K_{offset}$ or $K_{offset}$ and the reference timing offset may be a fixed discrete value, for example, $K_{offset}\in\{1, 3, 5, 7\}$ or $K_{offset}\in\{1.5, 3.5, 5.5, 7.5\}$. The signaling overheads of $K_{offset}$ can be reduced by setting the discrete timing offset. It may be understood that the timing offset herein may include the first timing offset, the second timing offset, the updated second timing offset, and the like.

Figure 8B:
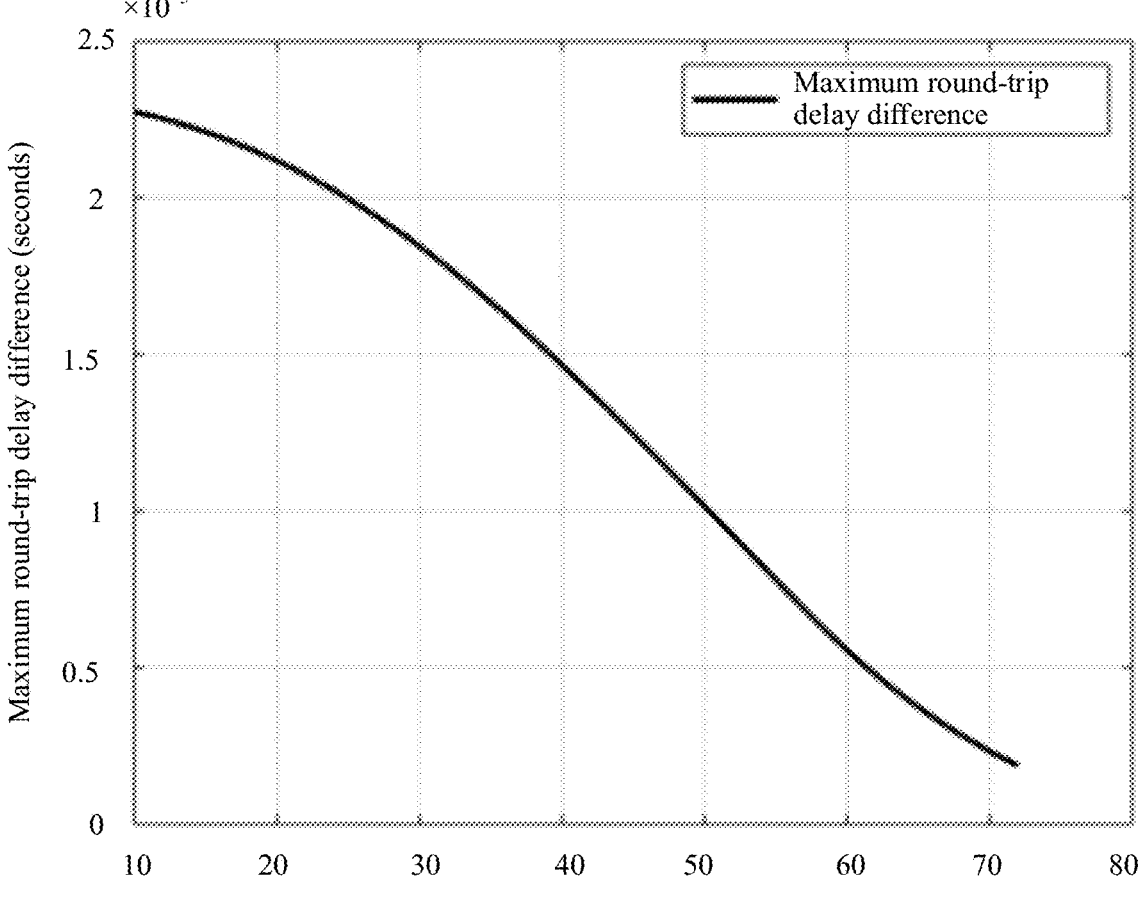

As shown in FIG. 8b, a maximum round-trip delay difference of a beam covered by the base station is 2.28 ms. If $K_{offset}$ is represented by using a slot as a unit of duration, when a subcarrier width is 120 KHz, and a minimum slot length is 0.125 ms, $K_{offset}$=2.28/0.125=18.24. In this case, the UE or the base station requires five bits to send $K_{offset}$. $K_{offset}$ is quantized, for example, $K_{offset}\in\{0, 3, 6, 9, 12, 15, 18, 21\}$, and three bits are required for the UE or the base station to send $K_{offset}$. For example, the UE or the base station may send $K_{offset}$, that is, 100, based on a mapping relationship, as shown in Table 1.

TABLE 1

| $K_{offset}$ bit representation | $K_{offset}$ value |
|---|---|
| 000 | 0 |
| 001 | 3 |
| 010 | 6 |
| 011 | 9 |
| 100 | 12 |
| 101 | 15 |
| 110 | 18 |
| 111 | 21 |

It may be understood that the foregoing mapping relationship is merely an example, and should not be construed as a limitation on this embodiment of this application. Similarly, the difference between $K_{offset}$ and the reference timing offset may also be represented by using a discrete value.

A method for indicating, by the base station, the updated first timing offset to the UE includes:

As described above, "after the base station determines to update the first timing offset, the base station may further send, to the UE by using a Msg4 message, the second timing offset, a variation between the second timing offset and a reference timing offset, or an adjustment parameter used to indicate the second timing offset.

After determining to update the first timing offset, the base station sends an adjustment parameter that is used to indicate the second timing offset to the UE. For sending the adjustment parameter, refer to the foregoing method for obtaining the first timing offset from the broadcast message by the UE and the method for indicating the second timing offset to the base station by the UE. It should be noted that $K_{offset1}$ in the method for obtaining the first timing offset from the broadcast message by the UE needs to be replaced with an updated $K_{offset1}$ (that is, the second timing offset $K_{offset2}$), and the method includes the formula (2) to the formula (32) and another formula listed. The base station sends at least one parameter value of parameters such as $S_K$, $\Delta K_{offset}$, $\Delta K_{offset\_time}$, $\alpha$, and $\beta$ to the UE. Correspondingly, the UE obtains the second timing offset through calculation by using the method in formula (2) to formula (32) in the "method for obtaining the first timing offset from the broadcast message by the UE".

For example, the adjustment parameter that is sent by the base station to the UE and used to indicate the second timing offset includes a variation value of at least one parameter value of parameters such as $S_K$, $\Delta K_{offset}$, $\Delta K_{offset\_time}$, $\alpha$, and $\beta$. Correspondingly, the UE receives the variation value, and calculates the second timing offset by using the variation value. Refer to a specific example in Method 2 in which the UE indicates the second timing offset to the base station.

A method for determining an effective time of the second timing offset includes the following methods.

Method 1

The base station sends effective information to the UE, where the effective information is used to indicate the effective time of the second timing offset, that is, a time at which the UE and the base station start to use the second timing offset. Correspondingly, the UE receives the effective information.

In an embodiment, after receiving the third message (including the indication information), the base station sends the effective information to the UE. For example, the effective information may be ACK or NACK information. After receiving the ACK information, the UE updates the timing offset at a specified time. For example, it may be agreed that the timing offset is updated immediately after the UE receives the ACK information. Alternatively, it may be agreed that the UE updates the timing offset after q slots after receiving the ACK information, where q is a non-negative integer.

In an embodiment, the effective information may alternatively be update complete information of the second timing offset ($K_{offset2}$ update complete). For an example of the method, refer to the foregoing method in which the effective information is the ACK.

Alternatively, the UE sends an updated timing offset to the base station. After receiving the updated timing offset sent by the UE, the base station may send effective information to the UE. The updated timing offset includes the updated first timing offset, that is, the second timing offset; or the updated second timing offset.

In an embodiment, the effective information may be included in the fourth message.

In an embodiment, before receiving the third message, the base station may further first indicate an effective time to the UE, where the effective time may be applied to determining the effective time of the second timing offset, or applied to the updated second timing offset or the like.

In an embodiment, the base station may send the effective information to the UE by using a broadcast message, where the broadcast message may include any one or more of a system information block (SIB) 1, a master information block (MIB), or other system information (OSI). Alternatively, in a radio resource control (RRC) connection phase, the base station may further send the effective information to the UE by using any one or more of an RRC message, downlink control information (DCI), group DCI, media access control (MAC), or a timing advance command (TAC). In an embodiment, the base station may alternatively send the effective information together with data transmission or in a separately allocated PDSCH. In an embodiment, in addition to sending the effective information by using a broadcast message or a unicast message, the base station may further send the effective information in a multicast manner.

It may be understood that this embodiment of this application sets no limitation on when the base station sends the effective information to the UE. A specific form of the effective information is also not limited in this embodiment of this application.

Method 2

The UE sends effective information to the base station, where the effective information is used to indicate an effective time of the second timing offset. Correspondingly, the base station receives the effective information.

In an embodiment, the UE may send the effective information to the base station after (or before) sending the third message to the base station. Alternatively, the UE may send the effective information to the base station after (or before) receiving the fourth message sent by the base station.

In an embodiment, the effective information may be included in the third message.

In an embodiment, the effective information may be included in physical uplink control channel (PUCCH) information or the like.

For a specific manner of Method 2, refer to descriptions of Method 1. Details are not described herein again.

Method 3

For the UE, the second timing offset takes effect after m slots after the UE sends the third message, and m is a preset integer. Alternatively, the second timing offset takes effect after n slots after the UE receives the fourth message, and n is a preset integer.

For the base station, the second timing offset may take effect after m slots after the third message is received. Alternatively, the second timing offset takes effect after n slots after the base station sends the fourth message.

It may be understood that a unit of a slot is used as an example for description herein. This is not limited. For example, it may be agreed that the second timing offset takes effect after a time length of m subframes or frames. Alternatively, it may be agreed that a unit of m is millisecond, microsecond, or the like.

Figure 9:
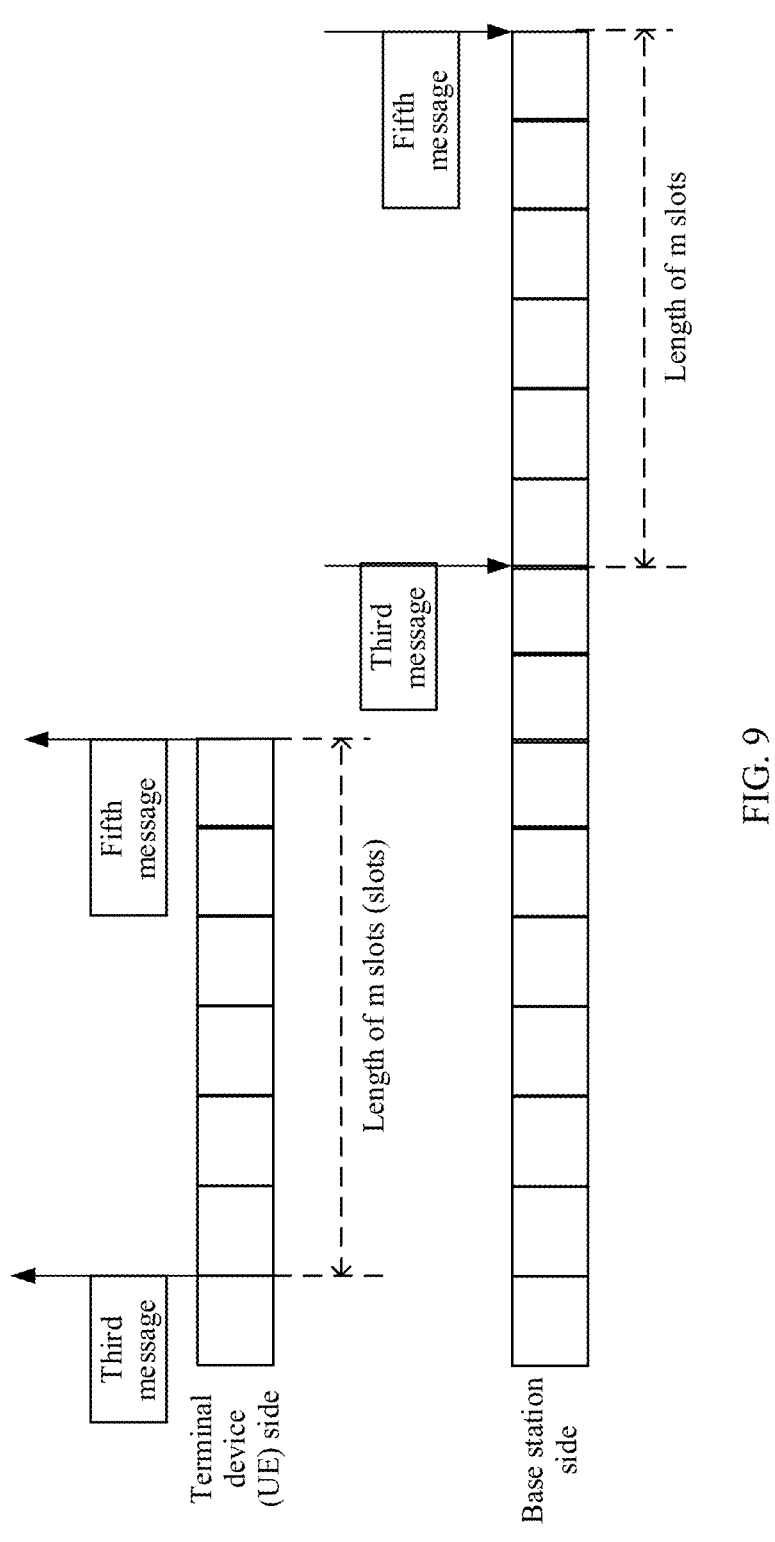
FIG. 9 is a schematic diagram of a relationship between m and an effective time according to an embodiment of this application.

FIG. 9 is used as an example. The second timing offset or the updated second timing offset starts to take effect in the $m^{th}$ slot after the UE sends the third message. That is, the UE starts to send a signal to the base station by using the second timing offset or the updated second timing offset in the $m^{th}$ slot after sending the third message. Correspondingly, the second timing offset or the updated second timing offset starts to take effect in the $m^{th}$ slot after the base station receives the third message. That is, in the $m^{th}$ slot after receiving the third message, the base station starts to receive, by using the second timing offset or the updated second timing offset, the signal sent by the UE.

It may be understood that the foregoing m or n may be preset by the base station, or preset in a protocol or the like. This is not limited in this embodiment of this application. When m or n is preset by the base station, the base station may send a value of m or n to the UE by using a broadcast message, a multicast message, or a unicast message. For example, the value of m or n may be notified to the UE or the base station by using the method for sending the effective information in the foregoing Method 1, that is, the effective information includes the value of m or n.

It may be understood that the effective time is related to a channel delay, and may be a value related to a one-way or round-trip delay. Therefore, in addition to notifying the UE or the base station of the effective time by using the method for sending the effective information described in Method 2 and Method 3, the effective time may be agreed on by using a known parameter related to the one-way or round-trip delay. For example, according to a protocol agreement calculation method, the UE and the base station obtain the effective time by using a same method. The following is a method for calculating the effective time:

$$m=\lceil(\text{RAR\_window}+\text{RAR\_offset})/\text{slot\_duration}\rceil;\text{ or}$$

$$m=\lceil(\text{RAR\_window}+\text{RAR\_offset})/2/\text{slot\_duration}\rceil;\text{ or}$$

$$n=\lceil(\text{RAR\_window}+\text{RAR\_offset})/\text{slot\_duration}\rceil;\text{ or}$$

$$n=\lceil(\text{RAR\_window}+\text{RAR\_offset})/2/\text{slot\_duration}\rceil;\text{ or}$$

$$m=\lceil(\text{RCR\_offset}+\text{RCR\_timer})/\text{slot\_duration}\rceil;\text{ or}$$

$$m=\lceil(\text{RCR\_offset}+\text{RCR\_timer})/2/\text{slot\_duration}\rceil;\text{ or}$$

$$n=\lceil(\text{RCR\_offset}+\text{RCR\_timer})/\text{slot\_duration}\rceil;\text{ or}$$

$$n=\lceil(\text{RCR\_offset}+\text{RCR\_timer})/2/\text{slot\_duration}\rceil.$$

On the basis of the foregoing calculation manner, a correction value $\Delta T$ is added (the correction value may be agreed by using a protocol or sent by the base station to the UE, and $\Delta T$ is an integer), for example:

$$m=\lceil(\text{RCR\_offset}+\text{RCR\_timer})/\text{slot\_duration}\rceil+\Delta T;\text{ or}$$

$$n=\lceil(\text{RCR\_offset}+\text{RCR\_timer})/\text{slot\_duration}\rceil+\Delta T;\text{ or}$$

$$m=\lceil(\text{RCR\_offset}+\text{RCR\_timer})/\text{slot\_duration}\rceil+\Delta T;\text{ or}$$

$$n=\lceil(\text{RCR\_offset}+\text{RCR\_timer})/\text{slot\_duration}\rceil+\Delta T.$$

For example, when the base station and the UE agree to calculate the effective time by using a formula: $m=\lceil(\text{RAR\_window}+\text{RAR\_offset})/\text{slot\_duration}\rceil$, the UE and the base station separately calculate a same value of m by substituting RAR_window and RAR_offset (which may be obtained from a broadcast message) into the formula, and use the value of m to obtain the effective time of the updated timing offset. The method can avoid adding new signaling for indicating the value of m. In addition, the value of m can be adjusted based on a round-trip delay between a beam/cell and the base station, which has higher flexibility.

It may be understood that, for the foregoing value of m or n, the effective time is specified based on a time of sending and receiving a signal. An absolute time may also be used to specify the effective time. For example, the base station sends effective information to the UE, where the effective information includes an effective time, and the effective time indicates that the UE starts to use the updated timing offset in the first slot of the $98^{th}$ frame for sending the signal. Correspondingly, the base station starts to use the updated timing offset to receive the signal in the first slot of the $98^{th}$ frame for receiving the signal sent by the UE. The effective time of the absolute time may be sent to the UE in the foregoing manner of sending the value of m or n. Details are not described herein again.

After the UE obtains the latest timing offset, that is, the second timing offset, the UE may send, by using the second timing offset after the second timing offset takes effect, data information scheduled by the base station, control channel information, or the like. The following describes a type included in the fifth message.

Method 1

The fifth message includes a HARQ-ACK feedback message of physical downlink shared channel (PDSCH) data, such as a HARQ-ACK message of the fourth message (Msg4). As shown in FIG. 6, operation 605 may be as follows: The UE sends a HARQ-ACK message to the base station based on the second timing offset, where the HARQ-ACK message is used to confirm that a collision access message is correctly received. Correspondingly, the base station receives the HARQ-ACK message. For example, if receiving of a PDSCH signal by the UE ends in a slot x, the UE sends a corresponding HARQ-ACK feedback in a slot $x+K_1+K_{offset}$.

Method 2

The fifth message includes uplink data. As shown in FIG. 6, operation 605 may be as follows: The UE sends, to the base station based on the second timing offset, uplink data scheduled by the base station (the base station indicates the scheduled uplink data by using an RAR grant and DCI). Correspondingly, the base station receives the uplink data. For example, the base station schedules, by using a DCI instruction, the UE to send physical uplink shared channel PUSCH data, where the DCI signaling is in a slot x, and the UE sends the PUSCH data in a slot:

$$\left\lfloor n \cdot \frac{2^{\mu_{PUSCH}}}{2^{\mu_{PDCCH}}} \right\rfloor + K_2 + K_{offset}.$$

Herein, $\mu_{PUSCH}$ is related to a subcarrier spacing of the PUSCH, and when $\mu_{PUSCH}=0$, the subcarrier spacing of the PUSCH is 15 KHz. $\mu_{PDCCH}$ is related to a subcarrier spacing of a physical downlink control channel PDCCH, and when $\mu_{PDCCH}=0$, the subcarrier spacing of the PDCCH is 15 KHz.

Method 3

The fifth message includes a sounding reference signal (SRS), and the base station sends DCI signaling in a slot x to trigger an aperiodic SRS signal. After the UE receives the trigger signaling, the aperiodic SRS signal is sent in the slot $$\left\lfloor n \cdot 2^{\frac{\mu_{SRS}}{\mu_{PDCCH}}} \right\rfloor + k + K_{offset}.$$

Herein, $\mu_{SRS}$ is related to a subcarrier spacing of the SRS signal, and when $\mu_{PDCCH}=0$, the subcarrier spacing of the SRS signal is 15 KHz.

It may be understood that the foregoing communication operation of using the updated timing offset is merely an example for description, and a communication operation of using the updated timing offset or the timing offset is not limited. For example, when determining to send channel state information reference resource timing information, the base station uses the updated timing offset or the timing offset.

The following describes how the UE updates a timing offset in subsequent communication after accessing the system.

In a subsequent communication process between the UE and the base station (that is, after the UE accesses the base station), relative motion occurs between the UE and the satellite (which also causes a change of a round-trip delay between the UE and the base station). Therefore, a timing advance used by the UE needs to be adjusted. Therefore, in one manner, the UE may obtain the timing advance based on a timing advance adjustment instruction (TA adjustment) sent by the base station. In one manner, the UE may obtain the timing advance based on location information of the UE and location information of the base station.

A method for updating a timing offset in subsequent communication includes the following two methods.

A difference between the two methods is whether the UE side or the base station side determines whether to update a timing offset in use (the used timing offset includes the second timing offset).

Method 1: The UE side determines whether to update the timing offset, which includes the following operation.

When receiving a timing advance adjustment instruction (for example, a timing advance change rate or a timing advance adjustment value) sent by the base station, the UE may adjust, by using the timing advance adjustment instruction, a timing advance used by the UE to send a signal, and determine, based on an adjusted timing advance, whether to update the second timing offset. Alternatively, the UE adjusts the used timing advance based on the location information of the UE, ephemeris information, and the like, and determines, based on the timing advance, whether to update the second timing offset.

It may be understood that the second timing offset herein is a general term of a timing offset that is being used after the UE accesses the system, and may be understood as a timing offset that is being used by the UE and the base station. This feature is also applicable to another embodiment of this application.

The UE may determine, based on the adjusted timing advance (that is, the latest timing advance adjustment value used by the UE), whether to update the second timing offset. The UE may determine, with reference to a difference between a timing offset obtained according to the formula (1) and the timing offset that is being used, whether to update the timing offset (in this case, TA_New is replaced with the latest timing advance adjustment value). For a specific operation, refer to the description in FIG. 6 that the UE determines, based on the update threshold, whether to update the first timing offset by using the second timing offset. Details are not described herein. If the UE determines to update the timing offset, the UE sends the updated second timing offset, a variation between the updated second timing offset and a reference timing offset, or a second adjustment parameter set to the base station. For a specific sending manner and a specific parameter, refer to the foregoing "method for indicating the second timing offset to the base station by the UE". It should be noted that the second timing offset in the method needs to be replaced with the updated second timing offset, and another related corresponding replacement is performed.

For example, $K_{offset1}$ in the formula (11) is replaced with the updated $K_{offset2}$, and the UE determines a value of $\Delta K_{offset}$ by referring to the updated $K_{offset2}=\lceil(\text{RAR\_window}+\text{RAR\_delay})/\text{slot\_duration}\rceil+\Delta K_{offset}$. In this case, the second adjustment parameter set includes $\Delta K_{offset}$, and the UE sends $\Delta K_{offset}$ to the base station. Correspondingly, after receiving $\Delta K_{offset}$, the base station calculates the updated $K_{offset2}$ based on the formula: the updated $K_{offset2}=\lceil(\text{RAR\_window}+\text{RAR\_delay})/\text{slot\_duration}\rceil+\Delta K_{offset}$.

For example, the UE sends at least one of parameters such as $S_K$, $\Delta K_{offset}$, $\Delta K_{offset\_time}$, $\alpha$, and $\beta$ to the base station, and the base station calculates the corresponding updated second timing offset by using the foregoing methods in the formulas (2) to (32). Alternatively, the UE sends a variation value of at least one parameter of $S_K$, $\Delta K_{offset}$, $\Delta K_{offset\_time}$, $\alpha$, and $\beta$ to the base station, and the base station obtains the updated timing offset (that is, the updated second timing offset) through calculation by using the variation value. For a specific example, refer to the foregoing Method 2 in the "method for indicating the second timing offset to the base station by the UE".

Further, after the UE sends the updated second timing offset or the second adjustment parameter to the base station, the base station receives the updated second timing offset or the second adjustment parameter sent by the UE. After the updated second timing offset takes effect, the UE sends, to the base station based on the updated second timing offset, uplink data scheduled by the base station.

It may be understood that for a method related to an effective time of the updated second timing offset, refer to the description of the method for determining the effective time of the second timing offset. Details are not described herein again.

Method 2: The base station side determines whether to update the timing offset, which includes:

When the UE receives a timing advance adjustment instruction (for example, a timing advance change rate or a timing advance adjustment value) sent by the base station, where the timing advance adjustment instruction is used to instruct the UE to update the timing advance, the UE may adjust, according to the timing advance adjustment instruction, the timing advance used by the UE to send a signal, to obtain an adjusted timing advance.

The UE sends, to the base station based on the adjusted timing advance, the second timing offset, a variation between the updated second timing offset and a reference timing offset, or a second adjustment parameter set (refer to the foregoing Method 1). Correspondingly, the base station receives corresponding information sent by the UE, obtains the second timing offset, and further determines whether to update the timing offset, that is, whether to update the second timing offset. For a specific operation, refer to the description in FIG. 6 that the base station determines, based on the update threshold, whether to update the first timing offset by using the second timing offset. Details are not described herein.

If the base station determines that the timing offset needs to be updated, the base station sends, to the UE, the updated second timing offset, the variation between the updated second timing offset and the reference timing offset, or the adjustment parameter used to indicate the updated second timing offset. For a related design of the foregoing parameters sent by the base station to the UE, refer to the foregoing method for obtaining the first timing offset from the broadcast message by the UE, the method for indicating the second timing offset to the base station by the UE, and the method for indicating the updated first timing offset to the UE by the base station. Details are not described herein again.

For example, $K_{offset1}$ in the method for obtaining the first timing offset from the broadcast message by the UE is replaced with the updated $K_{offset2}$ (that is, the updated second timing offset), and the method includes the formula (2) to the formula (32) and another formula listed. The base station sends at least one parameter value of parameters such as $S_K$, $\Delta K_{offset}$, $\Delta K_{offset\_time}$, $\alpha$, and $\beta$ to the UE. Correspondingly, the UE obtains the updated second timing offset through calculation by using the method in formula (2) to formula (32) in the "method for obtaining the first timing offset from the broadcast message by the UE".

Further, the UE obtains the updated second timing offset based on the received variation between the updated second timing offset and the reference timing offset or the adjustment parameter used to indicate the updated second timing offset. After the updated second timing offset takes effect, the UE sends, to the base station based on the updated second timing offset, uplink data scheduled by the base station.

It may be understood that for a method related to an effective time of the updated second timing offset, refer to the description of the method for determining the effective time of the second timing offset. Details are not described herein again.

It may be understood that the uplink data in the foregoing two manners is only a generic term, and may be any information sent by the UE.

In the following scenario, the UE also needs to update the second timing offset. The scenario is, for example, a case in which the UE is handed over to a cell, a case in which the UE switches a beam, or a case in which the UE switches a bandwidth part BWP.

It should be understood that different beams may be distinguished in the protocol based on a bandwidth part (BWP), a transmission configuration indicator (TCI), or a synchronization signal block (SSB). In other words, the beam may be indicated based on a BWP, a TCI, or an SSB. Therefore, for the UE and the base station, beam switching may be indicated through switching of a BWP, a TCI, or an SSB. Therefore, for the UE and/or the base station, the actual switching may be switching of a BWP, a TCI, or an SSB. Therefore, the beam described in this application may also be replaced with a BWP, a TCI, or an SSB.

For a beam switching scenario, in this embodiment of this application, a beam before switching may be referred to as a serving beam, and a beam after switching is referred to as a target beam. In addition, a base station that transmits a serving beam may be referred to as a serving base station (or the serving base station is a base station to which a serving beam belongs), and a base station that transmits a target beam may be referred to as a target base station (or the target base station is a base station to which a target beam belongs). FIG. 3 is used as an example. A current terminal device is within coverage of a beam #2. The beam #2 is a serving beam of the terminal device. A beam #3 (or a beam #1) used by the UE after switching is a target beam. It may be understood that the serving beam may be replaced with a serving BWP, a serving TCI, or a serving SSB. Accordingly, the target beam may be replaced with a target BWP, a target TCI, or a target SSB. For ease of description, the following uses a beam as an example to describe the embodiments of this application.

In a handover scenario, a timing offset used in a serving beam or a target beam may be different. Therefore, the UE needs to update the second timing offset. It may be understood that the updated second timing offset herein may be understood as a timing offset used by the target beam. The following describes this application by using a timing offset used by a target beam as an example.

The base station notifies, before handover, the UE of a timing offset used in the target beam in advance in the following two manners:

(1) Send, to the UE, a difference between a timing offset to be used by the UE in the target beam or cell and a timing offset used by the UE in the serving beam or cell.

(2) The UE calculates the timing offset by using a timing advance that is notified by the base station to be used in the target beam or cell. That is, $K_{offset1}=\lceil TA\_value/slot\_duration \rceil$. TA_value is the timing advance used by the UE in the target cell or beam, and $K_{offset}$ indicates a timing offset to be used by the UE in the target cell or beam. The base station may alternatively calculate, according to a formula, the timing offset to be used by the UE.

In some scenarios, the UE needs to inform the base station of the timing offset to be used in the target beam or cell. For example, when the UE performs inter-satellite handover, the UE may calculate a timing advance used after the handover by using the location information of the UE and location information of a target satellite (which may be obtained from ephemeris information). In this case, the UE needs to report the timing offset to be used by the UE in the target beam or cell. The following two methods are included:

(1) The UE notifies the base station of the timing offset value to be used by the base station in the target beam or cell.

(2) The UE sends, to the base station, a timing advance to be used by the UE in the target beam or cell. The base station receives the timing advance sent by the UE, and then obtains, through calculation, the timing offset used by the UE in the target beam or cell based on the formula $K_{offset}=\lceil TA\_value/slot\_duration \rceil$. The UE may alternatively calculate the timing offset to be used by the UE according to this formula.

The UE may obtain the timing offset used in the target beam or cell or the difference between timing offsets by using a broadcast message, where the broadcast message may include any one or more of an SIB 1, an MIB, or OSI. Alternatively, the UE may obtain, by using any one or more of an RRC message, DCI, group DCI, MAC, or a TAC, the timing offset used by the target beam. In an embodiment, in addition to obtaining, by using the broadcast message or a unicast message, the timing offset used in the target beam, the UE may further obtain, in a multicast manner, the timing offset used in the target beam. In an embodiment, the timing offset used by the target beam may alternatively be transmitted with data or carried in a separately allocated PDSCH. It may be understood that the UE may alternatively obtain, by using the foregoing method, a variation between the timing offset used in the target beam and a reference timing offset.

In addition, when the UE performs beam switching, a timing offset used by the UE in a target beam may be sent in initial BWP signaling, BWP downlink common signaling (BWP-DownlinkCommon), BWP uplink common signaling (BWP-UplinkCommon), BWP downlink dedicated signaling (BWP-DownlinkDedicated), BWP uplink dedicated signaling (BWP-UplinkDedicated), or measurement signaling (MeasObjectNR). The following gives some specific examples.

For example, when the UE performs beam switching, if the UE switches to an initial BWP, $K_{offset}$ is delivered in RRC signaling corresponding to the BWP; if the UE switches to a non-initial BWP, $K_{offset}$ is delivered in BWP-DownlinkCommon or BWP-UplinkCommon. Herein, $K_{offset}$ may alternatively be information related to obtaining a timing offset, for example, a parameter value or a parameter difference such as a timing offset value, $S_K$, $\Delta K_{offset}$, $\Delta K_{offset\_time}$, $\alpha$, and $\beta$.

For example, when the UE performs beam switching, the base station may send, to the UE by using BWP-DownlinkDedicated and BWP-UplinkDedicated signaling, $K_{offset}$ used in a target beam; or send, to the UE, a difference between $K_{offset}$ used in the target beam and $K_{offset}$ used in a serving beam. Examples are as follows:

For example, a signaling format delivered by the base station is as follows:

```
BWP-DownlinkDedicated::=        SEQUENCE {
pdcch-Config                    SetupRelease { PDCCH-Config }
pdsch-Config                    SetupRelease { PDSCH-Config }
sps-Config                      SetupRelease { SPS-Config }
radioLinkMonitoringConfig       SetupRelease {
                                RadioLinkMonitoringConfig }
    Koffset                     INTEGER (0...m)
    ...
}
Alternatively,
BWP-UplinkDedicated ::=          SEQUENCE {
pucch-Config                    SetupRelease { PUCCH-Config }
pusch-Config                    SetupRelease { PUSCH-Config }
configuredGrantConfig           SetupRelease { ConfiguredGrantConfig }
srs-Config                      SetupRelease { SRS-Config }
beamFailureRecoveryConfig       SetupRelease {
                                BeamFailureRecoveryConfig }
    Koffset                     INTEGER (0...m)
    ...
}
```

The parameter Koffset may represent $K_{offset}$ used by the UE in the target beam, or represent a difference between $K_{offset}$ used in the target beam and $K_{offset}$ used in the serving beam. In the foregoing signaling, m represents a positive integer, for example, m=16. For example, the UE receives BWP-DownlinkDedicated signaling sent by the base station, and then reads $K_{offset}$ in the signaling, where a value of $K_{offset}$ is a value determined by the base station from an integer between 0 and 16.

Before initiating BWP or beam or cell handover, a measurement procedure needs to be triggered. Therefore, the base station may further send, to the UE by using corresponding RRC signaling in measurement configuration and handover, $K_{offset}$ used by the UE in the target beam, or the difference between $K_{offset}$ used in the target beam and $K_{offset}$ used in the serving beam.

For example, a signaling format delivered by the base station is as follows:

```
MeasObjectNR ::=        SEQUENCE {
carrierFreq             ARFCN-ValueNR,
    Koffset             INTEGER (0...m)
```

-continued

```
        ...
    }
```

According to an inter-cell handover signaling procedure, $K_{offset}$ used in the target beam is sent to the UE in a beam of the serving cell by using an RRC reconfiguration (Reconfiguration) message; and the difference between $K_{offset}$ used in the target beam and $K_{offset}$ used in the serving beam is sent to the UE.

It may be understood that the foregoing classification methods may be mutually combined. For example, an embodiment of this application provides a method for updating a timing offset, as shown in FIG. 10a and FIG. 10b.

Figure 10A:
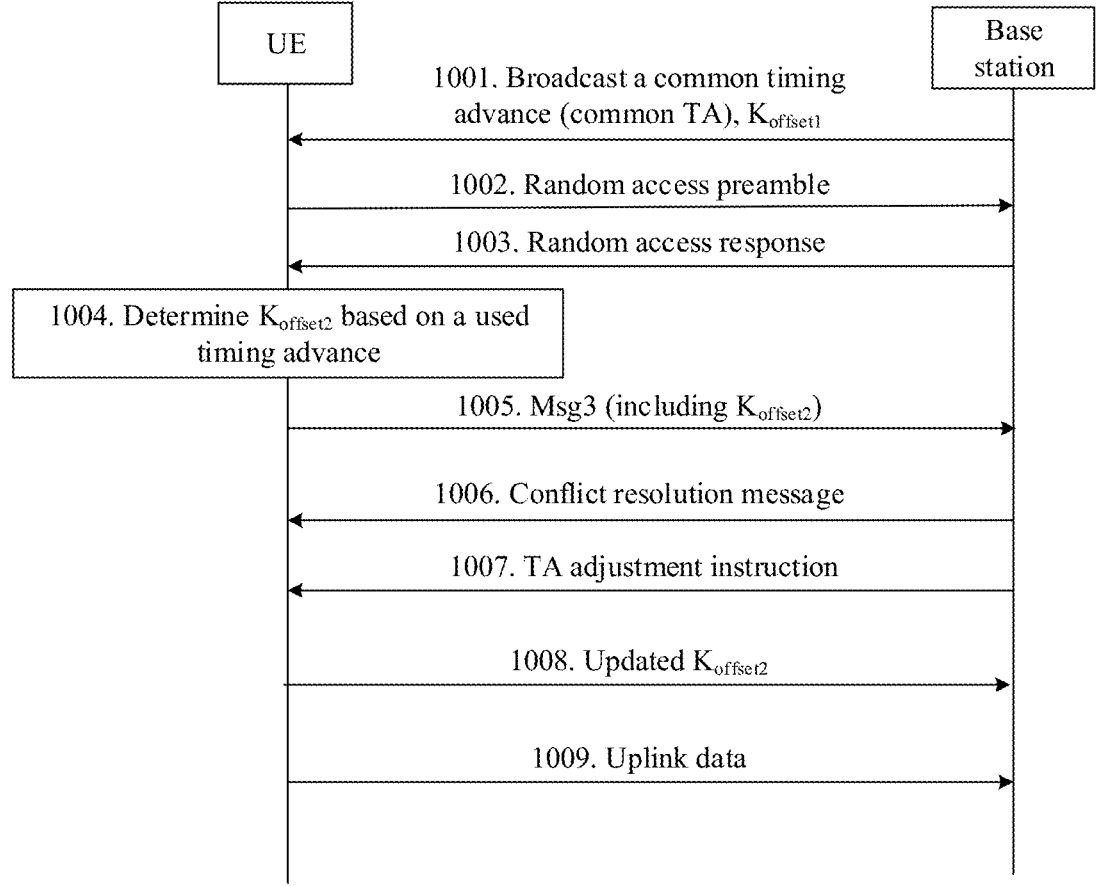
FIG. 10$a$ is a schematic flowchart of a method for updating a timing offset according to an embodiment of this application.
FIG. 10*b* is a schematic flowchart of a method for updating a timing offset according to an embodiment of this application.
Figure 10B:
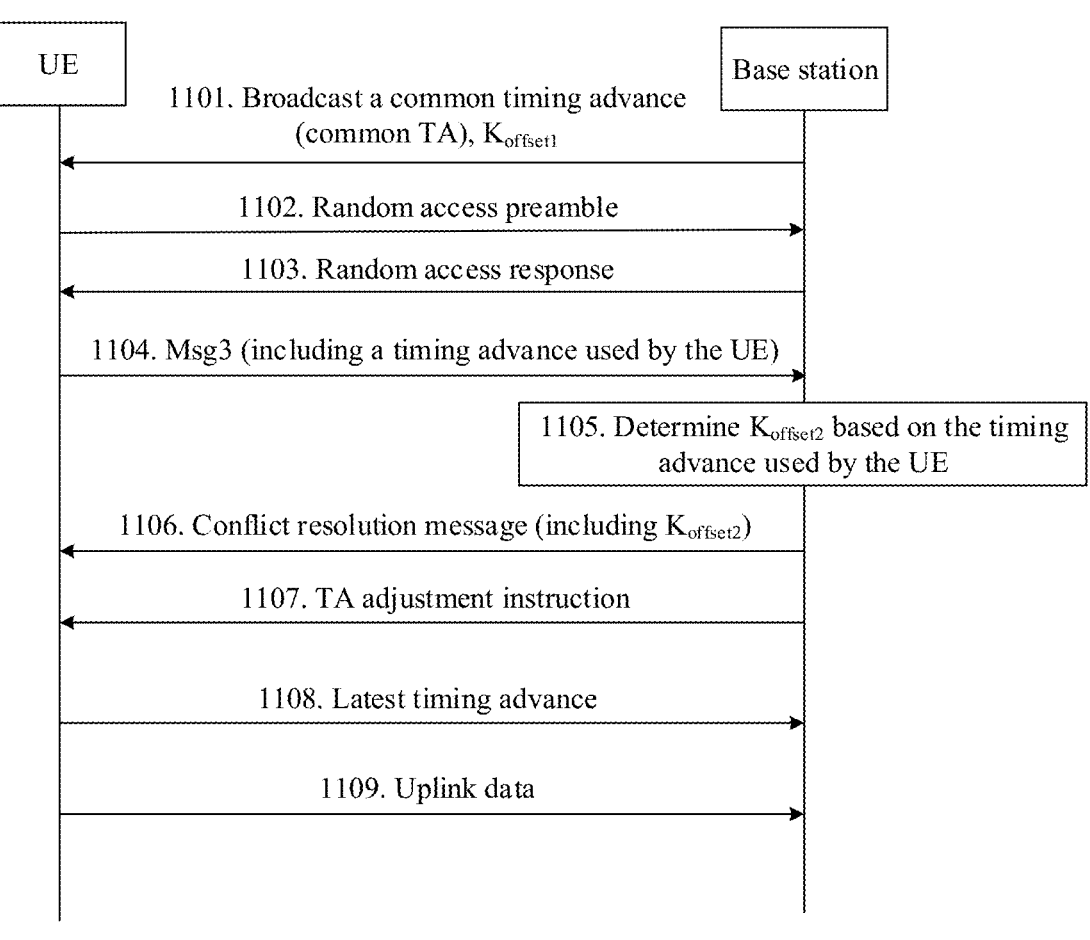

As shown in FIG. 10a, the method for updating a timing offset includes the following operations.

1001. A base station broadcasts a common timing advance (common TA) and a first timing offset ($K_{offset1}$).

1002. UE sends a random access preamble to the base station. Correspondingly, the base station receives the random access preamble.

In an embodiment, UE having no positioning function may send the random access preamble by using a common timing advance. UE having the positioning function may send the random access preamble by using a timing advance obtained based on location information of the UE and satellite information. Alternatively, the UE having the positioning function may send the random access preamble by using the common timing advance.

1003. The base station sends a random access response to the UE, where the random access response includes a timing advance command. Correspondingly, the UE receives the random access response.

1004. The UE determines a second timing offset based on the used timing advance (that is, the latest timing advance), for example, according to the formula (1).

In an embodiment, the UE may obtain the second timing offset according to the formula (1), and determine, by using the foregoing update threshold, to update the first timing offset by using the second timing offset.

1005. The UE sends a Msg3 message to the base station based on the broadcast first timing offset. Correspondingly, the base station receives the Msg3 message based on the first timing offset. The Msg3 includes the second timing offset.

1006. The base station sends a contention resolution message or a conflict resolution message to the UE. Correspondingly, the UE receives the contention resolution message or the conflict resolution message.

1007. The base station sends a timing advance adjustment instruction to the UE. Correspondingly, the UE receives the timing advance adjustment instruction.

1008. The UE determines a latest timing advance based on the timing advance adjustment instruction, or the location information of the UE and the location information of the satellite. Further, after determining the latest timing advance, the UE may calculate an updated second timing offset based on the latest timing advance. The UE sends the updated second timing offset to the base station.

1009. The UE sends, to the base station based on the second timing offset, uplink data scheduled by the base station. Correspondingly, the base station receives the uplink data based on the second timing offset.

In an embodiment, after the updated second timing offset takes effect, the UE may further send, to the base station based on the updated second timing offset, the uplink data scheduled by the base station.

The method shown in this application is described by using an example. It is assumed that an uplink subcarrier spacing is 15 kHz. In a random access process, a maximum round-trip delay obtained by the base station side through calculation based on a beam coverage range is 20.87 ms, and $K_{offset1}$ obtained through calculation based on the value is 21. The base station side sends $K_{offset1}$=21 to the UE through broadcast or a Msg2, and the UE sends the Msg 3 by using $K_{offset1}$=21. In addition, the UE determines, through calculation based on the latest TA value to be used when sending the Msg3, whether $K_{offset1}$ needs to be updated. It is assumed that the TA value used when the UE sends the Msg3 is 19.9 ms, that is, TA_New=19.9 ms. In this case, $K_{offset2}$: $K_{offset2}=\lceil TA\_New/slot\_duration\rceil=20$ is calculated. If $K_{offset1}$ changes, the UE sends a new $K_{offset2}$=20 to the base station in the Msg3.

After the UE successfully accesses the system, in a subsequent communication process between the UE and the base station, a distance between the UE and the satellite changes, and a timing advance of the UE also changes accordingly. After the UE obtains, through calculation, the latest timing advance based on the TA adjustment instruction or a TA rate instruction delivered by the base station side or based on the location information and ephemeris information of the UE, the timing advance for sending the uplink data by the UE changes. If the TA value used by the UE at this moment is 18.9 ms, and the UE finds, based on $K_{offset2}=\lceil TA\_New/slot\_duration\rceil=19$, that the TA value is different from the currently used $K_{offset2}$, the UE reports $K_{offset2}$ to as the be station.

To avoid repetition, the following shows only a difference between the method shown in FIG. 10b and the method shown in FIG. 10a.

For operation 1101 to operation 1103, correspondingly refer to operation 1001 to operation 1003.

1104. The UE sends a Msg3 to the base station based on the broadcast first timing offset. Correspondingly, the base station receives the Msg3 based on the first timing offset. The Msg3 includes a timing advance used by the UE.

1105. The base station determines a second timing offset based on the timing advance used by the UE.

In an embodiment, after the base station obtains the second timing offset based on the timing advance used by the UE, the base station may further determine, by using the foregoing update threshold, to update the first timing offset by using the second timing offset.

1106. The base station sends a contention resolution message or a conflict resolution message to the UE. Correspondingly, the UE receives the contention resolution message or the conflict resolution message. The contention resolution message or the conflict resolution message includes the second timing offset.

1107. The base station sends a timing advance adjustment instruction to the UE. Correspondingly, the UE receives the timing advance adjustment instruction.

Further, the UE determines a latest timing advance based on the timing advance adjustment instruction, or the location information of the UE and location information of the base station.

1108. The UE sends the latest timing advance to the base station. Correspondingly, the base station receives the latest timing advance.

Further, the base station determines an updated second timing offset based on the latest timing advance, and the base station sends the updated second timing offset to the UE.

1109. The UE sends uplink data to the base station based on the second timing offset. Correspondingly, the base station receives the uplink data based on the second timing offset.

In an embodiment, after the updated second timing offset takes effect, the UE may further send the uplink data to the base station based on the updated second timing offset.

It may be understood that FIG. 10*a* and FIG. 10*b* are merely two examples. The classification methods shown in this application may be further combined based on internal logic, and the solutions fall within the protection scope of this application.

The foregoing method may be applied to a scenario: An area (a beam, a cell, or a BWP) covered by a base station may include UE with a positioning function, or may include UE without a positioning function, or may include UE that does not use a positioning function. Alternatively, the foregoing method may be applied to a scenario in which UE in an area covered by a base station has no positioning function or does not use a positioning function. For example, because the UE has no positioning function or does not use the positioning function, the UE needs to determine the first timing offset based on the common timing advance broadcast by the base station. In addition, the foregoing formula (1) may be replaced with a formula (33):

$$K_{offset2}=[\text{TA\_common}+\text{TA\_command})/\text{slot\_duration}] \quad (33)$$

TA_common is a common timing advance, and TA_command is a timing advance adjustment magnitude included in the random access response.

Further, the foregoing method may be further applied to a scenario: The UE adjusts the timing advance strictly according to the timing advance command sent by the base station, and the UE adjusts the timing advance strictly according to the timing advance adjustment instruction of the base station. Therefore, both the UE and the base station know, in real time, the timing advance adjustment value used by the UE. In this case, because the UE adjusts the timing advance strictly according to a method indicated by the base station, after the UE receives the Msg2 sent by the base station, the Msg3 sent by the UE may not include the indication information. After the base station sends the timing advance adjustment instruction to the UE, the UE does not send the updated second timing offset, a second adjustment parameter set, or the like to the base station. That is, in this scenario, the UE adjusts the timing advance strictly according to the timing advance command (included in the Msg2) and the timing advance adjustment instruction sent by the base station. Therefore, both the base station and the UE know a change of the timing offset. The base station and the UE may agree on a formula for updating the timing offset, and the base station and the UE may update the timing offset according to the formula and the update threshold.

Therefore, in a case in which the UE has no positioning function or does not use the positioning function, this method proposes a method for updating a timing offset without signaling interaction, which can save signaling overheads. The method includes the following.

The UE adjusts the used timing advance according to the timing advance adjustment instruction of the base station. When the timing advance adjustment magnitude used by the UE changes, the UE may determine whether to update the timing offset (in this case, the latest timing advance adjustment magnitude is replaced with TA_New) with reference to a difference between the timing offset obtained according to the formula (1) and the currently used timing offset. For a specific operation, refer to the description in FIG. 6 of determining, by the UE based on the update threshold, whether to update the first timing offset by using the second timing offset. Details are not described herein. If the UE determines to update the timing offset, a new timing offset is used based on an effective time. For a related design of the effective time of the updated timing offset, refer to the description of the method for determining the effective time of the second timing offset. Details are not described herein again.

While sending the timing advance adjustment instruction to the UE, the base station may calculate a timing advance that is being used by the UE at this time. Therefore, a difference between the timing offset obtained according to the formula (1) and the timing offset that is being used may be used to determine whether to update the timing offset. For a specific operation, refer to the description in FIG. 6 that the base station determines, based on the update threshold, whether to update the first timing offset by using the second timing offset. Details are not described herein. If the base station determines to update the timing offset, a new timing offset is used based on an effective time. For a related design of the effective time of the updated timing offset, refer to the description of the method for determining the effective time of the second timing offset. Details are not described herein again.

The method saves signaling by allowing the UE and the base station to calculate and update the timing offset by using the same formula. It may be understood that the method is described by using the formula (1) as an example, and a specific form of the formula is not limited.

That is, the UE and the base station may separately determine the updated timing offset according to the same formula or method, so that the updated timing offset may take effect directly at a specified time or a preset time or a time specified in a protocol. In this method, signaling interaction between UE and the base station is avoided, and signaling overheads are saved.

The following describes another method for updating a timing offset according to this application.

Figure 11:
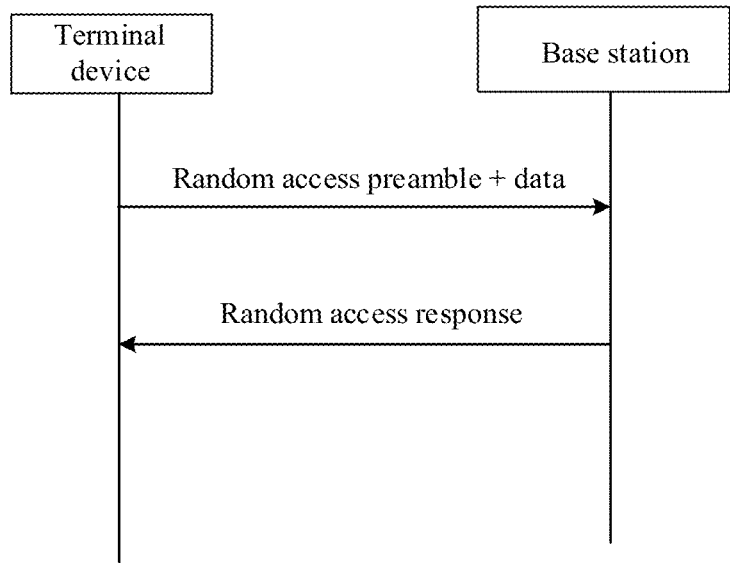
FIG. 11 is a schematic flowchart of a two-step random access method according to an embodiment of this application.

To reduce an access delay and signaling overheads, currently, a two-step random access process is proposed. As shown in FIG. 11, in a first operation, a terminal device simultaneously sends a random access preamble (preamble) and data to a base station. In a second operation, the base station sends a random access response to the terminal device. In the two-step random access process, in one aspect, the terminal device sends the random access preamble and data in the first operation, thereby reducing a delay of uplink data transmission. In another aspect, the base station does not need to send scheduling information corresponding to the Msg3 to the terminal device, so that signaling overheads can be reduced. Generally, a MsgA may be used to represent the first interaction message of the two-step random access. The MsgA is sent by the terminal device to the base station. The MsgA includes a MsgA preamble part and a MsgA data part. The preamble is carried on a physical random access channel (PRACH) of the MsgA, and the data part is carried on a PUSCH physical channel of the MsgA.

Figure 12:
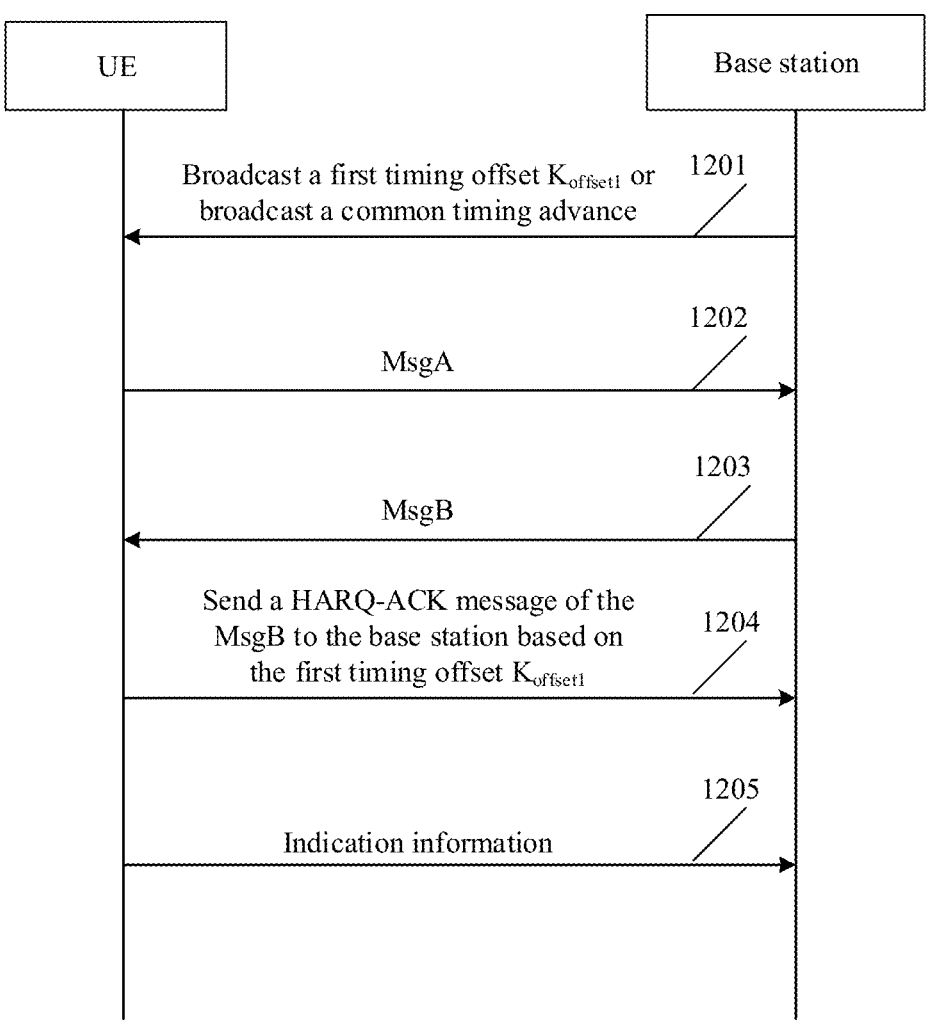
FIG. 12 is a schematic flowchart of a method for updating a timing offset according to an embodiment of this application.

FIG. 12 is a schematic flowchart of a method for updating a timing offset according to an embodiment of this application. In an embodiment, the method may be applied to two-step random access. As shown in FIG. 12, the method includes the following operations.

1201. A base station broadcasts a first timing offset $K_{offset1}$. Alternatively, the base station broadcasts any one or more of a common timing advance (common TA), an orbital height at which the base station is located, duration of a MsgB receive window, and startup delay duration of the MsgB receive window. For the method, refer to the foregoing method for obtaining the first timing offset from the broadcast message by the UE. Details are not described herein again.

1202. The UE sends a MsgA to the base station by using the broadcast common TA or a TA value calculated by the UE, to apply for accessing a system. Correspondingly, the base station receives the MsgA.

1203. The base station sends a MsgB to the UE. Correspondingly, the UE receives the MsgB.

The MsgB includes a timing advance command, a preamble ID, and the like.

1204. The UE sends a HARQ-ACK message of the MsgB to the base station based on the first timing offset $K_{offset1}$. Correspondingly, the base station receives the HARQ-ACK message.

In an embodiment, the UE may further determine a second timing offset $K_{offset2}$ based on the used timing advance. For a relationship between $K_{offset2}$ and $K_{offset1}$, refer to the foregoing update threshold in FIG. 6. In this case, the timing advance used by the UE may be understood as a timing advance determined according to the timing advance command included in the MsgB.

1205. The UE sends indication information to the base station. Correspondingly, the base station receives the indication information.

The indication information is used to indicate the second timing offset. It may be understood that, for how to indicate the second timing offset, refer to the foregoing method in which the UE indicates the second timing offset to the base station.

After the UE sends the indication information to the base station, the base station receives the indication information sent by the UE, and obtains the second timing offset. After the second timing offset takes effect, the UE sends, to the base station based on the updated second timing offset, uplink data scheduled by the base station.

It may be understood that for a method related to an effective time of the second timing offset, refer to the description of the method for determining the effective time of the second timing offset. Details are not described herein again.

In an embodiment, in the foregoing operation 1201, the base station may broadcast only the common timing advance (common TA). In this case, UE without a positioning function may use the common TA to send the preamble to apply for access. UE with a positioning function obtains a relatively accurate TA value based on location information of the UE and location information of a satellite (which may be obtained from ephemeris information), and then performs timing advance adjustment to send the preamble. Therefore, when sending the MsgA, the UE with a positioning function may use the PUSCH data to carry the TA value used by the UE. For a method for sending the TA value, refer to the method for reporting the latest TA value used by the UE in the Msg3 in four-step random access. After receiving the TA value, the base station may determine, based on the latest TA value of the UE, whether to update the timing offset, and for a related design of determining whether to perform updating, refer to the foregoing update threshold in FIG. 6.

In an embodiment, if the base station may distinguish whether the positioning function is used by the UE, in some embodiments, the UE without the positioning function may not carry the TA value used by the UE in the MsgA. A method for distinguishing whether the UE uses a positioning function is, for example, distinguishing whether the UE has/uses a positioning function based on different preamble groups, based on an identifier in an uplink signal, or based on whether the UE carries a used TA value in the MsgA.

In an embodiment, if the base station cannot distinguish whether the UE has a positioning function, the UE without the positioning function also carries, when sending the MsgA, the TA value used by the UE in the PUSCH data. For a method for sending the TA value, refer to the method for reporting the latest TA value used by the UE in the Msg3 in four-step random access.

In some embodiments, after the base station receives the MsgA, if the MsgA carries the TA value used by the UE, the base station determines, according to a formula $K_{offset1}=\lceil TA\_New/slot\_duration\rceil$ or $K_{offset}=\lceil (TA\_New+TAC \ value)/slot\_duration\rceil$, whether $K_{offset1}$ needs to be updated, for example, based on the foregoing update threshold. The TAC value is an adjustment value included in a timing advance adjustment instruction that is to be sent by the base station to the UE. It may be understood that the TA value used by the UE carried in the MsgA may be used to determine the second timing offset $K_{offset2}$ or be used to determine whether the timing offset needs to be updated. Alternatively, the base station sends the $K_{offset}2$ value to the UE by using the MsgB.

In other embodiments, if the MsgA does not carry the TA value used by the UE, it indicates that the UE uses the broadcast common TA value to send the preamble. Therefore, both the UE and the base station use the formula $K_{offset2}=\lceil TA\_common/slot\_duration\rceil$ or $K_{offset1} \lceil (TA\_New+TAC\_value)/slot\_duration\rceil$ to obtain the $K_{offset2}$. In this case, both the base station side and the UE side know $K_{offset2}$ used by the UE. In this case, the MsgB sent by the base station to the UE may not carry $K_{offset2}$. However, if satellite movement and a change of the TA used by the UE are considered, the base station side may notify the UE of $K_{offset2}$ by using the MsgB.

It may be understood that for a specific description of the indication method and the effective time of the second timing offset, refer to the foregoing method.

In an embodiment, the method shown in FIG. 12 may further include:

the base station sends a timing advance adjustment instruction to the UE, and the UE receives the timing advance adjustment instruction; and the UE sends data information to the base station according to the timing advance adjustment instruction, where the data information includes the updated second timing offset; or the data information includes a second adjustment parameter set, and the second adjustment parameter set is used to determine the updated second timing offset.

It may be understood that the foregoing method for updating a timing offset in the two-step random access method may be applied to UE, in an area covered by the base station, that has no positioning function or does not use the positioning function, and may also be applied to the UE to adjust the timing advance strictly according to the timing advance command sent by the base station. Therefore, both the UE and the base station know, in real time, a timing advance adjustment value used by the UE.

In the foregoing methods, timing advance adjustment is performed by the UE. However, there may be a scenario in which the base station side compensates for a part of a delay, and the UE performs timing advance adjustment on the remaining delay.

In this case, when the UE determines the timing offset, a value of performing delay compensation on the uplink signal on the base station side may be subtracted from the foregoing parameter related to the timing advance.

For example, the foregoing formula $K_{offset1}=\lceil max\_RTD/slot\_duration \rceil$ may be replaced with the following formula:

$$K_{offset1}=\lceil max\_RTDD/slot\_duration \rceil \quad (34)$$

$$max\_RTDD=max\_RTD-delay\_compensated \quad (35)$$

Herein, max_RTDD represents a maximum round-trip delay difference of a beam or a cell covered by the satellite; delay_compensated indicates the value of performing delay compensation on the uplink signal on the base station side. It may be learned that the maximum round-trip delay difference is a difference between a maximum round-trip delay between the UE in the beam or cell and the base station and the delay compensation value on the base station side.

For example, the foregoing formula (11) may be replaced with the following formula (36):

$$K_{offset1}=\lceil RAR\_window+RAR\_delay-delay\_compen-\\sated)/slot\_duration \rceil+\Delta K_{offset} \quad (36)$$

For example, the foregoing formula (33) may be replaced with the following formula (37):

$$K_{offset2}=\lceil TA\_command)/slot\_duration \rceil \quad (37)$$

The foregoing describes the embodiments of this application in detail, and the following describes the communications apparatus in this application.

Figure 13:
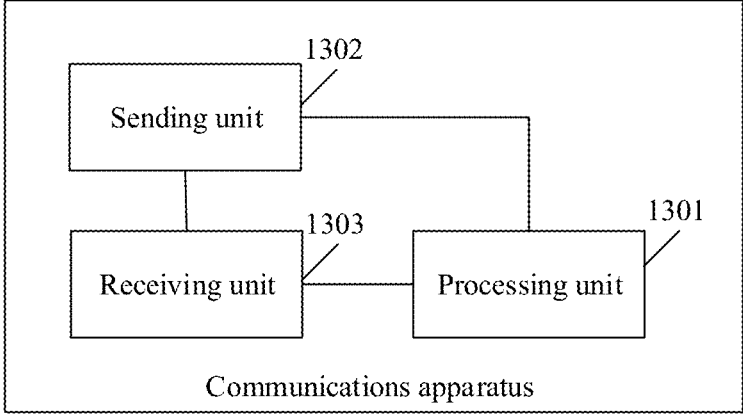
FIG. 13 is a schematic diagram of a structure of a communications apparatus according to an embodiment of this application.

FIG. 13 is a schematic diagram of a structure of a communications apparatus according to an embodiment of this application. As shown in FIG. 13, the communications apparatus includes a processing unit 1301, a sending unit 1302, and a receiving unit 1303.

In an embodiment, the processing unit 1301 is configured to generate a third message. The third message includes indication information, where the indication information is used to indicate a second timing offset, the second timing offset is an updated first timing offset, and the first timing offset is used to indicate a delay degree of delay of sending the third message by the communications apparatus.

The sending unit 1302 is configured to send the third message to a network device based on the first timing offset. The sending unit 1302 is further configured to send a fifth message to the network device based on the second timing offset.

In an embodiment, the sending unit 1302 is further configured to send a first message to the network device, where the first message includes a random access preamble. The receiving unit 1303 is further configured to receive a second message sent by the network device, where the second message includes a random access response message. The receiving unit 1303 is further configured to receive a fourth message sent by the network device, where the fourth message includes a random access contention resolution message.

In an embodiment, that the indication information is used to indicate a second timing offset includes: The indication information includes the second timing offset.

In an embodiment, that the indication information is used to indicate a second timing offset includes: The indication information includes a first adjustment parameter set, and the first adjustment parameter set is used to determine the second timing offset.

In an embodiment, the first adjustment parameter set includes any one or more of the following parameters: a parameter determined based on startup delay duration of a random access response RAR receive window and duration of the RAR receive window; or a parameter determined based on startup delay duration of a random access contention resolution timer and duration of the random access contention resolution timer; or a parameter determined based on a common timing advance; or a parameter determined based on an orbital height of the network device; or a parameter determined based on a round-trip delay between the communications apparatus and the network device.

In an embodiment, the fourth message includes the second timing offset; or the fourth message includes a variation between the second timing offset and a reference timing offset, where the reference timing offset is a timing offset currently used by the communications apparatus or a preset timing offset.

In an embodiment, the receiving unit 1303 is further configured to receive effective information sent by the network device, where the effective information is used to indicate an effective time of the second timing offset. Alternatively, the sending unit 1302 is further configured to send effective information to the network device, where the effective information is used to indicate an effective time of the second timing offset. Alternatively, the second timing offset takes effect after m slots after the communications apparatus sends the third message, and m is a preset integer. Alternatively, the second timing offset takes effect after n slots after the communications apparatus receives the fourth message, and n is a preset integer.

In an embodiment, the receiving unit 1303 is further configured to receive a broadcast message sent by the network device. The broadcast message includes any one or more of the following: the startup delay duration of the RAR receive window and the duration of the RAR receive window; or the startup delay duration of the random access contention resolution timer and the duration of the random access contention resolution timer; or the common timing advance; or the orbital height of the network device.

In an embodiment, when the broadcast message includes the startup delay duration of the RAR receive window and the duration of the RAR receive window, the first timing offset meets the following condition:

$$K_{offset1}=\lceil RAR\_window+RAR\_offset)/slot\_duration \rceil+\\\Delta K_{offset}$$

$K_{offset1}$ is a value of the first timing offset; RAR_window is the duration of the RAR receive window, and the duration of the RAR receive window is used to indicate duration of receiving the RAR by the communications apparatus; RAR_offset is the startup delay duration of the RAR receive window, and the startup delay duration of the RAR receive window is used to indicate delay duration by which startup of the RAR receive window is delayed after the communications apparatus sends the first message; slot_duration is the unit of duration; and $\Delta K_{offset}$ is a timing offset difference, and is an integer.

In an embodiment, when the broadcast message includes the startup delay duration of the random access contention resolution timer and the duration of the random access contention resolution timer, the first timing offset meets the following condition:

$$K_{offset1}=\lceil RCR\_timer+RCR\_offset)/slot\_duration \rceil+\\\Delta K_{offset}$$

RCR_timer is the duration of the random access contention resolution timer, and the duration of the random access contention resolution timer indicates a maximum time interval allowed between a moment of starting the random access contention resolution timer after the communications apparatus sends the third message and a moment of receiving the fourth message; RCR_offset is the startup delay duration of the random access contention resolution timer, and the startup delay duration of the random access contention resolution timer is used to indicate delay duration by which startup of the random access contention resolution timer is delayed after the communications apparatus sends the third message; slot_duration is the unit of duration; and $\Delta K_{offset}$ is a timing offset difference, and is an integer.

In an embodiment, the fifth message includes any one of data information, a feedback message, or a sounding reference signal SRS.

In an embodiment, the receiving unit 1303 is further configured to receive a timing advance adjustment instruction sent by the network device, where the timing advance adjustment instruction is used to instruct to update the second timing offset. The sending unit 1302 is further configured to send an updated second timing offset or a second adjustment parameter set to the network device based on the second timing offset, where the second adjustment parameter set is used to determine the updated second timing offset.

In an embodiment, the sending unit 1302 is further configured to: when any one or more of the following conditions are met, receive, from the network device, the updated second timing offset or a variation between the updated second timing offset and the reference timing offset. The any one or more of the conditions include: the communications apparatus switches a cell; the communications apparatus switches a beam; or the communications apparatus switches a bandwidth part BWP.

It should be understood that when the communications apparatus is a terminal device or a component that implements the foregoing function in the terminal device, the processing unit 1301 may be one or more processors, the sending unit 1302 may be a transmitter, and the receiving unit 1303 may be a receiver, or the sending unit 1302 and the receiving unit 1303 may be integrated into one component, such as a transceiver.

When the foregoing communications apparatus is a chip, the processing unit 1301 may be one or more processors, logic circuits, or the like, the sending unit 1302 may be an output interface, and the receiving unit 1303 may be an input interface, or the sending unit 1302 and the receiving unit 1303 are integrated into one unit, for example, an input/output interface or a communications interface.

The communications apparatus in this embodiment of this application has any function of the terminal device in the foregoing method, and details are not described herein again.

FIG. 13 is reused. In another embodiment, the receiving unit 1303 is configured to receive, based on a first timing offset, a third message sent by a terminal device. The first timing offset is used to indicate a delay degree of delay of receiving the third message by the network device; and the third message includes indication information, the indication information is used to indicate a second timing offset, and the second timing offset is an updated first timing offset. The receiving unit 1303 is further configured to receive a fifth message sent by the terminal device.

In an embodiment, the receiving unit 1303 is configured to receive a first message sent by the terminal device, where the first message includes a random access preamble. The sending unit 1302 is configured to send a second message to the terminal device, where the second message includes a random access response message. The sending unit 1302 is further configured to send a fourth message to the terminal device, where the fourth message includes a random access contention resolution message.

In an embodiment, that the indication information is used to indicate a second timing offset includes: The indication information includes the second timing offset.

In an embodiment, that the indication information is used to indicate a second timing offset includes: The indication information includes a first adjustment parameter set, and the first adjustment parameter set is used to determine the second timing offset.

In an embodiment, the first adjustment parameter set includes any one or more of the following parameters: a parameter determined based on startup delay duration of a random access response RAR receive window and duration of the RAR receive window; or a parameter determined based on startup delay duration of a random access contention resolution timer and duration of the random access contention resolution timer; or a parameter determined based on a common timing advance; or a parameter determined based on an orbital height of the communications apparatus; or a parameter determined based on a round-trip delay between the terminal device and the communications apparatus.

In an embodiment, the fourth message includes the second timing offset; or the fourth message includes a variation between the second timing offset and a reference timing offset, where the reference timing offset is a timing offset currently used by the terminal device or a preset timing offset.

In an embodiment, the sending unit 1302 is further configured to send effective information to the terminal device, where the effective information is used to indicate an effective time of the second timing offset. Alternatively, the receiving unit 1303 is further configured to receive effective information sent by the terminal device, where the effective information is used to indicate an effective time of the second timing offset. Alternatively, the second timing offset takes effect after m slots after the communications apparatus receives the third message, and m is a preset integer; or the second timing offset takes effect after n slots after the communications apparatus sends the fourth message, and n is a preset integer.

In an embodiment, the sending unit 1302 is further configured to send a broadcast message. The broadcast message includes any one or more of the following: the startup delay duration of the RAR receive window and the duration of the RAR receive window; or the startup delay duration of the random access contention resolution timer and the duration of the random access contention resolution timer; or the common timing advance; or the orbital height of the communications apparatus.

In an embodiment, when the broadcast message includes the startup delay duration of the RAR receive window and the duration of the RAR receive window, the first timing offset meets the following condition:

$$K_{offset1} = \lceil (RAR\_window + RAR\_offset)/slot\_duration \rceil + \Delta K_{offset}$$

$K_{offset1}$ is a value of the first timing offset; RAR_window is the duration of the RAR receive window, and the duration of the RAR receive window is used to indicate duration of receiving the RAR by the terminal device; RAR_offset is the startup delay duration of the RAR receive window, and the startup delay duration of the RAR receive window is used to indicate delay duration by which startup of the RAR receive window is delayed after the terminal device sends the first message; slot_duration is the unit of duration; and $\Delta K_{offset}$ is a timing offset difference, and is an integer.

In an embodiment, when the broadcast message includes the startup delay duration of the random access contention resolution timer and the duration of the random access contention resolution timer, the first timing offset meets the following condition:

$$K_{offset1}=\lceil RCR\_timer+RCR\_offset)/slot\_duration\rceil+ \Delta K_{offset}$$

RCR_timer is the duration of the random access contention resolution timer, and the duration of the random access contention resolution timer indicates a maximum time interval allowed between a moment of starting the random access contention resolution timer after the terminal device sends the third message and a moment of receiving the fourth message; RCR_offset is the startup delay duration of the random access contention resolution timer, and the startup delay duration of the random access contention resolution timer is used to indicate delay duration by which startup of the random access contention resolution timer is delayed after the terminal device sends the third message; slot_duration is the unit of duration; and $\Delta K_{offset}$ is a timing offset difference, and is an integer.

In an embodiment, the fifth message includes any one of data information, a feedback message, or a sounding reference signal SRS.

In an embodiment, the sending unit 1302 is further configured to send a timing advance adjustment instruction to the terminal device, where the timing advance adjustment instruction is used to instruct to update the second timing offset. The receiving unit 1303 is further configured to receive an updated second timing offset or a second adjustment parameter set sent by the terminal device, where the second adjustment parameter set is used to determine the updated second timing offset.

In an embodiment, the sending unit 1302 is further configured to: when any one or more of the following conditions are met, send the updated second timing offset or a variation between the updated second timing offset and the reference timing offset to the terminal device. The any one or more of the conditions include: the terminal device switches a cell; or the terminal device switches a beam; or the terminal device switches a bandwidth part BWP.

It should be understood that when the communications apparatus is a network device or a component that implements the foregoing function in the network device, the processing unit 1301 may be one or more processors, the sending unit 1302 may be a transmitter, and the receiving unit 1302 may be a receiver, or the sending unit 1302 and the receiving unit 1303 may be integrated into one component, such as a transceiver.

When the foregoing communications apparatus is a chip, the processing unit 1301 may be one or more processors, logic circuits, or the like, the sending unit 1302 may be an output interface, and the receiving unit 1303 may be an input interface, or the sending unit 1302 and the receiving unit 1303 are integrated into one unit, for example, an input/output interface or a communications interface.

The communications apparatus in this embodiment of this application has any function of the network device in the foregoing method, and details are not described herein again.

Figure 14:
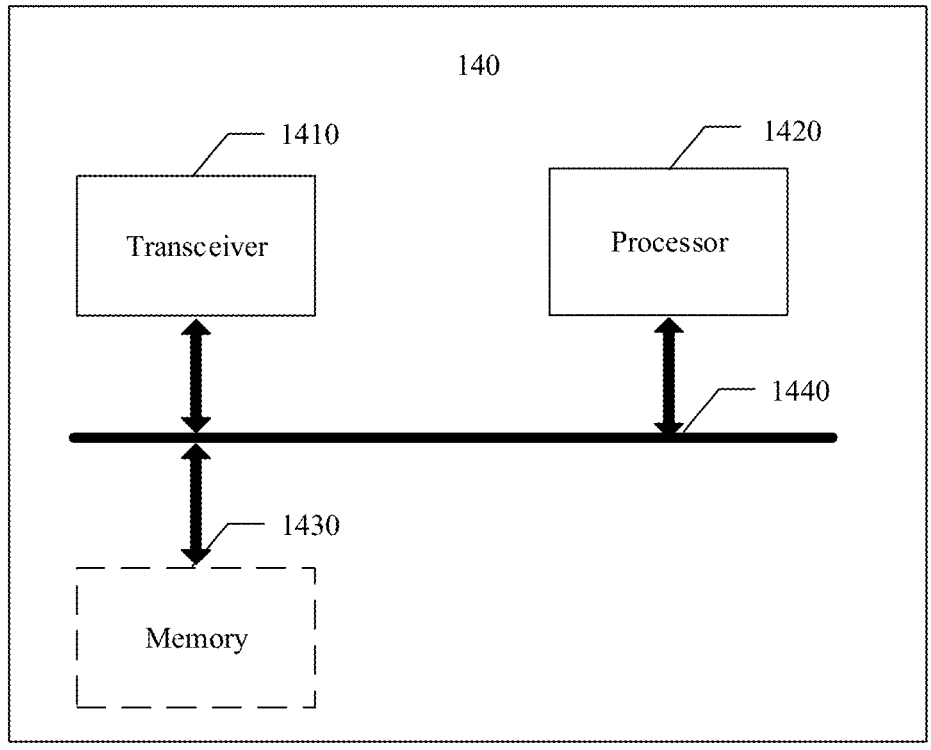
FIG. 14 is a schematic diagram of a structure of a communications apparatus according to an embodiment of this application.

Further, when the foregoing processing unit is implemented by using a processor, the receiving unit and the sending unit are integrated into one unit and implemented by using a transceiver, as shown in FIG. 14. The communications apparatus 140 includes at least one processor 1420, configured to implement the function of the terminal device in the method provided in the embodiments of this application; or configured to implement the function of the network device in the method provided in the embodiments of this application. The communications apparatus 140 may further include a transceiver 1410. The transceiver is configured to communicate with another device/apparatus by using a transmission medium. The processor 1420 receives and transmits data and/or signaling by using the transceiver 1410, and is configured to implement the corresponding method in the foregoing method embodiments.

In an embodiment, the communications apparatus 140 may further include at least one memory 1430, configured to store program instructions and/or data. The memory 1430 is coupled to the processor 1420. The coupling in this embodiment of this application is indirect coupling or a communication connection between apparatuses, units, or modules for information exchange between the apparatuses, the units, or the modules, and may be in electrical, mechanical, or other forms. The processor 1420 may operate in collaboration with the memory 1430. The processor 1420 may execute the program instruction stored in the memory 1430. At least one of the at least one memory may be included in the processor.

A specific connection medium between the transceiver 1410, the processor 1420, and the memory 1430 is not limited in this embodiment of this application. In this embodiment of this application, the memory 1430, the processor 1420, and the transceiver 1410 are connected by using a bus 1440 in FIG. 14. The bus is represented by using a thick line in FIG. 14. A manner of connection between other components is merely an example for description, and is not limited thereto. The bus may be classified into an address bus, a data bus, a control bus, and the like. For ease of representation, only one thick line is used to represent the bus in FIG. 14, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in the embodiments of this application. The general-purpose processor may be a microprocessor, any conventional processor, or the like. The operations of the methods disclosed with reference to the embodiments of this application may be directly performed and completed by a hardware processor, or may be performed and completed by using a combination of hardware and software modules in the processor.

It may be understood that for a specific implementation of the communications apparatus shown in FIG. 14, refer to the function of the terminal device shown in FIG. 13. Alternatively, for a specific implementation method of the communications apparatus shown in FIG. 14, refer to the function of the network device shown in FIG. 13.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or a part of the units may be selected based on an actual requirement to achieve the objectives of the solutions in the embodiments in this application.

In addition, functional units in the embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods in the embodiments of this application. The foregoing storage medium includes any medium that can store program code, such as a USB flash drive, a removable hard disk, a read-only memory (ROM), a random access memory (RAM), a magnetic disk, or an optical disc.

In addition, according to the method for updating a timing offset provided in the embodiments of this application, this application further provides a computer program, where the computer program is configured to perform operations and/or processing performed by the terminal device in the method provided in this application.

This application further provides a computer program, where the computer program is used to perform operations and/or processing performed by the network device in the method provided in this application.

This application further provides a computer-readable storage medium. The computer-readable storage medium stores computer instructions. When the computer instructions run on a computer, the computer is enabled to perform operations and/or processing performed by the terminal device in the method provided in this application.

This application further provides a computer-readable storage medium. The computer-readable storage medium stores computer instructions. When the computer instructions run on a computer, the computer is enabled to perform operations and/or processing performed by the network device in the method provided in this application.

This application further provides a computer program product. The computer program product includes computer code or instructions. When the computer code or instructions run on a computer, the method in the method embodiment of this application is implemented.

This application further provides a computer program product. The computer program product includes computer code or instructions. When the computer code or instructions run on a computer, the method in the method embodiment of this application is implemented.

This application further provides a wireless communications system, including the terminal device and the network device in the embodiments of this application.

The foregoing description is merely specific implementations in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

Based on the foregoing description of FIG. 6 and a related method, the Msg2 may carry an adjustment parameter $\Delta K$, and $\Delta K$ is determined by using a coverage area of a beam in which the UE is located. Similarly, the adjustment parameter $\Delta K$ value of Koffset can also be determined based on a coverage area of a cell in which the UE is located. Correspondingly, it is obtained according to a Koffset determining formula (Koffset=f{Max_RTD_cell, time_duration}), for example, Koffset=⌈Max_RTD_cell/time_duration⌉, where Max_RTD_cell is a maximum round-trip delay between UE in a coverage area of a cell and the base station.

If the base station side performs delay compensation when receiving the signal sent by the UE, the determining formula of Koffset is rewritten based on the foregoing method and formula. For example, Koffset is determined by using a coverage area of a beam, and Koffset=⌈Max_RTD beam-delay_compensated/time_duration⌉. Similarly, in an embodiment, Koffset is determined based on a coverage area of a cell, and the foregoing formula may be changed to Koffset=⌈Max_RTD_cell-delay_compensated/time_duration⌉.

$\Delta K$ may be changed from being carried in the Msg2 to being transmitted in RRCSetup signaling, that is, transmitted in the Msg4. Preferably, when the RRCSetup signaling (msg4) carries $\Delta K$-related information, Koffset used when the UE sends the Msg3 can work (that is, it is ensured that the initial Koffset obtained by the UE based on the broadcast message is greater than the maximum round-trip delay).

In an embodiment, in the foregoing related methods, Koffset may be carried in only the Msg2, that is, the UE directly sends the Msg3 by using Koffset transmitted by the Msg2. In this case, Koffset may be Koffset at a beam level or a cell level.

In the foregoing FIG. 6 and related method, Koffset is sent based on a four-step (four-step) random access process. For a two-step random access process, a MsgB may be used to send $\Delta K$ or Koffset. The foregoing formula is used for design. The UE jointly uses the broadcast parameter and $\Delta K$ to obtain Koffset according to an agreed formula.

It may be understood that the foregoing formula is merely an example for description, and a specific formula form for obtaining Koffset and $\Delta K$ is not limited. For example, the broadcast parameter may further use duration of a RAR receive window, startup delay duration of the RAR receive window, duration of a random access contention resolution timer, and startup delay duration of the random access contention resolution timer.

For example, Koffset and $\Delta K$ are obtained by using the following formula:

$$K\text{offset}=\lceil (\text{RAR\_window}+\text{RAR\_delay})/\text{slot\_duration}\rceil+\Delta K\text{offset}$$

Herein, RAR_window is the duration of the RAR receive window, and RAR_delay is the startup delay duration of the RAR receive window. Alternatively, $$K\text{offset}=[(\text{RAR\_delay})/\text{slot\_duration}]+\Delta K\text{offset}$$

Alternatively, $$K\text{offset}=[(\text{RCR\_timer}+\text{RCR\_offset})/\text{slot\_duration}]+\Delta K\text{offset}$$

Herein, RCR_timer is the duration of the random access contention resolution timer, and RCR_offset is the startup delay duration of the random access contention resolution timer.

Alternatively, $$K\text{offset}=[(\text{RCR\_offset})/\text{slot\_duration}]+\Delta K\text{offset}$$

Alternatively, $$K\text{offset}=[\text{TA\_common}/\text{slot\_duration}]+\Delta K\text{offset}$$

Herein, TA_common is a broadcast common timing advance.

Compared with sending the Koffset value directly to the UE, signaling overheads can be reduced by using joint broadcast parameters and $\Delta K$. In addition, as shown in Table 2, cell-level Koffset, beam-level Koffset, and UE-level Koffset are compared in terms of signaling overheads and end-to-end delay. It can be seen that the beam-level Koffset has a smaller end-to-end delay than the cell-level Koffset, and the beam-level Koffset has smaller signaling overheads than the UE-level Koffset.

TABLE 2

| Comparison of different Koffset update mechanisms | | | |
|---|---|---|---|
| | Cell-level Koffset | Beam-level Koffset | UE-level Koffset |
| Signaling overhead | Low | Intermediate | High |
| E2E Delay | Large | Intermediate | Small |

Figure 15:
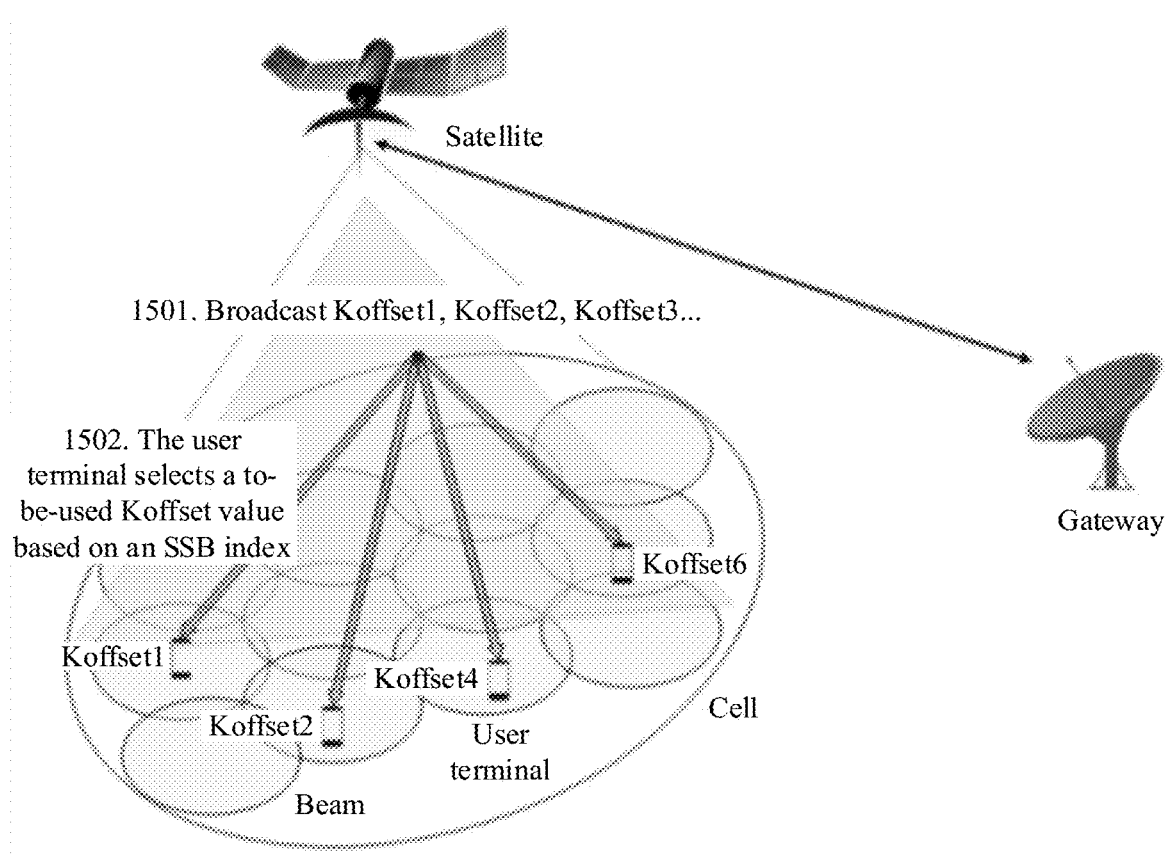
FIG. 15 is a schematic diagram of a reference point-based NTN communications system according to an embodiment of this application.

FIG. 15 is a schematic diagram of a reference point-based NTN communications system according to this application. A timing offset may be updated in the reference point-based NTN communications system. In an embodiment, a method for updating a timing offset is applicable to a four-step random access scenario, and the method includes the following operations.

1501. A satellite (gNB) broadcasts a plurality of pieces of Koffset value information to a coverage area of a cell.

1502. After receiving the broadcast message, UE determines a corresponding Koffset value based on a received SSB index number.

In an embodiment, the plurality of pieces of Koffset value information in operation 1501 may be a Koffset number or an ID, for example, Koffset1, Koffset2, or Koffset3. In operation 1502, for example, when the SSB index number received by the UE is 1, Koffset1 is used. When the SSB index number received by the UE is 3, Koffset3 is used. By establishing a relationship (for example, a mapping relationship) between the Koffset value and the SSB index number, the method may allow the UE to use the Koffset value of a beam level, thereby reducing an end-to-end delay.

Alternatively, the satellite can broadcast information such as $K_{offset1}$, $\Delta K_{offset2}$, $\Delta K\text{offset3}$, $\Delta K\text{offset4}$, and the like. The UE may obtain a corresponding $K_{offset}$ value by using the following formula:

$$K\text{offset1}=K\text{offset1}$$

$$K\text{offset2}=K\text{offset1}+\Delta K\text{offset2}$$

$$K\text{offset3}=K\text{offset1}+\Delta K\text{offset3}$$

$$K\text{offset4}=K\text{offset1}+\Delta K\text{offset4}$$

. . . (basic value+specific variable)

Alternatively, $$K\text{offset1}=K\text{offset1}$$

$$K\text{offset2}=K\text{offset1}+\Delta K\text{offset2}$$

$$K\text{offset3}=K\text{offset1}+\Delta K\text{offset2}+\Delta K\text{offset3}$$

$$K\text{offset4}=K\text{offset1}+\Delta K\text{offset2}+\Delta K\text{offset3}+\Delta K\text{offset4}$$

. . . (basic value+accumulated variables)

It can be learned, from Table 3-Relationship between a quantity of synchronous broadcast blocks, a subcarrier spacing, and a carrier frequency, that when the carrier frequency is greater than 6 GHz, a maximum of 64 synchronous broadcast blocks (SSBs) can be broadcast. SSB indexes are 64 synchronous broadcast block indexes that are jointly indicated by 3 bits of a PBCH and 3 bits implicitly indicated in PBCH scrambling mode.

TABLE 3

| Relationship between a quantity of synchronous broadcast blocks, a subcarrier spacing, and a carrier frequency | | |
|---|---|---|
| Subcarrier spacing | Carrier frequency | Quantity of synchronous broadcast blocks |
| 15 k | f < 3 GHz | 4 |
| 15 k | 3 GHz < f < 6 GHz | 8 |
| 30 k | f < 3 GHz | 4 |
| 30 k | 3 GHz < f < 6 GHz | 8 |
| 120 k | f > 6 GHz | 64 |
| 240 k | f > 6 GHz | 64 |

In an embodiment, the plurality of pieces of Koffset value information in operation 1501 may be plurality of Koffset reference point coordinates, for example, Koffset reference point coordinates 1, Koffset reference point coordinates 2, and Koffset reference point coordinates 3. In operation 1502, after receiving the broadcast message, the UE calculates the to-be-used Koffset value by using the corresponding Koffset reference point coordinates based on the received SSB index number (SSB index).

Figure 16:
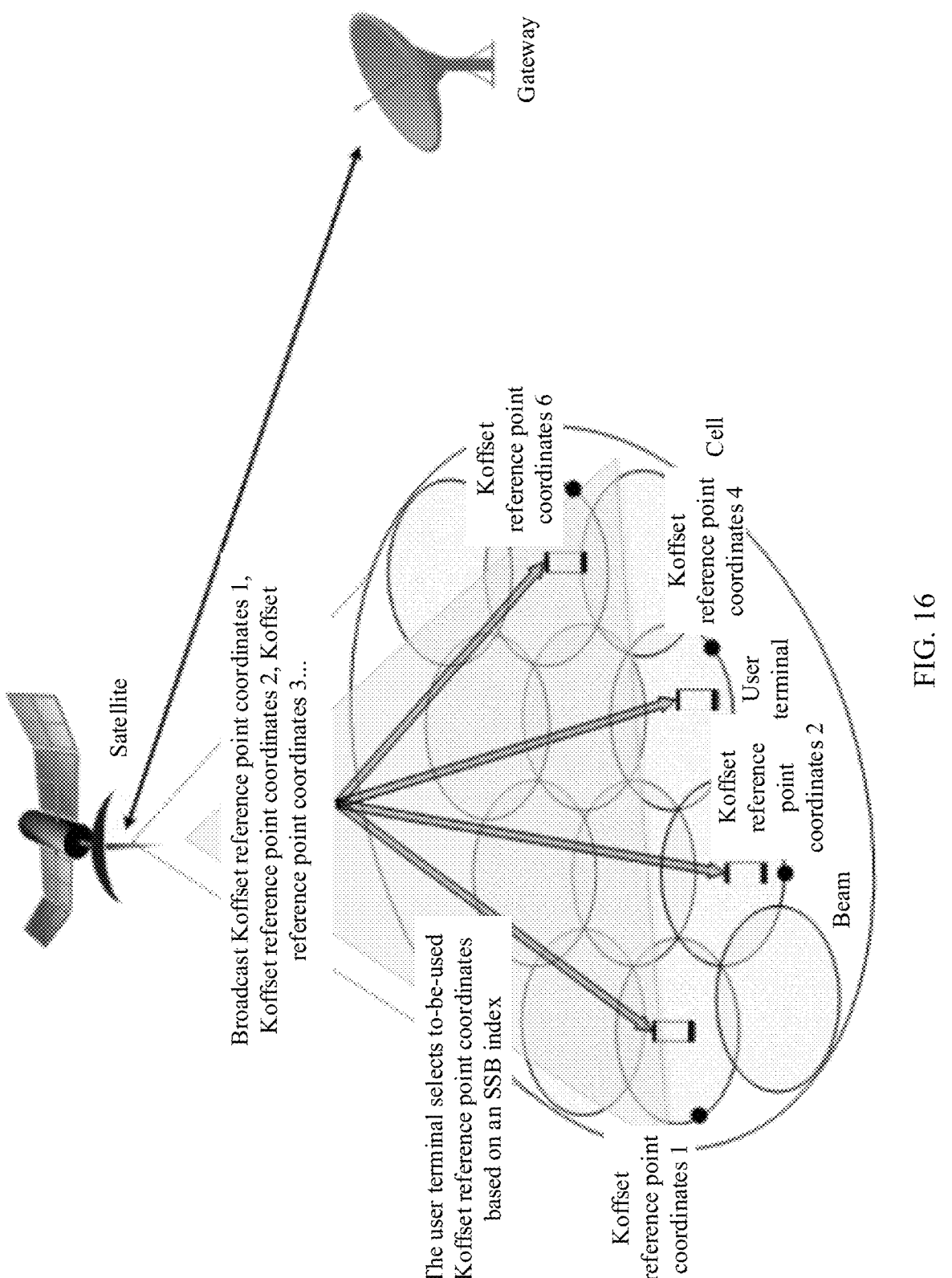
FIG. 16 is an architecture diagram of an NTN system that replaces a Koffset value based on reference point coordinates according to an embodiment of this application.

For example, in the NTN system architecture diagram shown in FIG. 16 that replaces the Koffset value based on reference point coordinates, when the SSB index number received by the UE is 3, the Koffset reference point coordinates 3 are used to obtain the to-be-used Koffset value. The UE calculates a round-trip delay RTD_reference between the Koffset reference point 3 and the satellite based on the Koffset reference point coordinates 3 and the satellite location coordinates (which may be obtained by using the ephemeris information), and then calculates a to-be-used Koffset value based on the round-trip delay. In an embodiment, the following formula may be used:

$$Koffset=[RTD\_reference/time\_duration]$$

In an embodiment, if an impact of a service link delay and a feeder link delay on calculation of Koffset is considered, for example, when the satellite works in transparent mode, each UE needs to use two reference points to calculate the Koffset value to be used.

In operation 1501, the plurality of Koffset-value information may be a plurality of Koffset reference point coordinates and one Koffset feeder link reference point coordinates (refer to the design described in FIG. 8*a* and a method thereof), for example, Koffset feeder link reference point coordinates, Koffset reference point coordinates 1, Koffset reference point coordinates 2, Koffset reference point coordinates 3, and the like.

In operation 1502, that the UE determines a corresponding Koffset value based on the received SSB index number after receiving the broadcast message includes: calculating the to-be-used Koffset value based on the received SSB index number by using the Koffset feeder link reference point coordinates and corresponding Koffset reference point coordinates. For example, when the SSB index number received by the UE is 1, the Koffset feeder link reference point coordinates and corresponding Koffset reference point coordinates 1 are used to obtain the to-be-used Koffset value. The UE calculates a round-trip delay RTD_reference between the Koffset reference point and the satellite based on the Koffset reference point coordinates 1 and the satellite location coordinates (which may be obtained from ephemeris information). The UE calculates a round-trip delay RTD_reference feeder between the Koffset feeder link reference point and the satellite based on the Koffset feeder link reference point coordinates and the satellite location coordinates. Then, the to-be-used Koffset value is calculated based on RTD_reference and RTD_reference feeder. In an embodiment, the following formula may be used:

$$Koffset=[(RTD\_reference+RTD\_reference~feeder)/\\time\_duration]$$

In an embodiment, to flexibly configure the broadcast Koffset value or the Koffset reference point on the network side, an indicator is added to indicate whether a plurality of Koffset values or a plurality of Koffset reference point coordinates are transmitted. As shown in a schematic diagram A of a Koffset value/Koffset reference point coordinate indicator in FIG. 17, a Koffset value/Koffset reference point coordinate indicator is introduced to indicate whether at least one Koffset value or at least one Koffset reference point coordinate is transmitted later. For example, an indicator of 0 indicates that at least one Koffset value is transmitted later, and an indicator of 1 indicates that at least one Koffset reference point coordinate is transmitted later. When the indicator is 0, the Koffset value transmitted later may be Koffset1, Koffset2, Koffset3, and so on. When the indicator is 1, Koffset reference point coordinates transmitted later may be Koffset reference point coordinates 1, Koffset reference point coordinates 2, Koffset reference point coordinates 3, and so on. For a specific use method of the Koffset value and the reference point, refer to the foregoing embodiment. If the effect of the feeder link delay on determining the Koffset value is considered, the Koffset feeder link reference point coordinates may be transmitted together with the Koffset reference point coordinates, as shown in a schematic diagram B of a Koffset value/Koffset reference point coordinate indicator in FIG. 18.

Flexible configuration of broadcast Koffset values and/or Koffset reference points benefits the system in different modes:

1. Gaze mode (steerable): When the system works in gaze mode, the coverage area of the satellite beam remains unchanged for a period of time, and a broadcast Koffset reference point does not change. The system may configure a broadcast Koffset reference point by using an indicator. Therefore, the system does not need to update the value, which reduces complexity of system broadcast update.

2. Non-gaze mode: When the system works in non-gaze mode, the coverage area of the satellite beam moves with the movement of the satellite. In this case, the Koffset value of the beam does not change. Therefore, the system may configure a broadcast Koffset value by using an indicator.

In an embodiment, based on the foregoing similar idea, the Koffset value or the Koffset reference point may further be replaced with a corresponding Koffset angle value. The UE calculates the round-trip delay value by using the angle value of the Koffset, and then obtains the Koffset value by using the foregoing method.

As shown in a schematic diagram of a Koffset angle (Koffset feeder link angle) in FIG. 19, assuming that a speed of a satellite in a moving direction is V, a satellite (gNB) broadcasts at least one Koffset angle (corresponding to a beam) and a Koffset feeder link angle to UE. The Koffset angle may replace the foregoing Koffset value or Koffset reference point, and the Koffset feeder link angle may replace the foregoing Koffset value or Koffset feeder link reference point.

After the UE obtains the corresponding Koffset angle α and the Koffset feeder link angle $f$ based on the SSB index, the Koffset to be used may be calculated according to the following formula (for another formula symbol, refer to the foregoing embodiment):

$$Koffset=[[2*H/|\sin(\alpha)|+2*H/|\sin(f~)|]/c/time\_dura-\\tion]$$

If the UE obtains only a corresponding Koffset angle α based on the SSB index, the UE may calculate Koffset to be used according to the following formula:

$$Koffset=[2*H/|\sin(\alpha)|/c/time\_duration]$$

In the gaze mode, Koffset is represented by using the Koffset angle manner. Compared with the Koffset value manner, frequent updating can be avoided, and complexity of a system broadcast procedure is reduced.

The foregoing describes a method for determining an initial timing offset of a cell level and an initial timing offset of a beam level, a method for updating a timing offset, and the like. The following further describes a method for determining an initial timing offset of a beam level and a method for determining an initial timing offset of a cell level.

The method for determining an initial timing offset of a beam level (for example, beam specific or beam-specific) is as follows.

For example, as described in the foregoing FIG. 15, the base station broadcasts a plurality of pieces of Koffset (also written as Koffset in this specification) value information to a cell coverage area, and then the UE determines a corresponding Koffset value based on an SSB index number, a TCI number, a beam number, or the like. The broadcasting, by the base station, a plurality of pieces of Koffset value information to a cell coverage area includes: The base station broadcasts a plurality of timing offset Koffset values by using SIB 1 messages, or the base station broadcasts Koffset values respectively corresponding to a plurality of beams by using broadcast messages, such as SIB 1 messages. The beam-level timing offset refers to that UEs use a same timing offset value in beams corresponding to the offset, that is, use the beam-level timing offset. For example, the beam-level timing offset may be determined by using a maximum round-trip delay between the gNB and the UE in the beam. The beam-level timing offset includes a beam-level initial timing offset. The "initial" in the initial timing offset represents a parameter used to access the beam initially (or the first n times, for example, the first or second time) or a basic parameter used in the beam.

In an embodiment, the base station may broadcast a plurality of Koffset values by using random access configuration generic RACH-ConfigGeneric signaling in the SIB 1 message or signaling with a similar function. The RACH-ConfigGeneric signaling is contained in the parameter set to be used in a process in which the terminal randomly accesses a system. Alternatively, it may be understood as: a plurality of Koffset values are added to the RACH-ConfigGeneric parameter (or referred to as signaling or the like) in the SIB 1 signal. For example, the RACH-ConfigGeneric signaling may include one or more variable fields, and the one or more variable fields are used to indicate the foregoing plurality of Koffset values.

For example, the RACH-ConfigGeneric parameter may include a variable field Koffset-list, and the variable field Koffset-list may represent a plurality of Koffset values, that is, indicate a timing offset quantity value corresponding to a plurality of beams. For another example, the variable field Koffset-list may include two variable fields Koffset1 and Koffset-diff, where the variable field Koffset1 represents a timing offset value of the beam 1, and the variable field Koffset-diff represents a difference between a timing offset of another beam and the beam 1. For another example, there may be a maximum of 63 timing offset differences, that is, the variable field Koffset-list may represent Koffset of 64 beams, that is, the 63 timing offset differences may be used to determine a timing offset corresponding to 63 beams, and Koffset1 may be used to determine a timing offset corresponding to one beam.

In other words, the variable field Koffset-diff in this embodiment of this application may be understood as ΔKoffset2, ΔKoffset3, ΔKoffset4, or the like in the foregoing embodiment.

For example, a RACH-ConfigGeneric signaling format in the SIB 1 message is shown as follows:

| RACH-ConfigGeneric ::= | SEQUENCE { |
|---|---|
| prach-ConfigurationIndex | INTEGER (0..255), |
| Koffset-list | Koffset-list, |
| ..., | |
| } | |
| Koffset-list ::= | SEQUENCE { |
| Koffset1 | INTEGER (0.. 4332) OPTIONAL, |
| Koffset-diff | SEQUENCE (SIZE (1..63)) |
| | OF INTEGER (−24.. 24) |
| OPTIONAL, | |
| } | |

In this embodiment of this application, a value range of the variable field Koffset1 and the variable field Koffset-diff may be related to a maximum round-trip delay (for example, related to an orbital height and a minimum communication elevation angle) between cells or beams in a communications scenario supported by a standard protocol, a maximum round-trip delay difference between cells or beams, and calculation of a timing offset duration unit slot_duration.

For example, in a GEO transparent scenario, when a minimum communication elevation angle is 10 degrees, a maximum round-trip delay is 541.46 ms, and the unit of duration slot_duration uses a minimum slot length as an example, that is, 0.125e−3 s. In the following signaling examples of other parts, a minimum slot length is also used as an example of the unit of duration, and details are not described again. Due to 541.46e−3/0.125e−3=4331.68, variable field Koffset1 requires 13 bits to indicate 0 to 4332. 13 bits of the variable field Koffset1 may indicate a range of 0 to 8191. In the foregoing signaling example, only a range of 0 to 4332 is used, and an unused range of 4333 to 8191 may be reserved (reserved), or may be reserved for another indication use.

A value range of the variable field Koffset-diff may be determined based on a maximum round-trip delay difference between beams, a satellite orbital height, a cell size, or a minimum communication elevation.

For example, in a GEO transparent scenario, a cell diameter is 450 km, a minimum communication elevation angle is 10 degrees, and a maximum round-trip delay difference in a cell is 2.933e−3 s. Because 2.933e−3/0.125e−3=23.464, 6 bits are required to indicate a value range of −24 to +24, and 6 bits of a timing offset difference in a variable field Koffset-diff may indicate −31 to +31. In the foregoing signaling example, only a range of −24 to +24 is used, and unused ranges of −31 to +−25 and +25 to +31 may be reserved, or may be reserved for another indication use.

For example, after obtaining the Koffset-list signaling, the UE may separately obtain, based on the variable field Koffset1 and the variable field Koffset-diff, the Koffset value of the beam 1 corresponding to Koffset1. If Koffset-diff has 63 timing offset differences, the UE may further obtain that the Koffset value of the beam 2 is Koffset1+the first Koffset-diff value (that is, Koffset1+the first timing offset difference), the Koffset value of the beam 3 is Koffset1+the second Koffset-diff value (that is, Koffset1+the second timing offset difference), and so on. As described above, a beam number, such as a beam 1, a beam 2, and the like, may be in a relationship with an SSB index number or a TCI number, for example, an SSB index number or a TCI number is a beam number. Such a signaling transmission method provides flexibility and can save signaling bit overheads in a multi-beam scenario.

In an embodiment, it may be agreed that after receiving the Koffset-diff value, the UE subtracts a fixed value to obtain a difference between timing offsets corresponding to a beam that may be used by the UE. Compared with the foregoing solution for directly sending a timing offset difference that can be directly used to the UE, in this method, the UE obtains, through calculation, a difference between timing offsets corresponding to a beam that can be used, and leaves the calculation amount to the UE, thereby reducing calculation complexity on a base station side. For example, the Koffset-diff variable field uses 6 bits to represent 0 to 48, which is subtracted by a fixed value (assuming a fixed value of 24) after the UE receives the Koffset-diff value, so that the UE uses a timing offset difference representation range of −24 to +24. For a specific example, a value in the Koffset-diff variable field is 8. After receiving the value, the UE subtracts the fixed value 24 from the value 8 to obtain −16. The UE uses −16 as a timing offset difference of a beam corresponding to the value.

A method for determining an initial timing offset of a cell level (cell specific or cell-specific) is as follows.

The base station broadcasts the initial Koffset value of the cell by using a broadcast message (such as the SIB 1) or sends the initial Koffset value to the UE by using RRC signaling (such as RRC setup RRCSetup signaling, RRC reconfiguration RRCReconfiguration signaling, or RRC resume RRCResume signaling). In other words, the base station may enable the UE in the cell to obtain the initial Koffset value by using the foregoing method, so that the UE in the cell uses the initial Koffset value. The cell-level timing offset refers to that a same timing offset value is used by UE in a cell corresponding to the timing offset, that is, the cell-level timing offset is used. For example, a cell-level timing offset may be determined by using a maximum round-trip delay between the gNB and the UE in the cell. The cell-level timing offset includes a cell-level initial timing offset. The "initial" in the initial timing offset indicates a parameter used to access the cell initially or a basic parameter used in the cell.

In an embodiment, the base station may broadcast, by using RACH-ConfigGeneric signaling in the SIB 1 message, the Koffset value corresponding to the cell (cell). For example, the RACH-ConfigGeneric signaling may include one or more variable fields, and the one or more variable fields may be used to indicate the foregoing Koffset value. For example, the one or more variable fields may be variable fields Koffset initial, Koffset-LEO and Koffset-complement, Koffset-LEO-600, Koffset-LEO-1200 and Koffset-GEO in the following embodiments.

A specific description of the RACH-ConfigGeneric signaling may be as follows.

Manner 1

A new variable field Koffset initial is added to the RACH-ConfigGeneric parameter, to indicate the initial timing offset used by the UE in the cell. For example, the value range of the variable field Koffset initial may be determined based on a maximum round-trip delay (for example, related to an orbital height and a minimum communication elevation angle) in a communication scenario supported by a standard protocol. It may be understood that for description of the value range of the variable field Koffset initial, refer to the foregoing description of the variable field Koffset1. This signaling transmission method saves more signaling overheads than beam-level Koffset signaling transmission.

For example, a RACH-ConfigGeneric signaling format in the SIB 1 message is shown as follows:

| RACH-ConfigGeneric ::= | SEQUENCE { |
| prach-ConfigurationIndex | INTEGER (0..255), |
| Koffset_initial | INTEGER (0.. 4332), |
| ..., | |
| } | |

Manner 2

Two new variable fields Koffset-LEO and Koffset-complement are added to the RACH-ConfigGeneric parameter, and can be used to determine the initial timing offset. For example, a value range (including a representation range and/or a quantity of bits represented) of Koffset-LEO and Koffset-complement may be determined based on an orbital height range of a satellite and a minimum communication elevation angle. Therefore, to further save signaling bits, a combination indication may be performed on the initial timing offset based on the orbital height range.

For example, a RACH-ConfigGeneric signaling format in the SIB 1 message is shown as follows:

| RACH-ConfigGeneric ::= | SEQUENCE{ |
| prach-ConfigurationIndex | INTEGER (0..255), |
| Koffset-LEO | BIT STRING (SIZE(9)), |
| Koffset-complement | BIT STRING (SIZE(4)) OPTIONAL, |
| ... | |
| } | |

The newly added variable field Koffset-complement is optional (optional), indicating that the variable field Koffset-complement may be sent or may not be sent. For whether to send the variable field Koffset-complement or a condition under which the variable field Koffset-complement is sent, refer to the following example.

For example, in a scenario in which an orbital height is not higher than 1200 km, when a minimum communication elevation angle is 10 degrees, a maximum round-trip delay is 41.745895 ms, an initial timing offset is 41.745895e−3/0.125e−3=333.9672, and a corresponding quantity of bits is 9 bits. Therefore, the network side may send only Koffset-LEO signaling (9 bits), that is, does not send Koffset-complement. In this case, only 9-bit signaling needs to be sent to indicate the timing offset parameter. The value range is 0 to +334. A range that may be indicated by 9 bits is 0 to +511. In the foregoing signaling example, only a range of 0 to +334 is used, and an unused range of +335 to +511 may be reserved, or may be reserved for another indication use.

For another example, in a scenario in which the orbital height is greater than 1200 km, the network side may send Koffset-LEO and Koffset-complement signaling (4 bits) to the UE, where Koffset-complement represents a high bit and Koffset-LEO represents a low bit. Koffset-LEO and Koffset-complement compose 13-bit signaling, indicating the range of 0 to 4332. A range that may be represented by 13 bits is 0 to 8191. In the foregoing signaling example, only a range of 0 to 4332 is used, and an unused range of 4333 to 8191 may be reserved, or may be reserved for another indication use. For an indication range of a combination of Koffset-LEO and Koffset-complement, refer to the foregoing description of the variable field Koffset1.

Therefore, after obtaining Koffset-LEO or Koffset-LEO and Koffset-complement signaling, the UE may obtain, based on the signaling, a timing offset to be used. This signaling transmission method provides flexibility and can save some signaling bits in a scenario in which orbital height is not high.

It may be understood that a Koffset range in the foregoing example signaling is merely an example. A value range of Koffset is not limited in this application, and a value range of Koffset may be agreed upon based on an actual deployment condition.

Manner 3

Three new variable fields Koffset-LEO-600, Koffset-LEO-1200, and Koffset-GEO are added to the RACH-ConfigGeneric parameter, to indicate the timing offset used by the UE in the cell. A value range (including a representation range and/or a quantity of bits represented) of Koffset-LEO-600, Koffset-LEO-1200, or Koffset-GEO may be determined based on an orbital height range of the satellite and a minimum communication elevation angle. Koffset- LEO-600 represents a timing offset related parameter corresponding to an orbital height not greater than 600 km, Koffset-LEO-1200 represents a timing offset related parameter corresponding to an orbital height greater than 600 km and not greater than 1200 km, and Koffset-GEO represents a timing offset related parameter corresponding to an orbital height not greater than 36000 km. The Koffset-LEO-600, Koffset-LEO-1200, or Koffset-GEO parameter may be set to optional. For how to send signaling, refer to the following example.

For example, in a scenario in which the orbital height is not higher than 600 km, the network side may send only Koffset-LEO-600 signaling, that is, do not send Koffset-LEO-1200 or Koffset-GEO. When the minimum elevation angle is 10 degrees, the maximum round-trip delay of the LEO-600 scenario is 25.755 ms, the maximum timing offset is 25.755e−3/0.125e−3=206.04, and a corresponding quantity of bits is 8 bits (corresponding to the description in the LEO-600 transparent scenario in the foregoing embodiment). In this case, only 8-bit signaling needs to be sent for the UE to determine a timing offset, and a range used to indicate the timing offset is 0 . . . +207. A range that may be indicated by 8 bits is 0 to +255. In the foregoing signaling example, only a range of 0 to +207 is used, and an unused range of 208 to 255 may be reserved, or may be reserved for another indication use.

For another example, in a scenario in which the orbital height is greater than 600 km and is not greater than 1200 km, the network side may send Koffset-LEO-1200 signaling to the UE, that is, do not send Koffset-LEO-600 or Koffset-GEO. In this case, signaling of 9 bits (corresponding to the description in the LEO-1200 transparent scenario in the foregoing embodiment) needs to be sent, so that the UE is configured to determine a timing offset. It may be understood that for a description of a value range of the Koffset-LEO-1200 signaling, refer to the foregoing description of the Koffset-LEO. Details are not described herein again.

For another example, in a scenario in which the orbital height is higher than 1200 km, the network side only needs to send Koffset-GEO signaling, that is, does not send Koffset-LEO-600 and Koffset-LEO-1200. In this case, signaling of 13 bits (corresponding to the description in the GEO transparent scenario in the foregoing embodiment) needs to be sent, so that the UE is configured to determine a timing offset, and a range used to represent the timing offset is 0 to +4332. It may be understood that for a description of a value range of the Koffset-GEO signaling, refer to the foregoing descriptions of the Koffset-LEO, the Koffset-complement, and the Koffset-LEO-600. Details are not described herein again.

For example, a RACH-ConfigGeneric signaling format in the SIB 1 message is shown as follows:

```
RACH-ConfigGeneric ::=      SEQUENCE {
prach-ConfigurationIndex      INTEGER (0..255),
Koffset-LEO-600             INTEGER (0.. 207) OPTIONAL,
Koffset-LEO-1200            INTEGER (0.. 334) OPTIONAL,
Koffset-GEO                 INTEGER (0.. 4332) OPTIONAL,
...
}
```

It may be understood that a value of the foregoing signaling format is only an example, and should not be understood as a limitation of this embodiment of this application.

In this embodiment of this application, the base station may further add a new variable field corresponding to the timing offset to the PUSCH-ConfigCommon physical layer uplink shared channel common configuration signaling in the SIB 1 or the PUSCH-Config physical layer uplink shared channel configuration signaling in the RRC signaling. For a specific description of adding a new variable field corresponding to a timing offset to the PUSCH-ConfigCommon physical layer uplink shared channel common configuration signaling in the SIB 1 or the PUSCH-Config physical layer uplink shared channel configuration signaling in the RRC signaling, refer to the foregoing manner 1 to manner 3. Details are not described herein again.

It may be understood that values of signaling shown in this embodiment of this application are merely examples, and should not be construed as a limitation on this embodiment of this application.

The foregoing methods and embodiments may be combined with each other, and a method and a procedure for updating a timing offset in different scenarios may be combined. For example, the following updates a combination of a cell-level timing offset, a beam-level timing offset, or a UE-level timing offset with reference to different scenarios.

In other words, the cell-level Koffset, beam-level Koffset, or UE-level Koffset shown above may be used together.

It may be understood that a UE-level (UE specific or UE-specific) timing offset indicates that different timing offset values may be used between UEs in a cell/beam.

For example, the UE obtains the cell-level Koffset value by using a broadcast message during initial access. After the UE initiates random access, the base station updates, based on the beam in which the UE is located, the Koffset value used by the UE to the beam level. As shown in Table 2, updating Koffset from cell level to beam level can reduce an end-to-end delay. Further, when the UE requires a higher delay, such as a scenario where a low delay is required, the base station and the UE may update the used Koffset to the UE-level Koffset value. As shown in Table 2, an end-to-end delay (including a scheduling delay) that is smaller than a cell-level and beam-level Koffset after Koffset is updated to the UE level is suitable for a scenario with a low delay requirement.

For example, the UE obtains the cell-level Koffset value by using a broadcast message during initial access. After the UE initiates random access, the gNB determines, based on a service type of the UE and/or a different requirement for a delay, whether a Koffset value used by the UE needs to be updated.

(1) When the UE does not require high delay performance and is insensitive to delay, the base station may enable the UE of this type to continue to use a cell-level Koffset or update to a beam-level Koffset.

(2) When the UE requires a high delay performance and requires a low delay, the base station may update the timing offset value used by the UE to Koffset at the UE level. The solution process requires the gNB to send signaling to the UE to indicate to update Koffset to the beam level or to update Koffset to the UE level, or the UE applies to the gNB to update Koffset to the beam level or to update Koffset to the UE level.

For example, in a case in which the UE requires a low delay, the UE may autonomously determine and report, to the base station, to update a cell-level Koffset value to a UE-level Koffset value. Alternatively, the UE may autonomously determine and report, to the base station, to update a beam-level Koffset value to a UE-level Koffset value.

For another example, when the UE requires delay performance, the UE may send indication information to the base station, where the indication information may be used to indicate a delay requirement of the UE or indicate a level (for example, a cell level, a beam level, or a UE level) of a timing offset that the UE needs to use. Therefore, the base station receives the indication information, and determines, based on the indication information, whether to update the timing offset value used by the UE. If Koffset is to be updated, the base station sends information used to indicate to update the Koffset value. For example, the base station may indicate the UE to update Koffset to a beam-level Koffset value or a UE-level Koffset value.

In an embodiment, the base station may indicate, to the UE, whether the Koffset update mechanism is enabled or which Koffset update mechanism is used. If not enabled, the cell-level Koffset will not be updated to the beam-level Koffset or the UE-level Koffset, and the UE does not need to report the TA or delay requirement or the Koffset level to be used. For example, the base station may send the following signaling to the UE, or the UE sends the following signaling to the base station to indicate whether a Koffset update mechanism is enabled.

Signaling indicates whether to enable the UE-specific Koffset update mechanism. If enabled, it indicates that the base station and the UE may update Koffset from the cell level or beam level to the UE level Koffset. If not enabled, it indicates that the UE continues to use the Koffset level in use. The advantage is that a different Koffset update mechanism can be selected based on a service requirement of the UE and a scheduling delay requirement, and an extra overhead of the Koffset signaling can be avoided.

Signaling indicates whether the beam-specific Koffset update mechanism is enabled. If enabled, it indicates that the base station and the UE may update Koffset from the cell level or the UE level to the beam level Koffset. If not enabled, it indicates that the UE continues to use the Koffset level in use. The advantage is that a different Koffset update mechanism can be selected based on a service requirement of the UE and a scheduling delay requirement, and an extra overhead of the Koffset signaling can be avoided.

Signaling indicates whether to use the beam-specific Koffset or UE-specific Koffset update mechanism, or does not support updating Koffset to another level. The signaling indication method is to indicate that in this scenario, the base station and/or the UE support/supports updating a level of Koffset to a beam level or a level of the UE or do/does not change a used level of the Koffset. The signaling indication can avoid ambiguity of a Koffset update mechanism between the base station and the UE. In addition, benefits may include selecting different Koffset update mechanisms based on a service requirement of the UE and a scheduling delay requirement, thereby avoiding additional overhead of updating the Koffset signaling.

The following uses a combination of the foregoing methods and embodiments as an example in a specific scenario for description.

Scenario 1: Update a cell-level Koffset value to a beam-level Koffset value.

In this scenario, it is assumed that when UE is initially accessed, a cell-level Koffset value is obtained.

For example, after the UE requests to access the system, the base station such as the gNB transmits the timing offset difference ΔKoffset in the Msg2 or the Msg4 or the RRC-setup signaling. After receiving the ΔKoffset, the UE may update the Koffset, that is, the Koffset_new=Koffset_old+ΔKoffset. Koffset_old represents a Koffset value that is being used by the gNB and the UE or a reference timing offset value or an initial Koffset. Koffset_new represents an updated Koffset value to be used by the gNB and the UE, that is, a timing offset value obtained based on the Koffset_old. The gNB may determine the ΔKoffset value herein based on the beam level Koffset, that is, the gNB determines, based on the beam in which the UE is located, that the UE needs to use the updated Koffset value Koffset_new (for example, the gNB determines the Koffset_new value based on the maximum round-trip delay between the UE and the gNB in the beam coverage area in which the UE is located), and then obtains the ΔKoffset value based on ΔKoffset=Koffset_old−Koffset_new. The gNB may transmit the ΔKoffset by using signaling such as Msg2, Msg4, or RRCsetup, and the signaling is set to optional (indicating that ΔKoffset may be sent or may not be sent). It is considered that if the network side decides not to update Koffset, the gNB may not send ΔKoffset to the UE, that is, the gNB and the UE do not update Koffset in use.

In an embodiment, the base station may configure the ServingCellConfig signaling to transmit ΔKoffset by using the serving cell in the RRCsetup signaling, and the RRCReconfiguration and the RRCResume signaling also include the ServingCellConfig signaling, or may send the ΔKoffset value by using the RRCReconfiguration and the RRCResume signaling. For example, the serving cell configuration ServingCellConfig signaling includes one or more variable fields, and the one or more variable fields may be used to indicate ΔKoffset.

Manner 1

A new variable field Koffset-difference is added to the serving cell configuration ServingCellConfig parameter, to indicate a timing offset difference ΔKoffset. The UE may update Koffset by using the timing offset difference Koffset-difference. A value range (for example, a representation range or a corresponding quantity of bits) of the Koffset-difference may be determined based on a maximum round-trip delay difference between beams, a satellite orbital height, a cell size, and a minimum communication elevation.

For example, a maximum round-trip delay difference in a cell in a GEO transparent/regenerative scenario is 10.3 ms, 10.3e−3/0.125e−3=82.4, and a variable field Koffset-difference needs 8 bits to indicate −83 to 83. 8 bits of Koffset-difference may indicate −127 to +127. In the foregoing signaling example, only a range of −83 to 83 is used, and unused ranges of −127 to −84 and +84 to +127 may be reserved, or may be reserved for another indication use. The transmission timing offset difference scheme can save signaling overheads compared with direct transmission Koffset complete values.

For example, the foregoing signaling format may be as follows:

```
ServingCellConfig ::=                SEQUENCE {
    tdd-UL-DL-ConfigurationDedicated      TDD-UL-DL-ConfigDedicated
```

-continued

```
OPTIONAL,
    Koffset-difference              INTEGER (-83.. 83) OPTIONAL,
    ...,
}
```

Manner 2

A new variable field Koffset-difference-list is added to the ServingCellConfig parameter or a parameter having a similar function, to indicate a difference between a Koffset value used by UE in a plurality of beams in a cell and cell-level Koffset. That is, Koffset-difference-list represents a plurality of Koffset differences, for example, may represent differences between Koffset values corresponding to a maximum of 64 beams and cell-level Koffset corresponding to a cell in which the beam is located.

For example, the foregoing signaling format may be as follows:

```
ServingCellConfig ::=  SEQUENCE {
tdd-UL-DL-ConfigurationDedicated
TDD-UL-DL-ConfigDedicated OPTIONAL,
    Koffset-difference-listSEQUENCE (SIZE (1..64))
    OF INTEGER (-24.. 24)
OPTIONAL,
    ...,
}
```

In this embodiment of this application, a value range of the variable field Koffset-difference-list may be related to a maximum round-trip delay (for example, related to an orbital height and a minimum communication elevation angle) of a cell or a beam in a communications scenario supported by a standard protocol, a maximum round-trip delay difference between a cell and the beam, and a unit of calculation timing offset duration slot_duration.

For example, in a GEO transparent scenario, a cell diameter is 450 km, a minimum communication elevation angle is 10 degrees, and a maximum round-trip delay difference in a cell is 2.933e−3 s. Because 2.933e−3/0.125e−3=23.464, 6 bits are required to indicate a value range of −24 to +24, and 6 bits of a timing offset difference in a variable field Koffset-difference-list may indicate −31 to +31. In the foregoing signaling example, only a range of −24 to +24 is used, and unused ranges of −31 to +−25 and +25 to +31 may be reserved, or may be reserved for another indication use.

For example, after acquiring the Koffset-difference-list signaling, the UE may determine, based on a difference between a Koffset value in use (or a previously received Koffset value or a cell level Koffset value in use) and a Koffset value indicated by a variable field Koffset-difference-list, a beam level Koffset value corresponding to a beam in which the UE is located. For example, if the Koffset-difference-list indicates 64 Koffset differences, the UE selects a corresponding Koffset difference in the Koffset-difference-list based on a beam number in which the UE is located (for example, determined based on a correspondence between a beam number and an SSB number or a TCI number), for example, if the beam number is 5, the fifth Koffset difference indicated by the Koffset-difference-list (assuming that the beam number starts from 1) or the fourth Koffset difference indicated by the Koffset-difference-list (assuming that the beam number starts from 0) is selected. The UE may obtain, based on the Koffset value being used by the UE+the selected Koffset-difference-list value (that is, the Koffset value being used by the UE+the timing offset difference selected based on the beam number), the beam level Koffset value corresponding to the beam in which the UE is located. The UE and the gNB both calculate and update using the beam level Koffset value according to the method. Such a signaling transmission method provides flexibility and can save signaling bit overheads in a multi-beam scenario.

Manner 3

Two new variable fields Koffset-difference-GEO and Koffset-difference-LEO are added to the ServingCellConfig parameter, to indicate a timing offset difference ΔKoffset used for different track ranges, and the UE may update Koffset by using the timing offset difference. The gNB chooses to send the Koffset-difference-GEO or the Koffset-difference-LEO based on a communication scenario (orbital height range). Therefore, after obtaining the Koffset-difference-GEO or the Koffset-difference-LEO, the UE may obtain the ΔKoffset value, and then update the Koffset value based on Koffset_new=Koffset_old+ΔKoffset.

Koffset-difference-GEO represents a timing offset difference used when an orbital height is greater than 1200 km and less than 36000 km in a communication scenario, and a representation range of the Koffset-difference-GEO is determined based on a maximum round-trip delay difference between beams, which is related to a satellite orbital height, a cell size, and a minimum communication elevation angle. For specific description, refer to the foregoing description of the Koffset-difference. When the orbital height of the communication scenario is greater than 1200 km and less than 36000 km, the network side only needs to send Koffset-difference-GEO signaling, that is, does not send Koffset-difference-LEO signaling. In this case, 8-bit signaling needs to be sent for the terminal to determine a timing offset.

Koffset-difference-LEO indicates the timing offset difference parameter whose orbital height is not greater than 1200 km. The representation range is determined based on the maximum round-trip delay difference between beams. For example, in a LEO-1200 scenario, a maximum round-trip delay difference in a cell is 3.18 ms, 3.18e−3/0.125e−3=25.44, and a variable field Koffset-difference-LEO needs 6 bits to indicate a range of −26 to 26. 6 bits of Koffset-difference-LEO may indicate: −31 to +31. In the foregoing signaling example, only a range of −26 to 26 is used, and unused ranges of −31 to −27 and +27 to +31 may be reserved (reserved), or may be reserved for another indication use. The transmission timing offset difference solution provides flexibility and can save some signaling bits in a scenario in which orbital height is not high.

For example, the foregoing signaling format may be as follows:

```
Koffset-difference-GEO        INTEGER (-83.. 83) OPTIONAL,
Koffset-difference-LEO        INTEGER (-26.. 26) OPTIONAL,
```

In an embodiment, the gNB may further send the timing offset difference ΔKoffset value, that is, the Koffset difference, to the UE by using MAC CE signaling. Therefore, after receiving the Koffset difference, the UE updates Koffset based on Koffset_new=Koffset_old+ΔKoffset. For example, the foregoing Koffset-difference signaling of 8 bits or Koffset-difference-LEO signaling of 6 bits may be sent to the UE by using MAC CE signaling to represent a ΔKoffset value. For a specific description of the MAC CE signaling, refer to the foregoing description. Details are not described herein again.

Scenario 2: Update the Koffset value of the beam level.

In gaze mode, beam-level (beam-specific) Koffset of the beam in which the UE is located changes as the satellite changes relative to the UE.

When the system uses the beam-level initial Koffset, the gNB may update the beam-specific Koffset in the following signaling manners, that is, the gNB and the UE still use the beam-specific Koffset, but a specific Koffset value changes and updates. That is, In an embodiment, the network device may indicate the updated Koffset (that is, beam-specific Koffset) by using RRC signaling, RRC reconfiguration signaling, or MAC CE signaling. Exemplarily, the RRC reconfiguration signaling includes one or more variable fields (such as Koffset-list), and the one or more variable fields are used to indicate an updated Koffset. For example, the RRC signaling ServingCellConfig includes the ΔKoffset. For example, the MAC CE signaling includes the ΔKoffset. The following describes in detail:

Manner 1: RRC reconfiguration signaling: For example, the RRC reconfiguration signaling is used to update Koffset. Therefore, the base station sends the RRC reconfiguration signaling to the UE. After receiving the RRC reconfiguration signaling, the UE selects a corresponding Koffset value based on a beam in which the UE is located, and updates the Koffset value that is being used. For example, the RRC reconfiguration signaling includes the foregoing updated value of the Koffset-list variable field. For a specific signaling length design, refer to the foregoing description of the Koffset-list variable field parameter.

Manner 2: RRC signaling: For example, the Koffset difference such as ΔKoffset is added to ServingCellConfig in the RRC signaling. ΔKoffset may be determined based on the Koffset value Koffset_new to be updated, for example, the gNB determines the updated Koffset value Koffset_new to be used by the UE based on a latest location relationship between the beam in which the UE is located, the satellite, and the gateway (for example, the gNB determines the Koffset_new value based on the maximum round-trip delay between the gNB and the UE in the beam coverage area in which the UE is located), and then obtains the ΔKoffset value based on ΔKoffset=Koffset_old−Koffset_new. Therefore, the base station sends the RRC signaling to the UE. After receiving the RRC signaling, the UE updates Koffset based on Koffset_new=Koffset_old+ΔKoffset. For the signaling design of the Koffset difference, refer to the above description of the Koffset-difference variable field parameters.

Manner 3: MAC CE signaling: For example, the gNB may send the timing offset difference ΔKoffset value, that is, the Koffset difference, to the UE by using the MAC CE signaling. For the signaling design of the Koffset difference, refer to the description of the Koffset-difference parameter.

In the foregoing scenario 1, when the gNB and the UE use the cell-level initial Koffset solution, after the UE applies for access to the system, the gNB and the UE update Koffset from the cell-level to the beam level. With a change of a relative position between the satellite and the UE and the gateway, the beam-level Koffset of the beam on which the UE is located also changes, that is, the beam-level Koffset value changes and needs to be updated. The gNB can update the beam-specific Koffset value in the following two signaling modes.

ΔKoffset is carried in RRC signaling, for example, ServingCellConfig signaling in RRC signaling.

> Koffset-difference INTEGER (−83 . . . 83)
>     OPTIONAL,

For description of the Koffset-difference variable field, refer to the description of adding a new variable field Koffset-difference to the ServingCellConfig parameter.

The gNB sends the ΔKoffset value, that is, the difference value Koffset, to the UE by using the MAC CE signaling.

Scenario 3: Update the Koffset value of the UE level.

When the UE can report the TA, it indicates that the UE has established a connection with the gNB at this time, and a Koffset value that can be used is obtained. Therefore, the gNB only needs to update Koffset based on this value.

For example, in the embodiment shown in FIG. 6, the UE may use the Msg3 to report a TA value to indicate a second timing offset. That is, the UE may send, to the gNB, TA information or location information used by the UE in a Msg3 (or another message, such as a message sent when a timing offset needs to be subsequently updated) in an RACH process. If the TA value is sent, the TA value may be a TA value or a quantized TA value, or an updated Koffset value or a Koffset difference. After accessing the system, the UE may also report, in another uplink message, a value related to a TA value used by the UE, and gNB is used to determine an updated Koffset value.

For example, in the foregoing method in which the UE sends the indication information to indicate the second timing offset, the UE sends the TA correlation value to the gNB, and may subtract the common TA (where the common TA value may be a positive value or a negative value or a zero value) from the TA value that is being used by the UE, or may subtract the absolute value of the common TA from the TA value that is being used by the UE (that is, a difference between an absolute value of the TA that is being used and the commonTA is obtained), that is, TA-applied (for example, TA_applied=TA_use−TA_common) is sent to the gNB, or a half of the TA_applied value is sent to the gNB (after the gNB receives the TA_applied value, multiplied by 2 to obtain the TA_applied value). TA_use represents a TA value that is being or to be used by the UE, TA_common represents a common TA value, and TA_applied represents a difference between TA_use and TA_common. After receiving the TA correlation value sent by the UE, the gNB obtains, based on the TA_use=TA_applied+TA_common, the TA value that the UE is using or is to use.

For example, if $16 \text{ Ts}/2^\mu$ is used as a time dimension to send a TA value, and TA_use −TA_common is not an integer multiple of 16 Ts/2", the UE or the gNB may obtain, through calculation, a TA correlation value sent by the UE to the gNB based on $\lceil (\text{TA\_use} - \text{TA\_common})/(16 \text{ Ts}/2^\mu) \rceil$ or $\lfloor (\text{TA\_use} - \text{TA\_common})/(16 \text{ Ts}/2^\mu) \rfloor$. Ts represents 1/(15e3*2048) second, and μ, is related to a subcarrier spacing, that is, a subcarrier spacing is $2^\mu \cdot 15$ kHz.

In an embodiment, the UE may indicate a TA or a TA related value by using a third message or a fifth message or another uplink message (for example, a licensed PUSCH resource, an uplink physical layer control channel message, or the like). Exemplarily, the third message, the fifth message, or another uplink message may include one or more variable fields (TA-applied, TA-applied-LEO-600, TA-applied-LEO-1200, TA-applied-GEO, Koffset_difference_UE, and the like in the following), and the one or more variable fields may be used to indicate a correlation value of the TA or the TA.

Manner 1

A variable field TA-applied (used timing advance) is added to indicate the TA correlation value reported by the UE. After receiving the TA-applied, the gNB determines the TA value used or to be used by the UE. A representation range and a quantity of bits of the TA-applied signaling are determined by an orbital height, a minimum communication elevation angle, and a time dimension in a communication scenario.

For example, when the satellite orbital height is not higher than the GEO orbit, and the minimum elevation angle is 10 degrees, 16 Ts/2" is used as a time dimension unit, a representation range of TA-applied needs to be 0 to 4155513, and 22 bits need to be represented. 22 bits may represent a range of 0 to 4194303. In the foregoing signaling example, only a range of 0 to 4155513 is used, and an unused range of 4155514 to 4194303 may be reserved (reserved), or may be reserved for another indication use. For example, after receiving the TA-applied parameter, the gNB may add the TA-applied parameter to the common TA (quantized commonTA value), and multiply the common TA parameter by a time dimension unit to obtain a TA value that is being used by the UE, or TA-applied represents a TA value that is being used by the UE, that is, a time length of the TA that is being used by the UE after the TA-applied parameter is multiplied by the time dimension unit. It may be understood that the protocol supports different satellite orbital heights, minimum communication elevation, and time dimension units, and the indication ranges that the TA-applied needs to support may be different. The indication range and the quantity of bits of the TA-applied may be defined based on a specific communication scenario.

For example, a signaling format of the foregoing TA-applied is shown as follows:
TA-applied INTEGER (0 . . . 4155513) OPTIONAL,

Manner 2

Three new variable fields, TA-applied-LEO-600, TA-applied-LEO-1200, and TA-applied-GEO, are added to be used by the gNB to determine a timing advance value currently used by the UE. Representation ranges and quantities of bits of TA-applied-LEO-600, TA-applied-LEO-1200, and TA-applied-GEO may be determined based on an orbital height range of the satellite, a possible minimum communication elevation angle, and a time dimension unit. TA-applied-LEO-600 represents a parameter related to a timing advance value used by the UE in a communication scenario in which an orbital height is not greater than 600 km, TA-applied-LEO-1200 represents a parameter related to a timing advance value used by the UE in a communication scenario in which an orbital height is not greater than 1200 km, and TA-applied-GEO represents a parameter related to a timing advance value used by the UE in a communication scenario in which an orbital height is not greater than 36000 km. Referring to a design principle of a representation range and a quantity of bits of the foregoing parameter TA-applied, the representation ranges and the quantities of bits of TA-applied-LEO-600, TA-applied-LEO-1200, and TA-applied-GEO may be obtained.

For example, related signaling, TA-applied-LEO-600/TA-applied-LEO-1200/TA-applied-GEO, for the UE to report a TA is added to the RRCSetupRequest signaling of the Msg3. The UE obtains the orbital height of the satellite based on the ephemeris information or the satellite orbit information, and further selects one of the corresponding TA-applied-LEO-600/TA-applied-LEO-1200/TA-applied-GEO signaling to send the TA value. For a scenario where the orbital height is not higher than 600 km, the UE may use TA-applied-LEO-600 signaling instead of sending TA-applied-LEO-1200 and TA-applied-GEO. The advantage of this is that the UE can use a smaller signaling length to send the TA correlation value in a low-orbit satellite communications system.

For example, signaling formats of TA-applied-LEO-600, TA-applied-LEO-1200, and TA-applied-GEO are as follows:

| | |
|---|---|
| TA-applied-LEO-600 | INTEGER (0.. 197800) OPTIONAL, |
| TA-applied-LEO-1200 | INTEGER (0.. 320609) OPTIONAL, |
| TA-applied-GEO | INTEGER (0.. 4155513) OPTIONAL, |

Manner 3

For example, in the foregoing method in which the UE sends the indication information to indicate the second timing offset, the UE may report a to-be-updated Koffset value or a Koffset difference instead of reporting a TA correlation value. For example, the Koffset difference is used as an example. A new variable field Koffset_difference_UE is added to indicate a timing offset difference reported by the UE to the gNB, and a difference between a Koffset value to be updated by the UE and Koffset in use. It may be understood that the UE may also report the Koffset difference in another uplink message.

The Koffset_difference_UE indication range is related to a quantity of occupied bits and a frequency and a threshold of an updated Koffset reported by the UE. Herein, an example in which a difference between Koffset is not greater than 7 is used, and the Koffset_difference_UE needs to occupy three bits. After receiving the Koffset_difference_UE, the gNB may obtain, based on the Koffset_new=Koffset_old+Koffset_difference_UE, the gNB and the Koffset value to be updated by the UE.

For example, a signaling format of the foregoing Koffset_difference_UE is shown as follows:
Koffset_difference_UE INTEGER (0 . . . 7) OPTIONAL For example, in the foregoing method in which the UE sends the indication information to indicate the second timing offset, the UE may report location information of the UE to the gNB. For example, a geocentric coordinate system (Earth-Centered, Earth-Fixed, ECEF) may be used. It is assumed that a range represented by is a maximum of 20 km from a surface of the earth, and a radius of the earth is 6371 km. In this case, each dimension of a three-dimensional coordinate position needs to represent −6391 to 6391 km. When the representation resolution of each dimension of the three-dimensional coordinates is 0.125 m, 27 bits are required, and then three dimensions need 27*3=81 bits. When the representation resolution of each dimension of the three-dimensional coordinates is 0.25 m, 26 bits are required, and then three dimensions need 26*3=78 bits. For example, adding a variable field UE-Position represents the location coordinates of the UE. The variable field UE-Position includes three variable values, representing a three-dimensional coordinate correlation value of the UE. The indication range and the quantity of occupied bits of the UE-Position signaling are related to the earth radius, the maximum distance that the UE may be at the horizontal plane, and the resolution represented by the location coordinates. For example, the location information signaling sent by the UE may be represented as:

UE-Position SEQUENCE (3 OF INTEGER (−67108863 . . . 67108863)) OPTIONAL, or

UE-Position SEQUENCE (3 OF INTEGER (−33554431 . . . 33554431)) OPTIONAL,

For example, the RRCSetupRequest message may carry the foregoing TA-applied-LEO-600, TA-applied-LEO-1200, TA-applied-GEO, UE-Position, or Koffset_difference_UE signaling.

After receiving the UE-Position signaling, the gNB multiplies the coordinate resolution by the received three-dimensional coordinate correlation value. For example, it is assumed that the coordinate resolution is 0.125 m, UE-Position signaling value received by the gNB is (50976000, 1688000, 1592000), and actual ECEF three-dimensional coordinates of the UE may be obtained by the gNB as (50976000*0.125=6372 km, 1688000*0.125=211 km, 1592000*0.125=199 km).

In an embodiment, to reduce signaling overheads, it may be agreed that the location coordinates sent by the UE may be subtracted from one fixed value to send a coordinate difference. For example, after 6371 km is subtracted from each latitude of the three-dimensional coordinates sent by the UE, the coordinate difference is sent. After the gNB receives the coordinate difference, each latitude is added with 6371 km to obtain the coordinate value of the UE. The foregoing design signaling may save signaling overheads.

Manner 4

The gNB and the UE may agree that the UE reports the TA-related parameter to the gNB by using an uplink physical layer control channel (PUCCH) message. For example, the UE may send, by using the uplink physical layer control channel message, the TA-related signaling parameter or the indication information (used to indicate the second timing offset) sent by the UE in the method and the embodiment in this application. In this method, the UE can avoid applying for an uplink resource to report a TA-related parameter, thereby saving scheduling time of applying for an uplink resource.

In this embodiment of this application, after the UE accesses the system, the UE may send the TA value to the gNB by using the uplink MAC CE message or the PUSCH. For details, refer to the foregoing method for designing TA-related signaling lengths.

The foregoing method and embodiment describe a method for updating Koffset in cell handover (Cell handover). The following uses an example of a signaling process in a specific communication scenario.

(1) In the handover process, the RRCReconfiguration signaling is first measured and then sent by the source gNB to the UE. It can be learned from the foregoing signaling that the cell level or the beam level Koffset exists in the RRCReconfiguration. Therefore, the UE may obtain the Koffset value of the target cell/beam by using the RRCReconfiguration. For RACHless handover (RACHless handover), the source cell also sends RRCReconfiguration signaling to the UE. The UE receives the SIB 1 of the target cell, and can also obtain Koffset of the target cell/beam.

(2) After completing the handover, the UE may update Koffset from the cell level to the beam level. Alternatively, Koffset is updated to the UE level, which is the same as a signaling process after the UE randomly accesses a cell.

Satellite switch (satellite switch) may be equivalent to cell handover. Refer to the foregoing handover signaling process.

The foregoing method and embodiment describe a method for updating Koffset in beam switch (Beam switch). The following uses an example of a signaling process in a specific communication scenario.

When a source beam and a target beam belong to the same cell, the satellite is not switched in beam switch, and then the UE may continue to use the currently used cell-level or UE-level Koffset.

If Koffset used by the UE is of the beam level, there are two types of discussions:

1. When the system uses the beam-level initial Koffset solution, the gNB may update the beam-specific Koffset in the following two signaling manners.

(1) Update the Koffset-list list by using RRC signaling, for example, by using RRCReconfiguration signaling. The UE selects a corresponding Koffset value based on a beam in which the UE is located, that is, updates the Koffset value in use.

Alternatively, the UE needs to select, based on a Koffset group (for example, a Koffset-list message) sent in the broadcast signal, a Koffset value to be used for a corresponding target beam.

(2) The gNB may send the ΔKoffset value, that is, the Koffset difference, to the UE by using the MAC CE signaling. After receiving the message, the UE updates Koffset based on Koffset_new=Koffset_old+ΔKoffset. For example, the foregoing 8-bit or 6-bit signaling may be sent to the UE by using MAC CE signaling to represent the ΔKoffset value.

2. When the system uses the cell-level initial Koffset solution and the UE accesses the system by using the beam-level Koffset, the gNB may update the beam-specific Koffset in the following two signaling manners.

(1) ΔKoffset is carried in RRC signaling, for example, ServingCellConfig signaling in RRC signaling (for example, Koffset-difference signaling is used).

(2) The gNB sends the ΔKoffset value, that is, the Koffset difference, to the UE by using the MAC CE signaling.

Gateway Switch (Gateway Switch):

When a soft gateway switch (soft gateway switch) occurs, the UE can receive two gateway signals at the same time, which may be equivalent to a cell handover process.

When a hard gateway switch (hard gateway switch) occurs, the UE can receive only one gateway signal at a same moment, and the UE transiently switches from the source gateway to the target gateway. In this case, a partial delay of the feeder link changes. The gNB may send, to the UE, a Koffset used in the target gateway or a difference between Koffset used in the target gateway and the current Koffset, that is, ΔKoffset.

Because UEs of the entire beam or cell need to update the Koffset value, the RRCReconfiguration signaling may be used to carry ΔKoffset to update Koffset.

Alternatively, the gNB sends Koffset of the target gateway or ΔKoffset to the UE by using the MAC CE signaling.

If ΔKoffset is sent, the same quantity of bits as the complete Koffset may also be required. For example, in some special scenarios, when the network side performs timing compensation on the uplink signal before switching, and the network side does not perform timing compensation on the uplink signal after switching, the ΔKoffset needs to include a complete round-trip delay. In this case, a quantity of bits required by the ΔKoffset is the same as a quantity of bits required to indicate the complete Koffset. If the protocol does not support this special scenario, the quantity of bits required to indicate ΔKoffset is less than the quantity of bits of the complete Koffset, thus saving signaling bits.

In the foregoing method for sending indication information by the UE to indicate a second timing offset, the UE sends a TA correlation value to the gNB. The following uses an example to describe how the UE reports a TA or a TA correlation value that is being used by the UE.

The UE reports a TA or TA correlation value that is being used by the UE, and the gNB determines a TA value of the UE and therefore determines a Koffset value that needs to be updated by the UE. For details, refer to the foregoing description: Koffset=⌈TA_New/slot_duration⌉. As a result, the following shows several methods for the UE to indicate to the base station the TA it is using.

Manner 1: The UE Reports a TA Rate

To save signaling overheads for reporting TA values by the UE, the UE may report a TA change rate (TA rate) TA_R that is being used by the UE and a TA value TA_Va that is being used by the UE to the gNB. The UE may obtain the TA change rate through calculation based on information such as a location of the UE, a location of a satellite, a speed direction, and a speed size. Both the UE and the gNB may calculate the TA value to be subsequently used by the UE based on the TA_R and the TA_Va, and then calculate the Koffset value. For example, Koffset=⌈[TA_R*(t−t0)+TA_Va]/slot_duration⌉, where t represents a moment at which Koffset is to be calculated or to be used, and t0 represents a moment at which the UE uses a TA_Va value. If the gNB subsequently sends a TAC instruction to the UE to adjust the TA value, the calculation Koffset formula may be adjusted to Koffset=⌈[TA_R*(t−t0)+TA_Va+TAC_ac]/slot_duration⌉, where TAC_ac represents a cumulative value of the TAC instruction sent by the gNB to the UE. For example, the gNB sends the TAC to the UE twice, and the sum of two TAC adjustments is TAC_ac. It may be agreed that both the UE and the gNB calculate the Koffset value according to the foregoing formula, and update the Koffset value to the latest Koffset value. Alternatively, the gNB calculates the Koffset value according to the foregoing formula, and if the Koffset value needs to be updated, the gNB indicates an updated latest Koffset value or a difference between the latest Koffset value and the original Koffset to the UE.

Method 2: Report the TA difference.

To save signaling overheads for reporting TA by the UE, each time the UE reports a TA value that is being used, the UE may report a difference between the TA value that is being used and a TA value that is previously reported or a difference between the TA value that is being used and a TA value that is previously indicated by the gNB to the UE, thereby reducing an indication range and signaling bits that are required for reporting TA. For example, the TA value reported by the UE to the gNB is TA1, and in this case, the TA value that the UE is using is TA2. In this case, the TA value reported by the UE to the gNB is TA2−TA1. When receiving the (TA2−TA1) value reported by the UE, the gNB may add it to the TA value TA1 reported by the UE last time, to obtain the TA value TA2 that is being used by the UE.

Manner 3: Report a TA Value

The UE periodically reports the TA value, and the gNB configures a resource for periodically reporting the TA to the UE. Therefore, the UE may report the TA that is being used by the UE based on the resource for reporting the TA configured by the base station (for a reporting method, refer to the foregoing embodiments). For example, the gNB configures, for the UE in RRC signaling, a TA reporting periodicity of 8 seconds and a time domain resource and a frequency domain resource whose periodicity is 8 seconds. The UE periodically reports a TA value on the resource.

The UE reports a TA value in a semi-static manner: In addition to configuring a resource for TA periodic reporting to the UE, the gNB further needs to send activated or deactivated (disabled) signaling to the UE to indicate, to the UE, whether to start the TA periodic reporting function. For example, the gNB may activate or deactivate the TA periodic reporting function by using a MAC CE. After receiving the activated or deactivated (disabled) signaling, the UE starts or stops periodically reporting the TA value.

The UE reports the TA value aperiodically: The gNB configures an uplink resource for reporting the TA value to the UE, and sends a trigger report TA value instruction to the UE. After receiving the instruction (or signaling), the UE reports a TA value that is being used to the gNB. For example, the gNB may trigger, by using a DCI instruction, the UE to report a TA value. After receiving the trigger instruction, the UE reports the TA value immediately or reports the TA value after a specified period of time. For example, the UE receives the DCI trigger instruction in the downlink slot n, and the UE may report, in the uplink slot n+M, a TA value that is being used by the UE. M is a non-zero integer, M is related to a TA value used by the UE, for example, M=⌈TA/slot_duration⌉ or M=⌈TA/slot_duration⌉+delta, and delta is a non-negative integer variable that is agreed upon between the processing delay gNB and the UE or configured by the gNB to the UE.

The foregoing methods for reporting the TA and the TA correlation value may be used together, and details are not described herein again.

Figure 20:
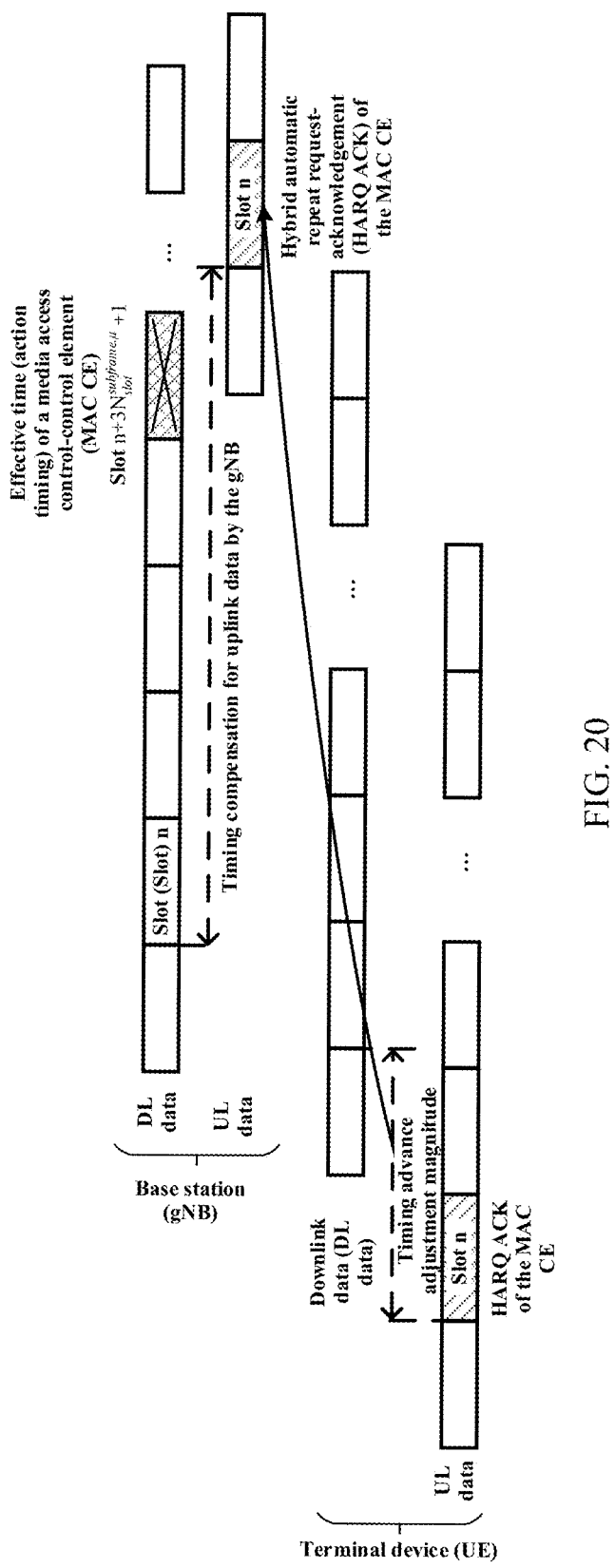
FIG. 20 is a schematic diagram of a relationship between signaling and a slot according to an embodiment of this application.

In this embodiment of this application, Koffset may resolve a problem that timing of receiving uplink data on a network side is later than timing of sending corresponding downlink data. For example, as shown in FIG. 20, the gNB receives, in an uplink slot n, an uplink HARQ-ACK corresponding to a PDSCH that carries a MAC-CE instruction (or MAC-CE signaling). The MAC-CE instruction is a downlink signal configuration instruction, and the UE assumes that the downlink configuration takes effect in the first slot, that is, a slot $n+XN_{slot}^{subframe,\mu}+1$, after the downlink slot $n+XN_{slot}^{subframe,\mu}$. Herein, $n+XN_{slot}^{subframe,\mu}$ is a quantity of slots included in a subframe when a subcarrier spacing is $2^{\mu}*15$ KHz, and X is a non-negative integer specified in a protocol or configured by using a parameter, such as X=3.

For example, the MAC CE configuration instruction for the downlink signal carried in the PDSCH may be a resource configuration for the downlink ZP CSI-RS, or a resource configuration for the downlink ZP CSI-RS whose deactivation is already in effect. For another example, the instruction carried in the PDSCH may be a mapping relationship between a TCI status and a code point (Transmission Configuration Indication) in the DCI domain. For another example, the instruction carried in the PDSCH may be an activation/deactivation semi-static CSI reporting configuration. For another example, the instruction carried in the PDSCH may be an activation/deactivation CSI-RS/CSI-IM configuration.

It can be learned from FIG. 20 that when timing compensation, performed by the network side or the gNB, for uplink data is greater than or equal to $n+XN_{slot}^{subframe,\mu}$ the HARQ ACK/NACK received by the network side that is sent by the UE and that is for the instruction carried in the PDSCH is not earlier than the effective time of configuring the downlink signal, and the gNB cannot timely know whether the UE correctly decodes the PDSCH or the MAC CE that is for the instruction, that is, when the MAC CE is configured for the downlink data, the network side does not receive the HARQ ACK/NACK of the MAC CE fed back by the UE. After the UE sends the HARQ ACK in the slot n, it is considered that the instruction starts to take effect from, the downlink slot $n+XN_{slot}^{subframe,\mu}$ which causes different understanding of the effective time of the instruction on both sides of the UE and the gNB, resulting in a communication conflict. The timing compensation value of the network side or the gNB to the uplink data described herein indicates that the network side or the gNB delays the receive window to delay the compensation value when receiving the uplink data.

Figure 21:
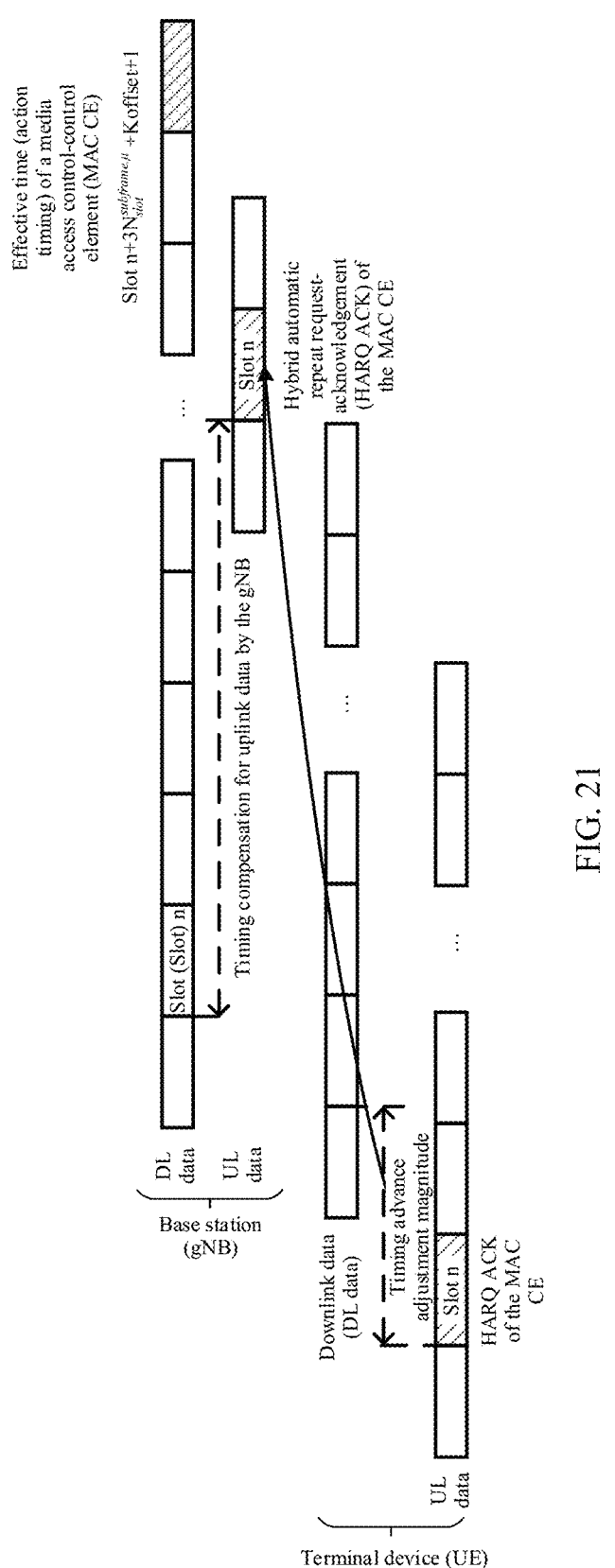
FIG. 21 is a schematic diagram of a relationship between signaling and a slot according to an embodiment of this application.

To improve the foregoing problem, Koffset related to the uplink data timing compensation value on the network side may be introduced. The UE assumes that the downlink configuration takes effect in the slot $n+XN_{slot}^{subframe,\mu}$ Koffset+1. As shown in FIG. 21, it may be learned that after an appropriate Koffset value is used (an effective time of the downlink signal configuration instruction is delayed, to ensure that the instruction takes effect only after the gNB receives a corresponding ACK, that is, a time length indicated by the Koffset is not less than a time length indicated by a timing compensation value of the network side for uplink data), the downlink configuration instruction may take effect after the gNB receives the HARQ ACK corresponding to the downlink configuration instruction sent by the UE, to ensure that both the UE and the gNB enable the downlink configuration instruction to take effect in the same downlink slot.

For example, the Koffset in this embodiment may be obtained by using the following formula:

$$Koffset=\lceil time\_compensated/slot\_duration \rceil$$

Herein, time_compensated is a timing compensation value that is used by the network side to receive uplink data sent by the UE, and the unit may be second, millisecond, microsecond, slot length, symbol length, or another time unit; time_compensate is equivalent to delay_compensated. The gNB may send a Koffset value to the UE. In this way, both the gNB and the UE obtain the Koffset value, and can determine an effective time for the downlink signal configuration instruction based on the Koffset value.

Alternatively, the gNB may further calculate the Koffset according to the following formula:

$$Koffset=\lceil time\_compensated/slot\_duration \rceil+\Delta K$$

Herein, $\Delta K$ represents an integer agreed upon in the protocol to adjust the Koffset value (a calculation error or/and a processing delay are considered).

Alternatively, the gNB may send the Koffset=⌈time_compensated/slot_duration⌉ value and the $\Delta K$ value to the UE, and the gNB determines $\Delta K$ based on a system error or/and a processing delay. The UE and the gNB calculate the timing offset value to be used based on the following formula Koffset_new:

$$Koffset\_new=Koffset+\Delta K$$

After the UE receives Koffset and $\Delta K$, both the gNB and the UE obtain the effective time for the downlink signal configuration instruction based on Koffset_new, that is, the UE assumes that the downlink configuration takes effect in the slot $n+XN_{slot}^{subframe,\mu}+Koffset\_new+1$.

Alternatively, the gNB may send a time_compensated value to the UE, and the UE and the gNB may obtain the to-be-used Koffset value through calculation according to the following formula:

$$Koffset=\lceil time\_compensated/slot\_duration \rceil$$

In an embodiment, when Koffset is being calculated, a fixed value may be added/subtracted based on the formula given in this application. For example, a timing offset value TA_offset, such as Koffset=⌈(time_compensated−TA_offset)/slot_duration⌉, is added/subtracted when the Koffset is being calculated, considering effects such as different duplex modes (TDD) and frequency-division duplex (FDD)) or location/positioning errors of a network device. When FDD is used, TA_offset=0; when TDD is used, TA_offset=624. For another example, Koffset=⌈(RAR_delay−TA_offset)/slot_duration⌉.

Alternatively, the gNB may send time_compensated and $\Delta K$ values to the UE, and the UE and the gNB may obtain the to-be-used Koffset value through calculation according to the following formula:

$$Koffset=\lceil time\_compensated/slot\_duration \rceil+\Delta K$$

Herein, time_compensated may be a time amount, or may be a quantized time amount, that is, a time unit of time_compensated may be determined based on an actual use situation, which is not limited herein.

Alternatively, the gNB may send time_compensated and $\Delta timing\_offset$ values to the UE, and the UE and the gNB may obtain the to-be-used Koffset value through calculation according to the following formula:

$$Koffset=\lceil (time\_compensated+\Delta timing\_offset)/slot\_duration \rceil$$

Herein, $\Delta timing\_offset$ is an adjustment value for time_compensated obtained by considering a processing delay, a calculation error and the like by the gNB. The adjustment value may be a time amount, or may be a quantized time amount. That is, a time unit of $\Delta timing\_offset$ may be determined based on an actual use status.

To save signaling overheads and reduce a quantity of information bits for transmitting Koffset-related information, the gNB may send a timing offset $\Delta Koffset$ based on a time-related quantity value of another time (both the UE and the gNB know the time-related quantity value, for example, a time-related quantity value agreed upon by the gNB and the UE or a time-related quantity value sent by the gNB to the UE, or a time-related quantity value sent by the UE to the gNB). The UE and the gNB obtain, through calculation, a to-be-used Koffset according to an agreed formula:

$$Koffset=\lceil time\_related/slot\_duration \rceil \Delta Koffset$$

Alternatively, Koffset is directly obtained through calculation by using the time_related parameter, that is, $$Koffset=\lceil time\_related/slot\_duration \rceil$$

Alternatively, the gNB may send a time difference component $\Delta timing$ ($\Delta timing$ is a time length value) based on a quantity value related to another time, and the UE and the gNB obtain, through calculation, Koffset to be used according to an agreed formula, that is, $$Koffset=\lceil (time\_related+\Delta timing)/slot\_duration \rceil$$

Alternatively, the gNB may send a scale factor S (S is a non-negative number) based on a quantity value related to another time, and the UE and the gNB obtain a to-be-used Koffset through calculation according to an agreed formula, that is, $$K\text{offset}=[S^*\text{time\_related/slot\_duration}]$$

Alternatively, the gNB may jointly send the ΔKoffset and/or the Δtiming and/or the S. The UE and the gNB obtain the to-be-used Koffset through calculation according to an agreed formula, for example, $$K\text{offset}=[S^*(\text{time\_related}+\Delta\text{timing})/\text{slot\_duration}]+\Delta K\text{offset}$$

For example, the time_related parameter may be 2H/c or 4H/c, where H represents the orbital height of the satellite (the UE may be obtained from the ephemeris information sent by the network side) and c represents the speed of light. Alternatively, the time_related parameter may be a common timing advance (common TA) quantity. The common timing advance may be obtained by selecting a reference point in a coverage area of a beam or a cell (for example, a point closest to a base station may be selected), and calculating a reference point-a satellite; alternatively, a common timing of a round-trip delay between a reference point, a satellite, and a ground station is equal to or equal to the round-trip delay plus/minus a fixed value (the fixed value takes into account impact of inaccuracy of satellite location information or a processing delay or a height of a location of the UE on using the TA, and the fixed value is fixed relative to a period of time, or may be changed). The reference point may be a point on a service link or a point on a feeder link. Based on different reference point locations, a commonTA value sent may be a positive value, a negative value, or a zero, which is not limited herein. Similarly, the base station may send coordinates of a reference point location to the UE, and the UE obtains the common timing advance through calculation based on a round-trip delay between a satellite location and the reference point location.

Alternatively, the time_related parameter may be an existing timer or receive window parameter in the foregoing method and embodiment, and a plurality of combinations thereof, because the timer time length and the receive window time length parameter are related to a round-trip delay, a processing delay, and the like of the UE and the gNB. In addition, the gNB sends these parameters to the UE in a manner of broadcast, unicast, or the like. In this way, both the UE and the gNB know the timer time length and the receive window time length. For example, some timer time lengths related to a round-trip delay that are agreed or sent between the UE and the gNB may be used or formed as a time_related parameter as follows:

startup delay duration of discontinuous reception downlink retransmission round trip time timer (drx-HARQ-RTT-TimerDL) (Timer offset) offset_of_drx-HARQ-RTT-TimerDL;

startup delay duration of discontinuous reception uplink retransmission round trip time timer (drx-HARQ-RTT-TimerUL) (Timer offset) offset_of_drx-HARQ-RTT-TimerUL;

startup delay duration of the random access contention resolution timer (ra-ContentionResolutionTimer) (Timer offset) offset of ra-ContentionResolutionTimer or RCR_offset;

scheduling request prohibit timer (sr-ProhibitTimer) timer_sr-ProhibitTimer;

reassembly timer (t-Reassembly) timer_t-Reassembly;

discard timer (discardTimer) timer_discardTimer;

receive RAR (Random Access Response, random access response) signal receive window length (ra-Response-Window) timer_ra-ResponseWindow.

The time_related parameter may include one or more of the foregoing parameters. For example, the time_related parameter may be a time length represented by offset_of_drx-HARQ-RTT-TimerDL. After the UE receives the ΔKoffset sent by the gNB, both the gNB and the UE may obtain the to-be-used Koffset through calculation according to the following formula:

$$K\text{offset}=[\text{offset\_of\_drx-HARQ-RTT-TimerDL/slot\_duration}]+\Delta K\text{offset}$$

Similarly, after the UE receives the S sent by the gNB, both the gNB and the UE may obtain the to-be-used Koffset through calculation according to the following formula:

$$K\text{offset}=[S^*\text{offset\_of\_drx-HARQ-RTT-TimerDL/slot\_duration}]$$

For another example, the time_related parameter may be a sum of time lengths represented by offset_of_drx-HARQ-RTT-TimerDL and timer_t-Reassembly. After the UE receives ΔKoffset sent by the gNB, both the gNB and the UE may obtain the to-be-used Koffset through calculation according to the following formula:

$$K\text{offset}=[(\text{offset\_of\_drx-HARQ-RTT-TimerDL}+\text{timer\_t-Reassembly})/\text{slot\_duration}]+\Delta K\text{offset}$$

It may be understood that, according to the foregoing introduction, "because the base station not only needs to notify the UE of the duration of the RAR receive window, but also needs to notify the UE of the startup delay duration of the RAR receive window, the first timing offset may alternatively be determined based on the duration of the RAR receive window and the startup delay duration of the RAR receive window", it may be learned that Koffset may be obtained through calculation based on a sum of duration of the RAR receive window and duration indicated by startup delay duration of the RAR receive window, that is, Koffset=[(RAR_window+RAR_delay)/slot_duration]. This manner is also applicable herein. In addition, a method for obtaining the Koffset by using the foregoing formula (10) or (11) is also applicable herein. For example, ΔKoffset time or ΔKoffset may be equal to 0, and certainly, ΔKoffset time or ΔKoffset may not be equal to 0, which is not limited herein.

It may be understood that, according to the foregoing introduction, "because the base station not only needs to notify the UE of the duration of the random access contention resolution timer, but also needs to notify the UE of the startup delay duration of the random access contention resolution timer, the first timing offset may alternatively be determined based on the duration of the random access contention resolution timer and the startup delay duration of the random access contention resolution timer", it may be learned that Koffset may be obtained through calculation based on a sum of the duration of the random access contention resolution timer and the startup delay duration of the random access contention resolution timer, that is, Koffset=[(RCR_offset+RCR_timer)/slot_duration]. This method is also applicable herein. In addition, a method for obtaining Koffset by using the foregoing formula (20) or (21) is also applicable herein.

Different solutions for obtaining Koffset may be obtained by using the foregoing methods and the formulas, parameters, and methods in the embodiments. Details are not described herein again.

To save signaling overheads and reduce a quantity of information bits for transmitting information related to the Koffset, the Koffset may be obtained by using information that has been sent to the UE, and the gNB and the UE agree on a formula for calculating the Koffset. The uplink compensation value on the network side and the TA value used on the UE side and the round-trip delay relationship between the UE and the gNB may be described by using the following formula:

$$\text{time\_compensated}=\text{RTD (UE,gNB)}-\text{TA\_related}$$

The TA_related parameter represents a parameter related to a TA value used by the UE. For example, TA_related may be equal to the TA value used by the UE. An RTD (UE, gNB) is a round-trip delay between the UE and the gNB, or a round-trip delay between the UE and a satellite. For example, the foregoing parameter RCR_offset is related to a minimum round-trip delay between the gNB and a beam/cell in which the UE is located. A time length represented by the RCR_offset may be substituted into the foregoing formula instead of RTD (UE, gNB) to obtain the time_compensated value, and Koffset is calculated by using the foregoing formula, for example, the formula Koffset=⌈time_compensated/slot_duration⌉. Alternatively, TA_related may be a timing offset scheduling_offset that is used by the UE and that is related to an uplink scheduling delay. When the UE receives the uplink scheduling instruction in the slot n, the UE sends the uplink data in the slot n+K2+scheduling_offset. In this case, the time length represented by scheduling_offset may replace TA_related, and is substituted into the foregoing formula to obtain the time_compensated value. Further, Koffset is obtained through calculation by using the foregoing formula, for example, by using the foregoing formula Koffset=⌈time_related/slot_duration⌉. If the quantization values associated with the RTD (UE, gNB) (using slot_duration for quantization) and the quantization values associated with the TA_related (using slot_duration for quantization) are substituted into the above formula, the Koffset value can be obtained directly, since the time_compensated obtained at this time is also a quantization value based on the slot_duration.

It may be understood that each parameter (including Koffset, A, time_compensated, Δtiming_offset, Δtiming, and S) in the embodiments of this application may be sent by the network device to the terminal in a broadcast manner by using at least one of broadcast information including a system information block (system information block, SIB) 1, other system information (other system information, OSI), a master system information block (mater information block, MIB), or the like. The parameter may alternatively be sent to the terminal through unicast or multicast. If the parameter is sent in a radio resource control (RRC) connection phase, the network device may carry or indicate the information in at least one of RRC information, an RRCReconfiguration message, downlink control information (DCI), group DCI, media access control (MAC) control element (CE), or a timing advance command (TAC), or the information is sent to the UE with data transmission or in a separately allocated PDSCH.

As described in the foregoing embodiment, after the UE obtains the latest timing offset, that is, the second timing offset, the UE may send data information, control channel information, or the like scheduled by the base station to the base station by using the second timing offset after the second timing offset takes effect. In the foregoing three methods, for example, in method 1, $K_1$ is a value obtained by using a PDSCH-to-HARQ-timing-indicator instruction index table (a table transmitted by using dl-DataToUL-ACK signaling) in DCI. In method 2, $K_2=0, \ldots, 32$, and the DCI instruction indicates a value of $K_2$. PUSCH subcarrier spacing=$2^{\mu_{PUSCH}}*15$ KHz, and PDCCH subcarrier spacing=$2^{\mu_{PDCCH}}*15$ KHz. In Method 3, when the subcarrier spacing of the SRS signal is equal to 2 SRS*15 KHz, and $\mu_{SRS}=0$, the subcarrier spacing of the SRS signal is 15 KHz. The k value is configured by triggering the higher-layer parameter slot offset (slotOffset) of the SRS resource group each time.

In addition to the foregoing three methods, embodiments of this application further provide several methods, as shown in the following:
(1) PUSCH Sending Timing Scheduled Through DCI If the UE receives the uplink grant/schedule information in a downlink slot n, the PUSCH data of the UE needs to be sent in the uplink slot $$\left\lceil n \cdot \frac{2^{\mu_{PUSCH}}}{2^{\mu_{PDCCH}}} \right\rceil + K_2 + K_{offset}.$$

Herein, $K_2=0, \ldots, 32$. The DCI instruction indicates a value of $K_2$. $\mu_{PUSCH}$ and $\mu_{PDCCH}$ are related to a subcarrier spacing between a PUSCH and a PDCCH, that is, PUSCH subcarrier spacing=$2^{\mu_{PUSCH}}*15$ KHz, and PDCCH subcarrier spacing=$2^{\mu_{PDCCH}}*15$ KHz.

In addition to DCI, the PUSCH may be scheduled in another manner: configured grant (configured grant). In this scheduling manner, Koffset needs to be used, and a solution of automatically updating the Koffset in the disclosure may be used.
(2) PUSCH Sending Timing Scheduled Through RAR Grant The UE receives the PDSCH data that carries the RAR message in a downlink slot n. The UE needs to send a random access message 3 (Msg3) in the uplink PUSCH slot n+$K_2$+Δ+Koffset, where Δ is a value specified by a protocol.
(3) PUSCH Sending Timing Carrying CSI When the UE receives, in a downlink slot n, DCI requested by channel state information (CSI), the UE needs to send CSI in a slot n+K+Koffset of an uplink PUSCH. The K value is indicated by a DCI instruction.
(4) CSI Reference Resource Timing When the UE needs to send a CSI report in an uplink slot n', a CSI reference resource needs to be sent to the UE in a downlink slot n−$n_{CSI\_ref}$−Koffset. Herein, $$n = \left\lfloor n' \cdot \frac{2^{\mu_{DL}}}{2^{\mu_{UL}}} \right\rfloor \cdot n_{CSI\_ref}$$

is a value that is related to a CSI report type and is agreed upon by using a protocol. $\mu_{DL}$, and $\mu_{UL}$ are related to uplink and downlink subcarrier spacing, that is, downlink subcarrier spacing=$2^{\mu_{DL}}*15$ KHz and uplink subcarrier spacing=$2^{\mu_{UL}}*15$ KHz.
(5) MAC CE Effective Timing The gNB receives, in an uplink slot n, an uplink HARQ-ACK corresponding to a PDSCH that carries a MAC-CE instruction, where the MAC-CE instruction is configuration of a downlink signal, and the UE assumes that the MAC-CE instruction for the downlink configuration takes effect in the first slot after the downlink slot n+XN$_{slot}^{subframe,\mu}$ Koffset. Herein, N$_{slot}^{subframe,\mu}$ is a quantity of slots included in a subframe (subframe) when a subcarrier spacing is $2^{\mu}*15$ KHz, and X is a non-negative integer specified in a protocol or configured by using a parameter. For example, the MAC CE configuration instruction for the downlink signal carried in the PDSCH may be a resource configuration for the downlink ZP CSI-RS, or a resource configuration for the downlink ZP CSI-RS whose deactivation (deactivation) is already in effect.

The gNB receives, in the uplink slot n, the uplink HARQ-ACK corresponding to the PDSCH that carries an instruction, where the instruction is configuration of the uplink signal, and the UE assumes that the instruction for the uplink configuration takes effect in the first slot after the uplink slot $n+XN_{slot}^{subframe,\mu}+Koffset$. Herein, $N_{slot}^{subframe,\mu}$ included in a subframe (subframe) when a subcarrier spacing is $2^{\mu}*15$ KHz, and X is a non-negative integer specified in a protocol or configured by using a parameter. For example, an instruction carried in the PDSCH may be an activation/deactivation SRS resource configuration.

It may be understood that, in the foregoing embodiments, expression of the initial timing offset may also be represented by a first timing offset, Koffset1, Koffset1, or the like. Koffset and Koffset may be understood as a same parameter, the time_duration and the slot_duration may be understood as a same parameter, ΔKoffset and ΔK may also be understood as a same parameter, and the like. In addition, in the foregoing embodiments, the Koffset or the timing offset may be understood as an initial timing offset, an updated timing offset, or the like. The initial timing offset or the updated timing offset may be determined based on a specific case of a specific embodiment. The foregoing Max_RTD_beam may be understood as a maximum round-trip delay between the base station and a beam coverage area in which the UE is located.

It may be understood that the foregoing shown execution sequence of updating the timing offset and using the timing offset is not limited in this embodiment of this application. For example, when sending the message used to update the timing offset, the UE or the network device may not send the message used to update the timing offset based on the timing offset. For another example, when the UE or the network device sends a message based on the timing offset, the message may not include information used to indicate the updated timing offset. FIG. 10a is used as an example. For example, when the UE sends an uplink message to the base station based on the second timing offset, the uplink message may not include the updated second timing offset.

It may be understood that the foregoing methods and embodiments are described by using four-step random access and two-step random access as examples. The foregoing methods, such as a method for obtaining and updating a timing offset, are not limited to being used in a random access operation, and may be used at any stage of communication. For example, the second message and the third message described in this application may be replaced with a downlink message and an uplink message.

It may be understood that for an implementation not described in an embodiment, refer to another embodiment or the like, and details are not described herein again.

What is claimed is:

1. A method for updating a timing offset, applicable for a terminal device, wherein the method comprises:
   receiving a timing offset difference ΔKoffset, wherein the ΔKoffset is a positive value;
   updating a timing offset based on the ΔKoffset to obtain an updated timing offset, wherein the updated timing offset is usable for transmitting uplink signaling, wherein the updated timing offset meets following condition:

Koffset_new=Koffset_old−ΔKoffset, wherein Koffset_new represents the updated timing offset, and Koffset_old represents the timing offset before the updating.

2. The method according to claim 1, wherein the timing offset before the updating is at least one of:
   the timing offset that is being used by the terminal device, a reference timing offset, or an initial timing offset.

3. The method according to claim 2, wherein the reference timing offset is configured by a network device using a broadcast message.

4. The method according to claim 1, wherein
   the ΔKoffset is received in a media access control control element (MAC CE) signaling.

5. The method according to claim 4, wherein a 6 bits field in the MAC CE signaling is used to represent the ΔKoffset.

6. The method according to claim 1, wherein the timing offset is represented by using a slot as a unit of duration.

7. The method according to claim 1, wherein the method further comprises:
   receiving a downlink signaling in slot n, and
   transmitting the uplink signaling based on the slot n, a value K and the updated timing offset, wherein the value K is indicated by a network device.

8. A communication apparatus, comprising:
   at least one processor;
   one or more memories coupled to the at least one processor and storing program instructions, which, when executed by the at least one processor, cause the communication apparatus to:
   receive, a timing offset difference ΔKoffset, wherein the ΔKoffset is a positive value;
   update, a timing offset based on the ΔKoffset to obtain an updated timing offset, wherein the updated timing offset is usable for transmitting uplink signaling, wherein the updated timing offset meets following condition:
   Koffset_new=Koffset_old−ΔKoffset, wherein Koffset_new represents the updated timing offset, and Koffset_old represents the timing offset before the updating.

9. The apparatus according to claim 8, wherein the timing offset before the updating is at least one of:
   the timing offset that is being used by the apparatus, a reference timing offset, or an initial timing offset.

10. The apparatus according to claim 9, wherein the reference timing offset is configured by a network device using a broadcast message.

11. The apparatus according to claim 8, wherein
   the ΔKoffset is received in a media access control control element (MAC CE) signaling.

12. The apparatus according to claim 11, wherein a 6 bits field in the MAC CE signaling is used to represent the ΔKoffset.

13. The apparatus according to claim 8, wherein the timing offset is represented by using a slot as a unit of duration.

14. The communication apparatus according to claim 8, wherein, when the program instructions are executed by the at least one processor, cause the communication apparatus to:
   receive a downlink signaling in slot n, and
   transmit the uplink signaling based on the slot n, a value K and the updated timing offset, wherein the value K is indicated by a network device.

15. A non-transitory machine-readable medium, comprising instructions, which when executed by at least one processor, cause a communication apparatus to:

receive, a timing offset difference ΔKoffset, wherein the ΔKoffset is a positive value;

update, a timing offset based on the ΔKoffset to obtain an updated timing offset, wherein the updated timing offset is usable for transmitting uplink signaling, wherein the updated timing offset meets following condition:

Koffset_new=Koffset_old−ΔKoffset, wherein Koffset_new represents the updated timing offset, and Koffset_old represents the timing offset before the updating.

16. The non-transitory machine-readable medium according to claim 15, wherein the timing offset before the updating is at least one of:

the timing offset that is being used by the apparatus, a reference timing offset, or an initial timing offset.

17. The non-transitory machine-readable medium according to claim 16, wherein the reference timing offset is configured by a network device using a broadcast message.

18. The non-transitory machine-readable medium according to claim 15, wherein the ΔKoffset is received in a media access control control element (MAC CE) signaling.

19. The non-transitory machine-readable medium according to claim 18, wherein a 6 bits field in the MAC CE signaling is used to represent the ΔKoffset.

20. The non-transitory machine-readable medium according to claim 15, wherein the timing offset is represented by using a slot as a unit of duration.

21. The non-transitory machine-readable medium according to claim 15, wherein, the instructions, which when executed by the at least one processor, cause the communication apparatus to:

receive a downlink signaling in slot n, and transmit the uplink signaling based on the slot n, a value K and the updated timing offset, wherein the value K is indicated by a network device.

* * * * *